US006757445B1

(12) United States Patent
Knopp

(10) Patent No.: US 6,757,445 B1
(45) Date of Patent: Jun. 29, 2004

(54) METHOD AND APPARATUS FOR PRODUCING DIGITAL ORTHOPHOTOS USING SPARSE STEREO CONFIGURATIONS AND EXTERNAL MODELS

(75) Inventor: David E. Knopp, Parker, CO (US)

(73) Assignee: Pixxures, Inc., Arvada, CO (US)

( * ) Notice: Subject to any disclaimer, the term of this patent is extended or adjusted under 35 U.S.C. 154(b) by 701 days.

(21) Appl. No.: 09/679,726

(22) Filed: Oct. 4, 2000

(51) Int. Cl.[7] .................................................. G06K 9/36
(52) U.S. Cl. ..................... 382/285; 382/289; 382/294; 382/154; 382/296
(58) Field of Search ................................ 382/106, 154, 382/285, 296, 300, 284, 294, 289; 345/421, 582, 649, 653, 620, 629, 630, 634, 619, 672, 679, 677; 348/135, 144, 47; 396/7, 8, 9, 10, 11, 13; 356/2; 358/537, 540

(56) References Cited

U.S. PATENT DOCUMENTS

| | | | |
|---|---|---|---|
| 3,783,294 A | * | 1/1974 | Koper ......................... 250/558 |
| 3,792,927 A | | 2/1974 | Bertram |
| 3,915,569 A | | 10/1975 | Pölzleitner |
| 3,950,097 A | | 4/1976 | Göpfert et al. |
| 4,724,526 A | * | 2/1988 | Cole et al. .................. 359/470 |
| 5,166,789 A | | 11/1992 | Myrick |
| 5,179,638 A | | 1/1993 | Dawson et al. |
| 5,187,754 A | | 2/1993 | Currin et al. |
| 5,189,510 A | | 2/1993 | Henaff et al. |

(List continued on next page.)

OTHER PUBLICATIONS

Internet Document "Orthorectification: What, Why, How, Who?" Website at http://www.vexcel.com/aerial/orthophotos.html (Apr. 24, 2000) pp. 1–7.

Internet Document "Digital Orthophoto Quadrangles" Fact Sheet 039–00 (Mar. 2000) Website at http://mapping.usgs-.gov/mac/isb/pubs/factsheets/fs03900.html (Apr. 5, 2000) pp. 1–5.

Internet Document "National Mapping and Remotely Sensed Data" Website at http://edcwww.cr.usgs.gov/nsdi/gendoq.htm (Apr. 6, 1998) pp. 1–3.

Primary Examiner—Timothy M. Johnson
Assistant Examiner—Ali Bayat
(74) Attorney, Agent, or Firm—Reinhart Boerner Van Deuren s.c.

(57) ABSTRACT

A method and system for producing digital orthophotos from imagery acquired as full or sparse stereo. The orthophotos can be produced in a variety of map coordinate systems without the need to convert or recompute DEM or photogrammetric solution data. In one embodiment, a two dimensional, planimetric free-network solution, utilizing arbitrary datum definition constraints, is used to provide a transitory coordinate system that is used to facilitate the image measurement process. It is utilized as a preliminary step to refine apriori block layout information to facilitate point picking and to provide general quality control capabilities before undertaking a rigorous 3D photogrammetric adjustment. In place of a general map conversion transformation, an identity transformation can be used, so that map coordinates and world coordinates are identical. With this process, given DEM data and photogrammetric solution data in a particular coordinate system, the orthophoto image data can be produced in any map coordinate system. In one embodiment, all geometric coordinate transformations are performed prior to performing the image intensity interpolation operation. Thus, only one image intensity interpolation operation is performed, using the geometric coordinate data. In another embodiment, a network constraint is introduced to the block adjustment process that assumes an average vertical direction in order to support the process of self rectification.

30 Claims, 49 Drawing Sheets

U.S. PATENT DOCUMENTS

| | | | |
|---|---|---|---|
| 5,251,037 A | * 10/1993 | Busenberg | 348/147 |
| 5,345,086 A | 9/1994 | Bertram | |
| 5,381,338 A | 1/1995 | Wysocki et al. | |
| 5,414,462 A | 5/1995 | Veatch | |
| 5,517,419 A | 5/1996 | Lanckton et al. | |
| 5,542,032 A | 7/1996 | Pritt | |
| 5,577,181 A | * 11/1996 | Givens et al. | 382/294 |
| 5,596,494 A | 1/1997 | Kuo | |
| 5,611,000 A | 3/1997 | Szeliski et al. | |
| 5,649,032 A | 7/1997 | Burt et al. | |
| 5,719,949 A | 2/1998 | Koeln et al. | |
| 5,808,626 A | 9/1998 | Givens et al. | |
| 5,864,632 A | 1/1999 | Ogawa et al. | |
| 5,878,356 A | 3/1999 | Garrot, Jr. et al. | |
| 5,926,581 A | 7/1999 | Pritt | |
| 5,987,164 A | 11/1999 | Szeliski et al. | |
| 5,987,189 A | 11/1999 | Schmucker et al. | |
| 6,009,190 A | 12/1999 | Szeliski et al. | |
| 6,061,468 A | 5/2000 | Kang | |
| 6,064,760 A | * 5/2000 | Brown | 382/154 |
| 6,064,777 A | 5/2000 | Negishi et al. | |
| 6,078,701 A | 6/2000 | Hsu et al. | |

* cited by examiner

Alignment of frames before adjustment

Alignment of frames after adjustment, rectification, and mosaicking

FIG. 7
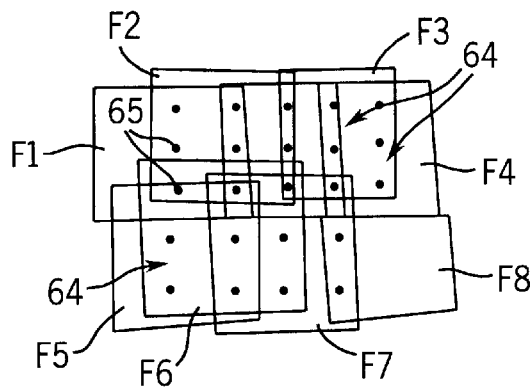
FIG. 8
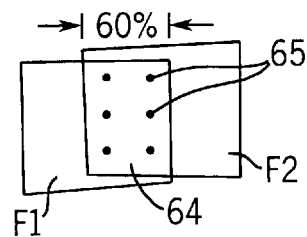
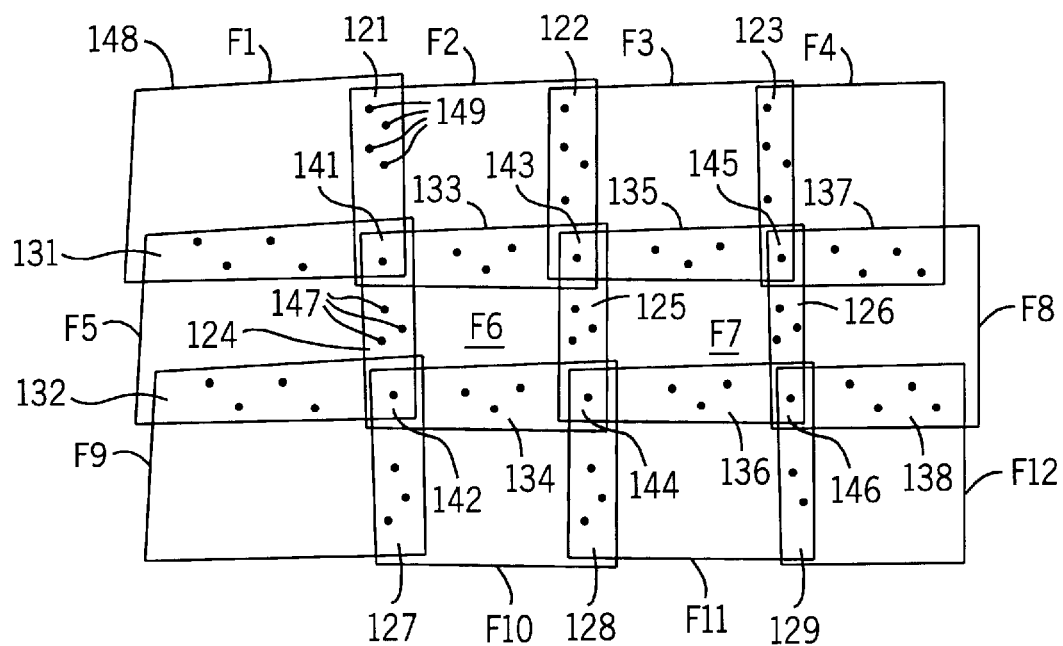
FIG. 9

Block of frames with sparse overlap

Block of frames with corresponding footprints

Block of footprints

Point picking control in simple overlap

Point picking in quadruple overlap

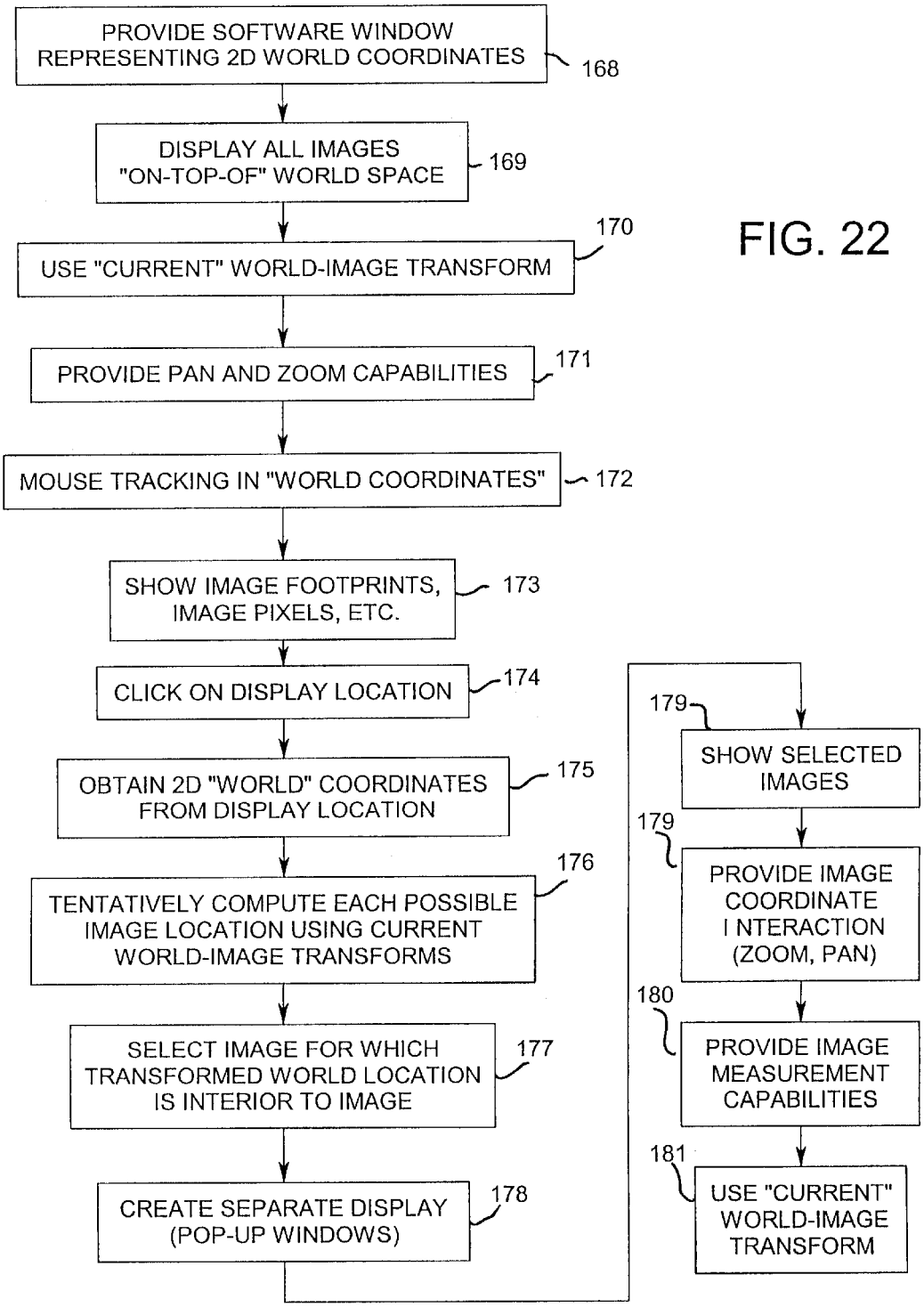

FIG. 24
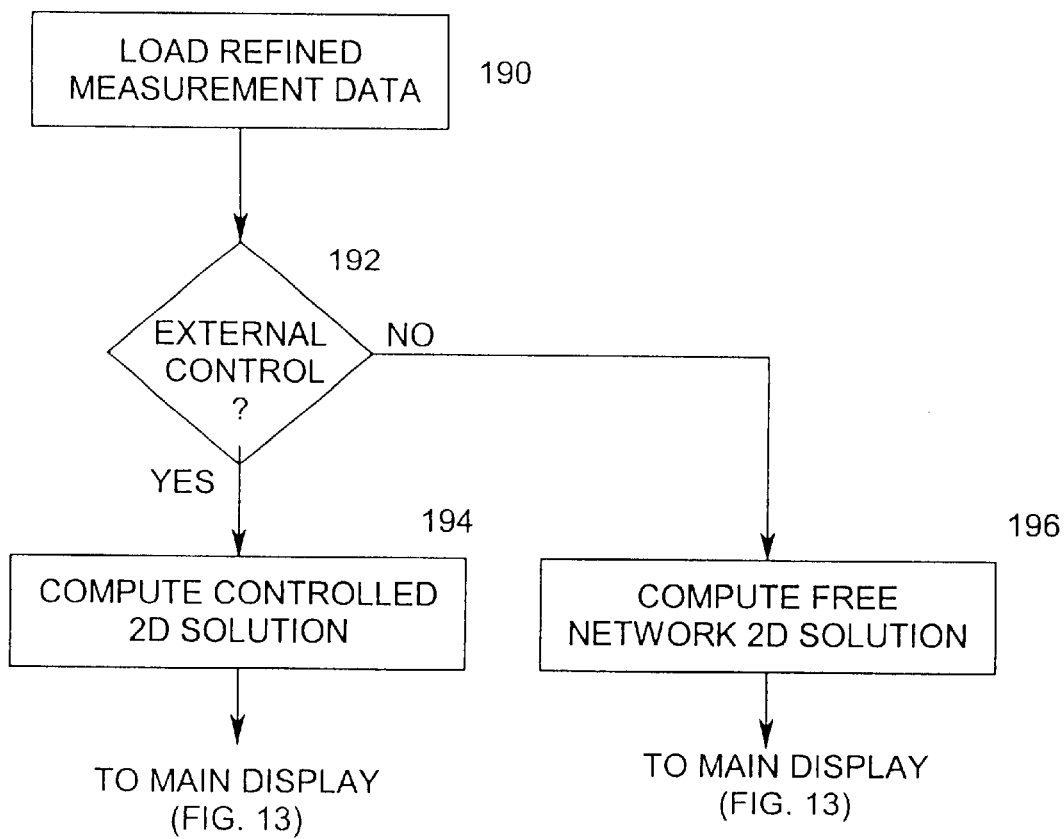
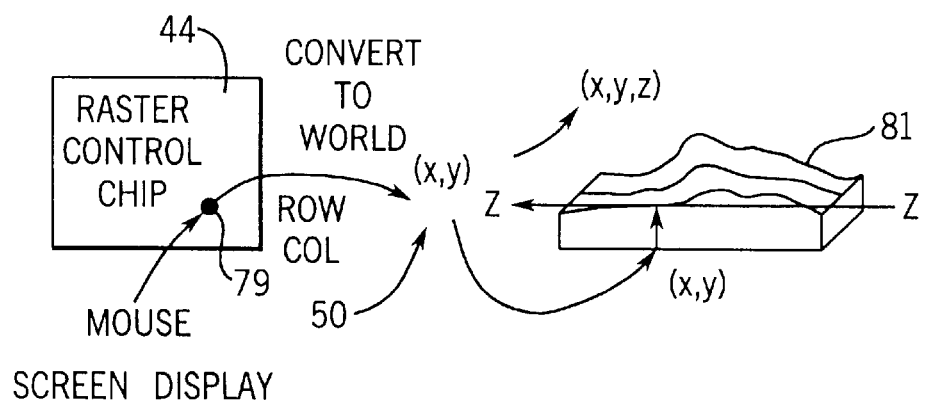
FIG. 23

Block before transformation

Block after transformation

```
                    Adjusted Point Residual List
Point           X Residual          Y Residual          Z Residual
----------------------------------------------------------------------
84                       0                   0          0.962380198567
111                      0                   0          0.924501113868
46             -0.88255551178       3.16693691678       -0.873675088052
9                        0                   0          0.866598577119
73             -2.69153020316       -3.53353217896      -0.820864623817
94                       0                   0          -0.805216151706
60             -1.22407934943       -3.18065231945      -0.787744235836
52              0.911825716204       6.0932438951       0.752434843109
48              4.15957140364       0.84598991368       0.731939673149
118                      0                   0          0.682726917544
50              3.28264243831       0.937151677907      -0.638642983
8                        0                   0          0.632748733096
114                      0                   0          -0.62899423553
44              3.65874656913       2.07296704128       0.44715067906
88                       0                   0          0.426607215933
95                       0                   0          -0.391243937745
37                       0                   0          -0.299086485302
72             -0.0738007942564     -0.33616527915      0.238444263094
64             -0.807597775827      -3.22409841698      -0.22723594431
112                      0                   0          0.185984506664
80                       0                   0          -0.185766923392
12                       0                   0          0.018693017975
51                       0                   0          0.00736494408955
----------------------------------------------------------------------

Adjusted Point Residual Sum:
   6.24684616923e-07    1.28988176584e-06    -1.06035906811e-06

Adjusted Point Residuals
   RMSE_X_Coordinate:   3.76292703366
   RMSE_Y_Coordinate:   4.57249063569
   RMSE_Z_Coordinate:   4.83739308081
   RMSE_R_Coordinate:   4.61215546017

Adjusted Mea Residuals
   RMSE_X_Coordinate:   0.594767429252
   RMSE_Y_Coordinate:   0.741822984876
   RMSE_R_Coordinate:   0.672327909502

[production@rana bc]$
```

Block adjustment output for one overlap

Block showing bad points in white

Mosaic before radiometric adjustment

Mosaic after radiometric adjustment

METHOD AND APPARATUS FOR PRODUCING DIGITAL ORTHOPHOTOS USING SPARSE STEREO CONFIGURATIONS AND EXTERNAL MODELS

BACKGROUND OF THE INVENTION

FIELD OF THE INVENTION

The present invention relates generally to methods and systems for processing digital imagery from a variety of optical imagery systems, and more particularly, to a method and system for producing digital orthophotos using sparse stereo photogrammetric configurations with or without externally DEM's and new photogrammetric software tools.

In traditional digital orthophoto processes, digital imagery data typically are acquired by scanning a series of frames of aerial photographs which provide coverage of a geographically extended project area. Alternatively, the digital imagery data can be derived from satellite data and other sources. Then, the image data are processed on a frame by frame basis for each picture element, or pixel, using rigorous photogrammetric equations on a computer. Locations on the ground with known coordinates or direct measurement of camera position are used to establish a coordinate reference frame in which the calculations are performed.

During conventional orthophoto production processes, a DEM, or digital elevation model (DEM), is derived from the same digital imagery used in subsequent orthorectification, and this DEM has to be stored in one and the same computer file.

Then, the imagery data for each frame is orthorectified using elevation data obtained from the DEM to remove image displacements caused by the topography ("relief displacements"). For many conventional processes, the steps of measurement are performed with the imagery data for each frame or for a pair of two frames having a 60% forward overlap. In traditional image processing systems, the measurement process is carried out primarily on the digital imagery accessed in pairs of overlapping frames known as a "stereomodel". Subsequent photogrammetric calculations often are carried out on the digital imagery on a stereomodel basis. Orthorectification is carried out on the digital imagery on a frame by frame basis. These processes are time consuming and costly. For example, using traditional methods with high process overhead and logistical complexity, it can take days to process a custom digital orthophoto once the imagery has been collected.

After orthorectification of the individual frames, the orthorectified images are combined into a single composite image during a mosaicking step.

SUMMARY OF THE INVENTION

The disadvantages and limitations of the background art discussed above are overcome by the present invention which provides a method for producing a digital orthophoto from a block of overlapping images of a project area, including acquiring imagery data for the project area and performing all geometric coordinate transformations are performed prior to performing the image intensity interpolation operation. Thus, only one image intensity interpolation operation is performed, using the geometric coordinate data. This one-step resampling process avoids the situation in which multiple image resampling operations unnecessarily degrade the color content of the resulting imagery. In one embodiment, digital elevation model data is derived from the imagery data and an orthorectification operation is performed using the derived digital elevation model data. Then, the geoimage is transformed to a map coordinate system.

In accordance with another aspect of the present invention, orthophotos can be created in a variety of map coordinate systems without the need to convert or recompute DEM or photogrammetric solution data. Alternatively, an identity transformation can be used so that map coordinates and world coordinates are identical. With this process, given DEM data and photogrammetric solution data in a particular coordinate system, the orthophoto image data can be produced in any map coordinate system.

In accordance with a further aspect of the invention, there is provided a method for producing a digital orthophoto from a block of overlapping images for a project area. The method comprises acquiring digital imagery data representing the block of overlapping images of the project area and obtaining measurement data for tie and control points. A network constraint is introduced to a block bundle adjustment that assumes an average vertical direction for the imagery to support the process of self-rectification.

Further in accordance with the invention, there is provided a method for producing a digital orthophoto from a block of overlapping images for a project area. The method comprises acquiring digital imagery data representing the block of overlapping images of the project area; obtaining measurement data for a plurality of tie and a plurality of control points; performing photogrammetric interpolation adjustment using a block bundle adjustment process to obtain an elevation interpolation model including three-dimension ground points; fitting the elevation interpolation model between ground points; and interpolating digital elevation model elevation at arbitrary ones of the three-dimension ground points to support rectification in world coordinates.

Further in accordance with the invention, a method for improving the quality of tie points and control points measured in producing a digital orthophoto from a set of overlapping images of a project area comprises measuring a plurality of points within a block of images of the project area; performing a two-dimension, free network adjustment using the points measured within the block of images to simultaneously compute a two-dimension orientation transformation for each image in the block of images; performing a three-dimension, free-network adjustment using the results of the two-dimension, free-network adjustment; assessing the quality of the points for the block of images using the results of the three-dimension, free-network adjustment; refining the measurement of at least one of the points; and performing at least a further three-dimension, free-network adjustment.

Further in accordance with the invention, there is provided a method for measuring tie points and control points in producing a digital orthophoto from a block of overlapping images of a project area. The method comprises the steps of displaying the overlapping images in pairs, and measuring corner points in each image pair to obtain point data. Then, a two-dimension, free network adjustment is performed, using the point data obtained by measuring points within the block of images to simultaneously compute a two-dimension orientation transformation for each image in the block. A plurality of additional tie points are measured within the block of images of the project area. The two-dimension, free-network adjustment is performed prior to measuring the additional points.

The invention further provides a method for providing digital elevation model data for use in producing a digital orthophoto of a project area. The method comprises acquiring digital elevation model data from at least first and second sources; prioritizing the digital elevation model data acquired from the first and second sources; storing the digital elevation model data for at least the first and second digital elevation models in a memory in a predetermined order to produce a digital elevation multimodel. The digital elevation model data having the highest priority is accessed to provide elevation data for use in performing a first geometric transformation. Then the digital elevation model data having the next priority is accessed to provide elevation data for use in performing a second geometric transformation.

A method for producing a digital orthophoto for a project area, the method comprising the steps of using an uncalibrated camera to obtain a series of aerial photographs of the project area for providing digital imagery representing a block of overlapping images of the project area; introducing at least one perspective camera model parameter into a bundle block adjustment program as an unknown parameter pertaining to the taking camera; performing a bundle block adjustment operation using the digital imagery data to calculate the unknown parameter; supplying the calibrated parameter data and bundle adjustment result data to an orthorectification process; and performing an orthorectification operation using the calibrated parameter data and the bundle adjustment data.

The invention further provides a method for creating orthophoto images from imagery without stereo overlap and without availability of an external digital elevation model. The method comprises performing a photogrammetric adjustment using tie points and control points for the sparse stereo geometry to provide a three dimensional coordinate value for a plurality of ground points, the ground points corresponding to all points which have been measured in two or more images, and the ground points form a sparse sampling of the ground digital elevation model with each ground point having a known elevation value expressed in world space and a planimetric location expressed in world space. A digital elevation model is interpolated between the ground points for use in producing a digital orthophoto for a project area.

With this invention, there is provided a method and system for producing digital orthophotos from sparse stereo configurations which consist of photographic block geometries exhibiting an overlap much smaller than 60%, together with a method and system which uses various DEM files allowing an automated selection based on geographic location.

DESCRIPTION OF THE DRAWINGS

These and other advantages of the present invention are best understood with reference to the drawings, in which:

FIG. 7 is a simplified representation of a block of frames of an image showing the overlap of adjacent frames for full stereo;

FIG. 8 is an enlarged fragmentary view of a portion of FIG. 7 showing points selected in the Von Gruber pattern;

FIG. 9 is a simplified representation of a block of frames of an image showing the overlap of adjacent frames for sparse stereo;

FIG. 22 is a process flow chart for a point picking process of the point picking program of FIG. 13;

FIG. 23 is a simplified representation of a screen display and a DEM, in three dimensions, used in describing transforming from pixel to world coordinates;

FIG. 24 is a process flow chart for a planimetric adjustment process of the point picking program of FIG. 13;

FIG. 32 is a screen shot of a window containing the point residuals for one specific image after block adjustment;

FIG. 33 illustrates a table of control points with a high residual control point picked for editing;

DEFINITIONS OF TECHNICAL TERMS

Figure 1:
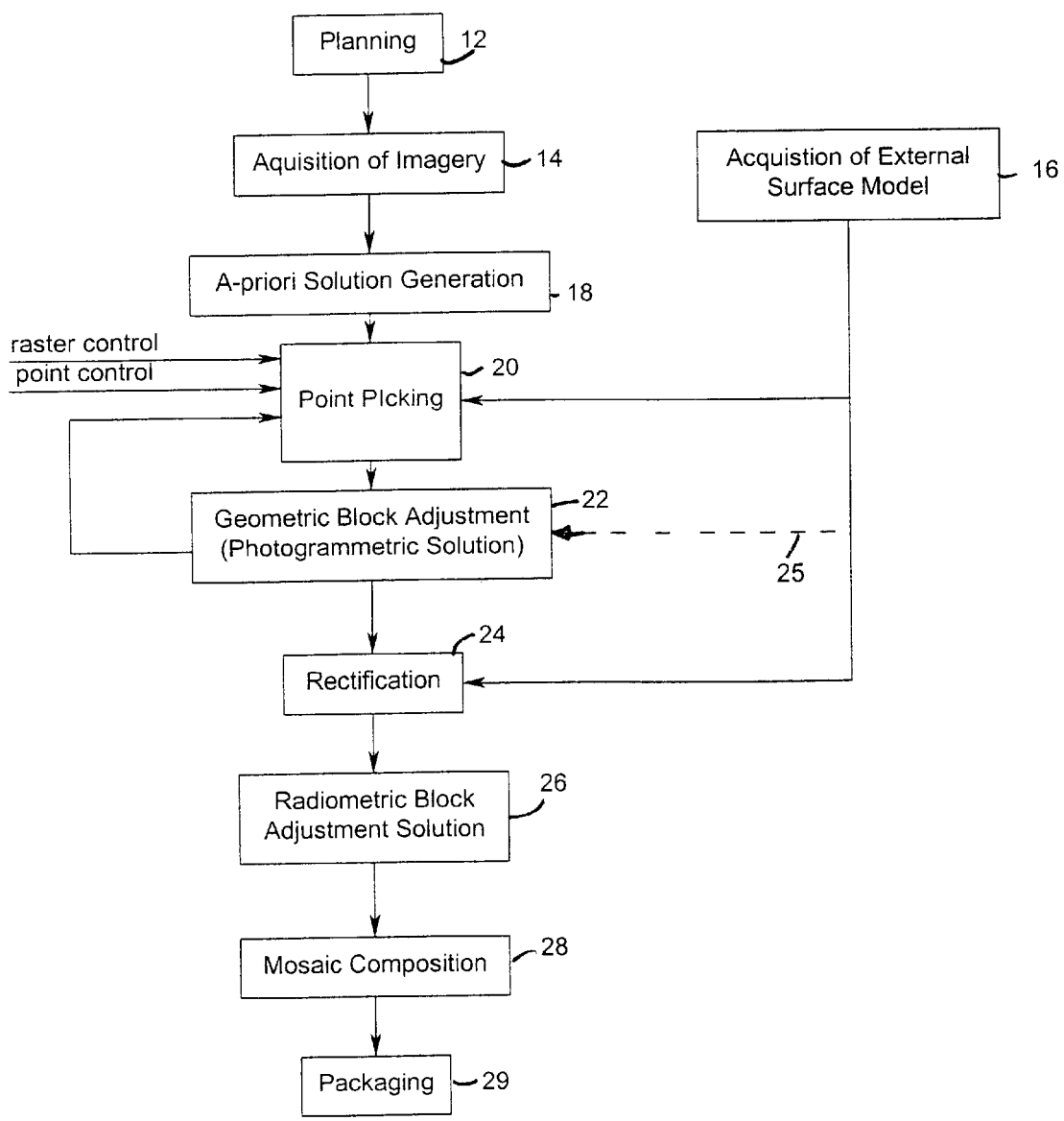
FIG. 1 is a process flow chart for a digital orthophoto production process in accordance with the invention.

The following are definitions of some of the technical terms used in the detailed description of the preferred embodiments.

Bundle adjustment—A process for determining "optimum" values for mathematical parameters within a photogrammetric model which represents the imaging process as the recording of a bundle of optical rays. Conventionally, the bundle block adjustment provides a simultaneous solution of a system of mathematical equations. The solution conventionally represents the solution in which measurement residual magnitude values are a least squares minimum. In addition to measurement values, the bundle adjustment conventionally includes various unknown parameters, constant values and constraint equations.

Camera coordinates—Used to identify the location of an image point at the time of exposure. Specifically, this represents the location of an image point with respect to the camera optical system conventionally with respect to the nodal point as an origin and aligned with a measured, assumed or computed camera system "body axis".

Cartesian coordinate system—This is typically used either explicitly or implicitly) as the coordinate system in which the bundle adjustment computations are performed and with respect to which exterior orientation parameters are computed.

Digital Elevation Model (DEM)—A blanket of points in 3D space representing a portion of the topography of the earth's surface. Each point has X, Y, and Z coordinates.

Digital Terrain Model (DTM)—A blanket of lines joining points in a DEM. Used as "wire frame" to drape image information over it. Used as the foundation for 3D and perspective renditions of the topography of the earth's surface.

Exterior orientation—The process of determining values for location and orientation of the camera at the time of exposure. Conventionally, this includes the location (three coordinate values) of the front nodal point of the camera optical system, and the attitude (three values) of the camera system with respect to the world coordinate system.

Free-network—The use, during a photogrammetric bundle adjustment, of relative constraint equations to provide a relative and unambiguous, but arbitrary first order datum definition. Conventionally, providing a definition of the adjustment coordinate system origin (three values in three-dimensions) orientation (three values in three-dimensions), and scale (one value).

Interior orientation—The process of determining values for the photogrammetric sensor calibration parameters.

For example, for a central perspective frame camera, the interior parameters conventionally include the calibration constant vector (three values consisting of the principal point, two values, and the principal distance, one value), optical distortion model coefficients, and optional film deformation model coefficients. Interior orientation is generally performed either during an independent calibration procedure (typically for aerial metric cameras) or via determination of "best fit" parameter values during bundle adjustment with self calibration.

Map coordinates—A cartographic coordinate system in which the final orthophoto (georeferenced image) will be expressed. Examples of map coordinates common in United States applications include Universal Transverse Mercator (UTM) and State Plane Coordinate Systems (SPCS). "World coordinate" system denotes a three-dimensional, homogeneous, isotropic Cartesian coordinate system. This is typically used (either explicitly or implicitly) as the coordinate system in which the bundle adjustment computations are performed and with respect to which exterior orientation parameters are computed.

Orthophoto—An image in which features are aligned to a map coordinate system.

Perspective image—An image generated by a physical process which is modeled by a mathematical projective transformation, i.e., one which collapses three-dimension coordinates into two-dimension coordinates.

Pixel coordinates—Used to identify a location within a digital image by specifying an individual pixel (or fraction thereof). Conventionally, represented in column/row or line/sample formats with various conventions for selection of the origin and positive directions.

Rectification—The process of producing an orthophoto by removing relief displacement.

Relief Displacement—An error in an image due to perspective and topography. It consists of important object shifts in the image that are caused by the fact that the aerial camera sees most objects not from the top, but from a lateral vantage point, and due to elevation differences of the objects. For example, a straight highway running over a mountaintop will be shown as curved on the image. Orthorectification (or rectification herein) is the process of removing relief displacement from images.

Transformation—A mathematical operation which converts coordinate values expressed with respect to one coordinate system into values expressed with respect to another coordinate system. This can take place in 2D or 3D space. By the art's definition, this involves one shift for each coordinate axis, one rotation around each coordinate axis, and one scale factor. This type of transformation is called "conformal", assuming that the coordinate axes are perpendicular to each other, and that they hold the same scale. If this is not the case, another transformation is implemented, called "affine". Affine transformations have more complex math models and take into account coordinate system deficiencies.

Vertical photography—Common to the mapping industry. A vertical photograph is conventionally taken from an aircraft with the distinguishing characteristic that the optical axis is oriented near the vertical direction, i.e., looking down.

World coordinates—A three-dimensional, homogeneous, isotropic Cartesian coordinate system. This is typically used (either explicitly or implicitly) as the coordinate system in which bundle adjustment computations are performed and with respect to which exterior orientation parameters are computed.

DETAILED DESCRIPTION OF THE PREFERRED EMBODIMENTS

Referring to FIG. 1 of the drawings, there is shown a flowchart for the digital orthophoto production process provided by the present invention. In accordance with the invention, digital orthophotos are produced using a new method that increases production speed, provides more powerful alternatives to production, and eliminates some severe limitations of conventional production methods. For purposes of illustration, the invention is described with reference to an application for generating orthophotos which relate to established cartographic mapping and geographic information system applications. However the digital orthophoto production process provided by the present invention can be used in other applications.

The method provided by the invention includes a general database of project images, and resulting orthophotos, together with space model data and project planning detail, in one and the same database. With reference to the process flow chart shown in FIG. 1, planning is carried out in block 12. Planning can include determining the type of film to be used for taking the aerial photographs, the scale of the photography, the geographic area to be covered, the number of exposures to be taken, the amount of overlap between exposures in the same flightline and inventory and selection of various alternative data sources.

Figure 2:
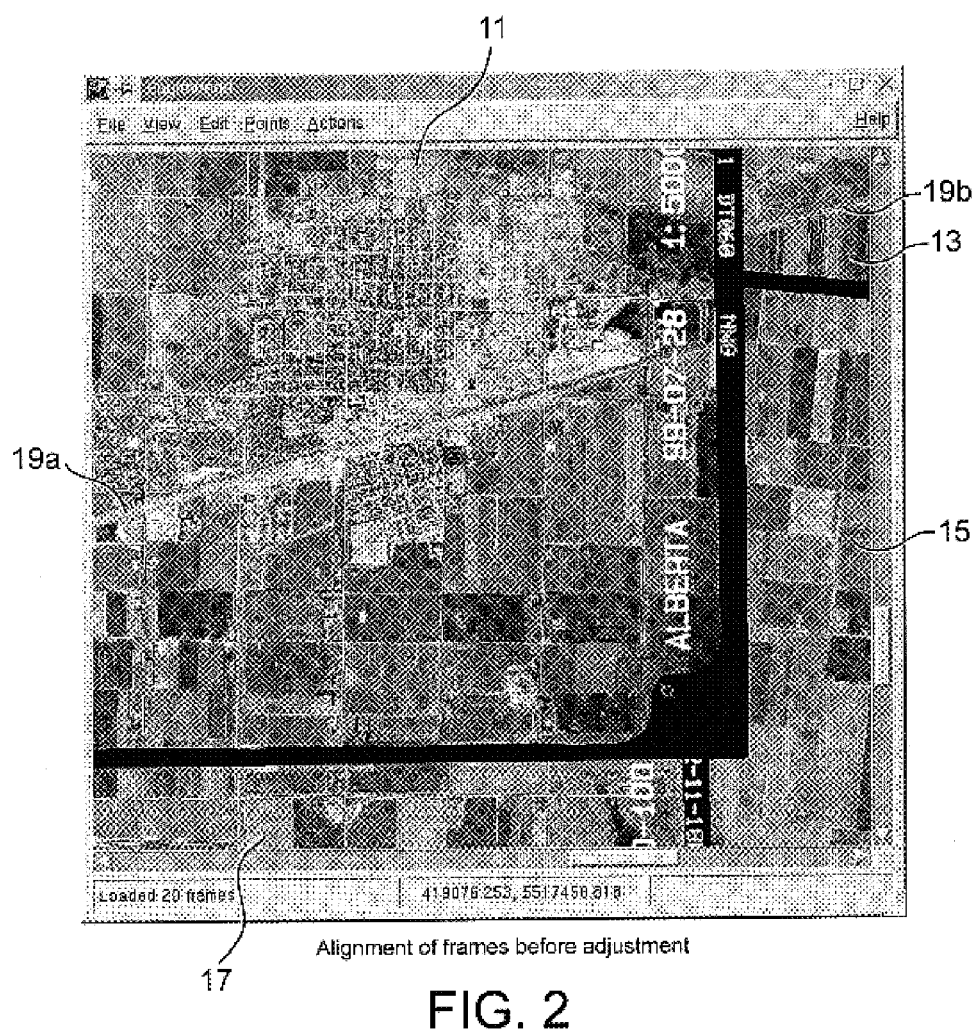
FIG. 2 is a screen shot of a sample of two images before adjustment.
Figure 3:
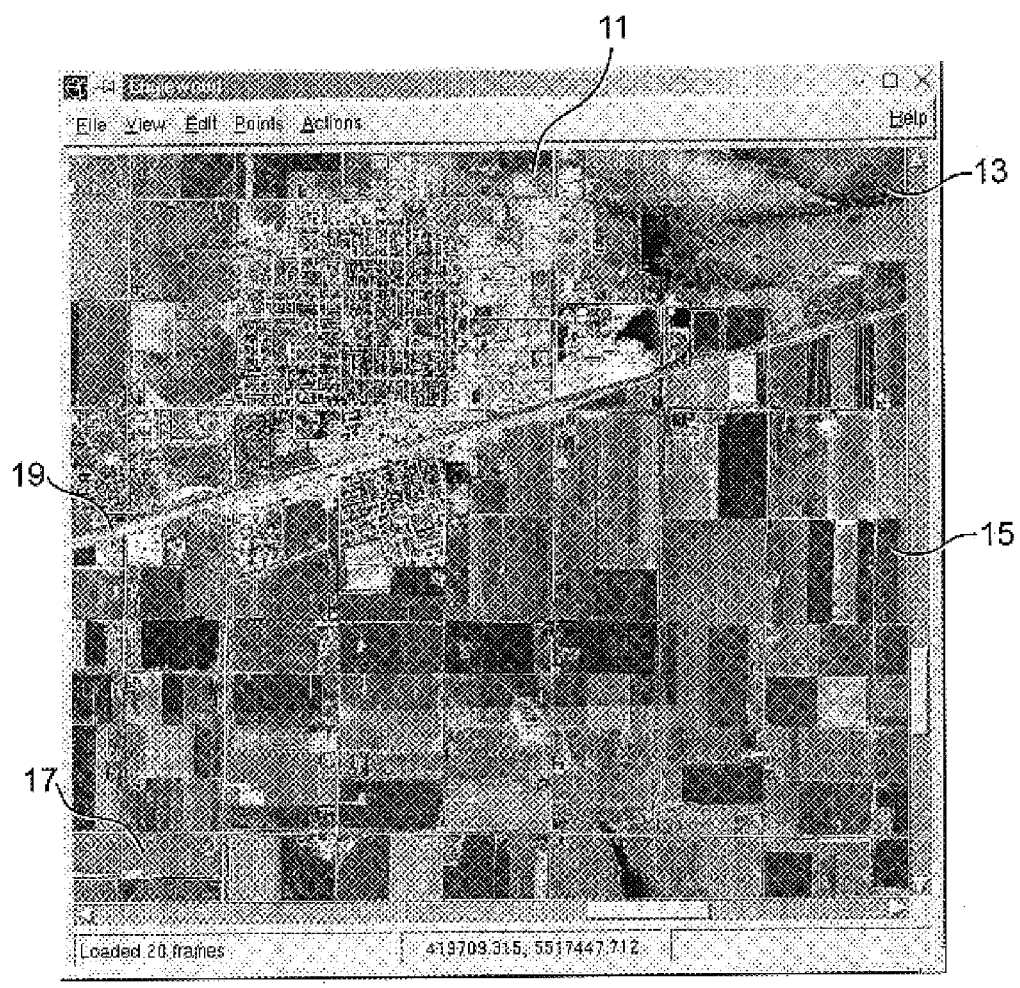
FIG. 3 is a screen shot of a sample of two images after adjustment, rectification, and mosaicking in accordance with the invention.
Figure 10:
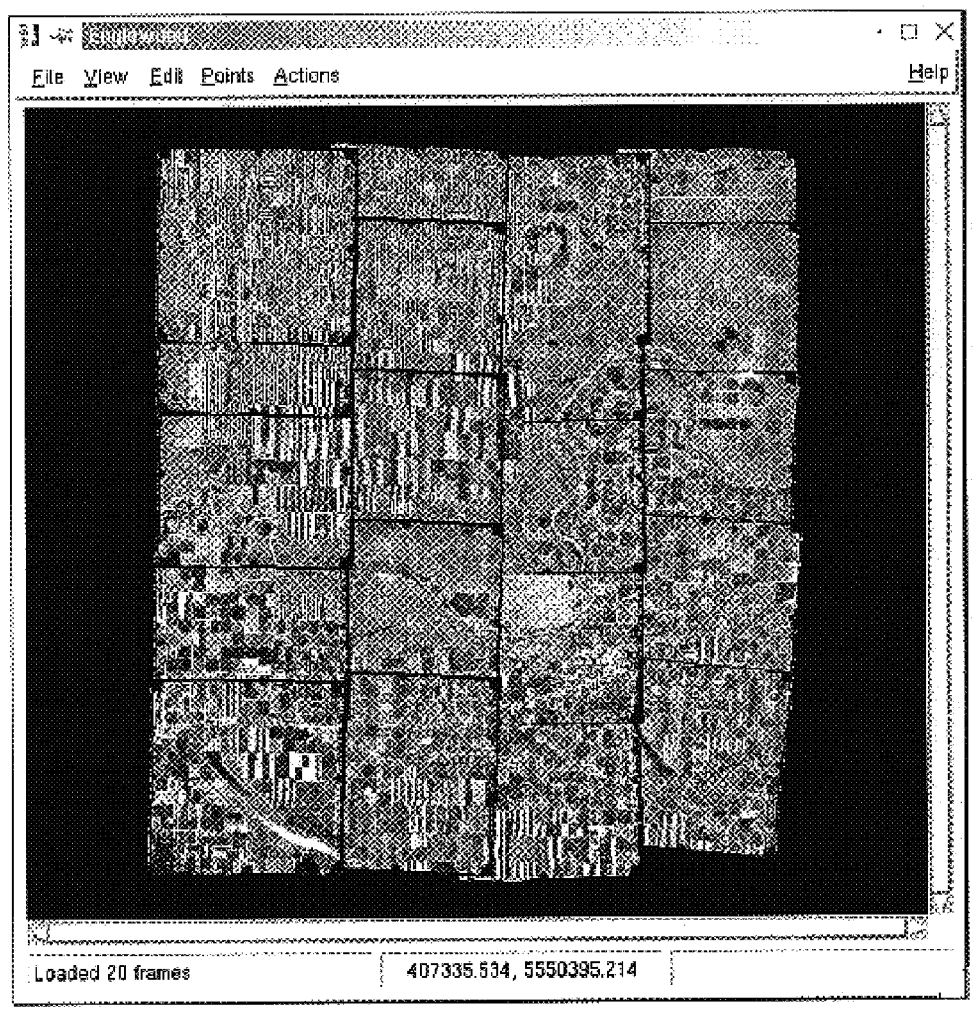
FIG. 10 is a screen shot of a sample block of images with sparse overlaps in accordance with the invention.
Figure 11:
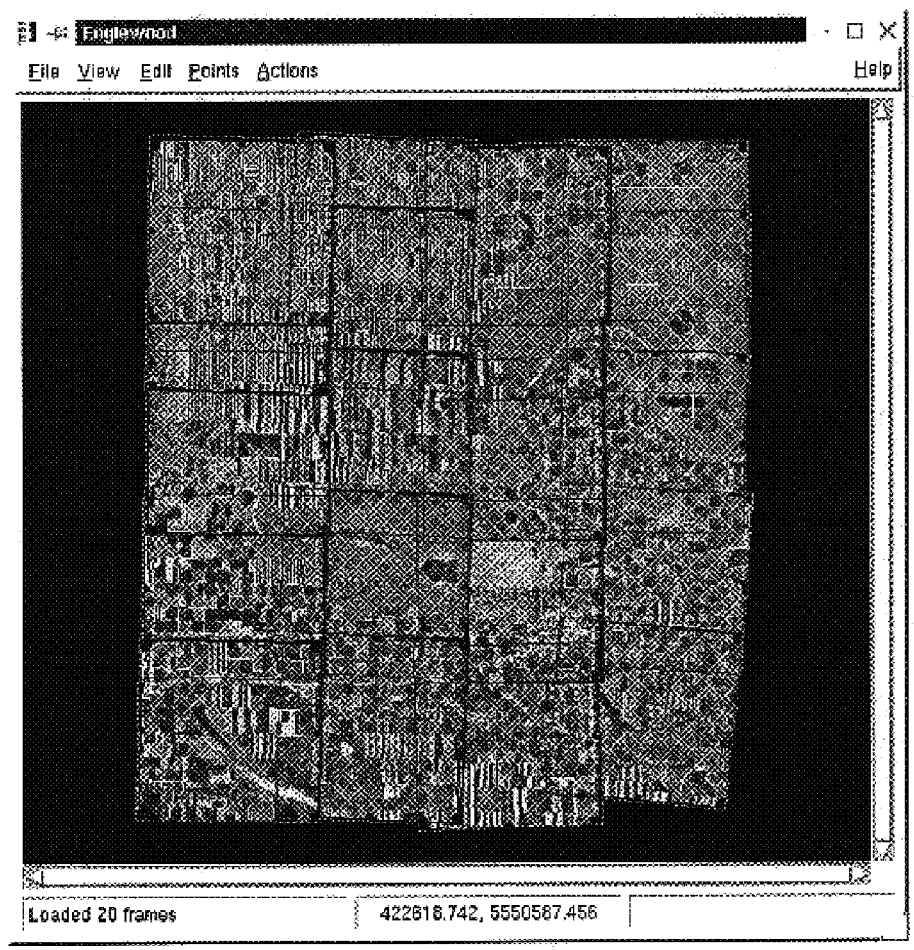
FIG. 11 shows the same screen shot as in FIG. 10, after the frame footprints have been added in accordance with the invention.
Figure 12:
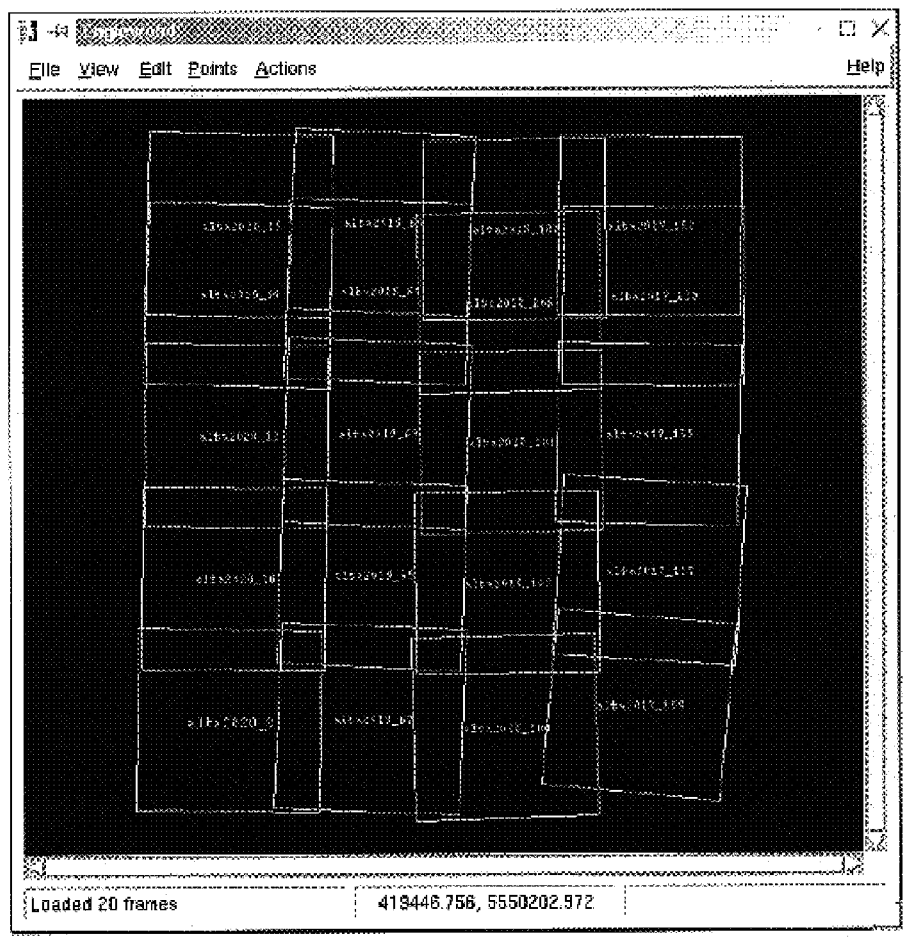
FIG. 12 shows the same screen shot as in FIG. 10, without the image information, showing the frame footprints only, in accordance with the invention.

FIG. 2 shows a screen shot of a small set of images 11, 13, 15 and 17 prior to being subjected to the process of this invention. The context of the four images 11, 13, 15 and 17 is illustrated in FIGS. 10–12, for example. Note the misalignment of image detail, such as for highway portions 19a and 19b. FIG. 3 shows the same geographic area depicted on a composite of the images in FIG. 2, but processed as presented herein. Note the correct alignment of the image detail, such as for highway 19.

The present invention can utilize two different primary coverage patterns, known as full stereo (60% overlap) and sparse stereo (about 20% overlap) as shown in FIGS. 7 and 9, respectively. One aspect of the invention relates to the use of sparse stereo images. However, in accordance with the invention, the method can also handle the conventional full stereo patterns.

Then, in block 14, new digital input imagery is acquired. At the same time, existing control can be acquired and/or independently collected DEM data can be acquired. In preferred embodiments, the digital imagery data for either full stereo or sparse stereo can be derived from a series of aerial photographs taken of the project area.

Each aerial photograph of the series of aerial photographs is commonly referred to as a frame—the full—stereo pattern is established as the overlap area of two consecutive aerial images (frames). The frames are arranged so that considered together, the block of frames covers the geographic extent of the project area for which the digital orthophoto images are being produced. Using a sparse model pattern with 10% overlap, as opposed to using a full-stereo pattern with 60% overlap, 50% fewer images are necessary to complete a project, and processing times are reduced accordingly.

If a film camera is used to take the aerial photographs, the digital imagery data can be obtained by digitally scanning the aerial photographs or using any other image digitizing process. Alternatively, the photographs can be taken using a digital camera which provides digital imagery data directly. While preferred embodiments employ vertical aerial photography as the source of imagery data, other optical sensing technology and various sensor platforms can be used as a source of imagery, including for example, satellite, oblique aerial, and elevated terrestrial photography of the project area. The invention provides for a process of calibrating cameras during block adjustment, called self-calibration. Thus a variety of cameras can be used in the method, including non-calibrated cameras (cameras for which interior orientation parameters are unknown, such as focal length).

The existing control can include ground control points for the project area. Alternatively, the location of the camera during exposure can be measured directly by aircraft navigation systems.

In block 16, DEM data are acquired. In one embodiment, the DEM data are obtained from an external source. However, the DEM data can be derived from the imagery data if an external source of DEM data is not available. By external or existing DEM data it is meant data which are not derived from the newly acquired imagery, but which are obtained from one or more pre-existing or independently acquired DEMs.

The DEM provides elevation or topographical data specifying the topography of the terrain surface. Moreover, the DEM data can be obtained using laser technology (LIDAR), radar measurements, or any other suitable source, including other photogrammetric processes, as long as the terrain data relate to the same geographic extend of the acquired digital imagery.

If the topography has changed significantly in the time between acquisition of the imagery and acquisition of the external DEM data, localized DEM information can be used to supplement the overall DEM data to allow the new digital orthophoto to reflect these local changes. For example, by using laser technology (LIDAR), new terrain data can be created to replace poor or outdated data or to fill in the missing information in old DEMs. Thus, Multi-DEMs can be used, and data selection can be accomplished by a prioritization process whereby the high priority data are used in order of preference in producing the updated digital orthophoto. Preferences can be based on accuracy, currency, or other criteria deemed appropriate to a particular project. To provide this, the invention allows the automated replacement or insertion of a group of DEMs into a group of existing DEMs, and the use of the entire group during orthorectification.

In block 18, an a-priori solution is created from basic assumptions or can be provided as a component of the source data. This information can be obtained from the planning stage, or can be provided by flight navigation. These data provide a "nominal estimate" of where the taking camera was located at the time the aerial photographs were exposed. This allows nominal location of the imagery data with respect to a standard reference coordinate system. This estimate can be done manually or using computer-aided techniques, or obtained using data from the navigation system of the airplane. In accordance with the invention, if this information is of sufficiently high quality, it can be used as control in block adjustment obviating the need for using ground control points.

In block 20, the digital imagery data or pixel data are processed to select or pick points which identify corresponding features in overlapping frames. Block measurement is carried out to determine tie point correspondence. In one embodiment, the points are selected manually using a computer aided point picking process as will be described.

In contrast to the conventional techniques of individual manual image and pair-wise (stereo model) measurement, this invention allows point picking on a block-wide basis. That is, all of the images of the block are displayed, allowing point picking over the entire block. Zooming and panning of the display can be used to facilitate point picking. Also, when point picking is complete, the data identifying the selected points for the entire block are stored all at once. This process significantly increases the efficiency of point picking by opening the files for all of the images in one operation to display the entire block of images, carrying out point picking over the entire block, and then saving all of the modified image files at once. In contrast, conventional techniques typically require opening individual image files or specifying individual stereomodels, modifying the data in that file by point picking, closing the file, and then looping back for the next image or stereomodel, while the operator tries to remember which points he or she picked. This can be a long and tedious operation, particularly when the block is formed from hundreds of image files.

As will be described, in the point picking process, the operator interacts with measurement software in a two-dimensional "world-space" which contains the ensemble of two-dimensional footprints of frames within the block. The world space is viewed "from above" on the computer display and the image footprints and pixel data display can be enabled/disabled by the operator to customize the display. Even if this view "from above" is encountered in most mapping projects, the software described herein can handle certain "oblique" cases if some additional information is known. However, for the purposes of this invention, a near verticality in the images is assumed. The operator interacts with the display by pointing at a screen location (e.g. using computer mouse). The display program transforms the screen location into an associated world location based on current display pan/zoom settings. The measurement software converts the world location information into image selection and approximate image locations which are then displayed to the operator for making subsequent measurements.

The point picking process also incorporates a two-dimensional geometric adjustment (a photogrammetric process known as a planimetric block adjustment), or block wide two-dimensional relative orientation, to rearrange images on a computer screen in order to facilitate point picking. This capability is available on demand by the operator from within the point picking program for a block of images.

In accordance with the invention, the point picking process, block 20, can use external two-dimensional control sources, from digitized map data, raster images, or other sources. Alternatively, it can utilize two-dimensional control in combination with one-dimensional (elevation) information from the DEM to derive fully coordinated, three dimensional control points for use in the photogrammetric solutions. Moreover, the point picking program can calculate the planimetric adjustment on a free-network basis when external control is not available.

The geometric adjustment program, block 22 comprises the photogrammetric process which computes exterior orientation and, optionally, interior orientation. Exterior orientation includes the location and attitude of the taking camera at the time the photographic images are recorded on film or by a digital sensor. Interior orientation includes information pertaining to the taking camera. One embodiment uses an uncalibrated camera (camera for which calibration parameters are not available) to obtain the new imagery. In this situation, the photogrammetric process calculates parameter values related to the optical imaging characteristics of the camera. These parameter values include the three-dimensional location and angular orientation of the camera as well as various parameter values which characterize the camera system projective geometry and optical characteristics (camera calibration data).

Block adjustment is accomplished using a least squares bundle block adjustment program which uses the various measurement data to calculate statistically meaningful estimates of camera position, attitude and optional calibration parameter values for use in subsequent calculations. For example, the photogrammetric process can use the image measurement data to calculate parameters such as the effective focal length of the camera, and parameters indicative of the attitude, location and altitude of a camera for each of the image frames at the time the photographs were taken.

In accordance with the invention, camera self-calibration techniques known from "non-topographic" or "close-range" photogrammetric processes are applied to vertical aerial imagery with sparse stereo geometries. The self-calibration techniques are incorporated into the photogrammetic bundle adjustment program. The basic concept is to introduce the standard perspective camera model parameters into a standard bundle block adjustment program whereby the camera calibration parameters are represented as unknown adjustment parameters. In one embodiment, for refraction, the process according to the invention adapts to accommodate specific local atmospheric conditions, rather than using standardized global average models. Also, for optical distortion and image deformation, the process determines individual or composite effects of optical system and/or film/scanning deformations. In addition, with respect to the principal point, the process calculates these parameters without the need for fidicial measurements. With respect to the principal distance (focal length), the process calculates this parameter in cases where sufficient additional control data are provided or the ground terrain surface exhibits sufficient elevation variation.

Block 22 accepts image measurement data along with various optional control data values. The measurement and control data are used to perform a photogrammetrically rigorous geometric bundle block adjustment. Control data can include ground control point coordinates and/or camera position measurements and/or elevation data from a DEM, such as those expressed in a Digital Elevation Model (the DEM) These optional reference data can be introduced to block 22, optionally, as represented by the dashed line 25, and/or can be introduced in block 20 during the point picking process.

In accordance with the invention, the geometric block adjustment program can use external two-dimensional planimetric control sources, from digitized map data, raster images, or other sources, in combination with one-dimensional vertical control information from the DEM to derive fully coordinated control points for use in the photogrammetric solutions. The geometric block adjustment program can calculate the block adjustment on a free-network basis when external control is not available.

Points having high residuals, i.e., large discrepancies between measured and best estimate values, can be used to identify potentially poor measurements. The measurement can then be redone, as desired, in order to correct bad measurements and improve the quality of the photogrammetric solution. This is represented by the feedback loop 23 from the geometric block adjustment, block 22, to the point picking process, block 20.

The results of the final calculations provide a geometric solution suitable for use in orthorectification. As an option, reference data obtained from the external DEM can be utilized to contribute an elevational coordinate which can be utilized as a control value on tie points computed in the photogrammetric process prior to orthorectification.

In block 24, the imagery data are orthorectified on a frame by frame basis to remove topographic relief induced image displacements. In one embodiment, the rectification process utilizes Multi-DEMs organized in a priority order, often in the order of accuracy. In contrast, conventional rectification processes rectify images onto a single DEM.

An important aspect of image processing is that any processing operation can only degrade the information content of imagery or at best leave it unchanged. Because of this, successive application of multiple resampling operations causes unnecessary degradation of image quality. It is not uncommon in conventional image processing systems that the image is first resampled for rectification to the surface as expressed in one map projection and then resampled subsequently to transform into another map projection. The process according to the invention includes the map projection and all other transformations into a single transformation that is implemented during a single, one-step resampling operation.

Block 26 performs a radiometric block adjustment solution which provides intensity and color balancing within each single image and also relative adjustment to match intensity and color between adjacent images.

In block 28, the radiometrically adjusted orthorectified imagery data are used to produce a mosaic representing the total geo-referenced image over the project area. In accordance with the invention, in one production process, pixels from hundreds of scanned photographs of a project area being imaged are tied together and then corrected to one another as a seamless image in computer space.

The resultant product is a new digital orthophoto that has been produced with all new digital imagery, or pixels. The new digital orthophoto fulfills all the mapping characteristics of an orthophoto image product. Additional post processing can include partitioning the image product into individual tiles and file formats according to customer specifications. Then, in step 29, the final orthophoto data are formatted for packaging in a media suitable for the intended application for the digital orthophoto.

In accordance with one aspect of the invention, the setup step process is performed using data associated with an inexpensive uncalibrated camera can be used to acquire photographic imagery. The photogrammetric process, block 24, includes a self-calibration procedure wherein the current imagery data, the existing DEM and mathematical processing are used in calculating parameters such as the location and the attitude of the camera and optical system parameters including calibration information about the camera.

Interior orientation is computed based on imagery data rather than being based on camera reference marks. This obviates the need for carrying out a fiducial measurement process to register the image to the camera coordinate system. Therefore, fiducial marks are not required. Instead, additional calibration parameters are used to determine interior orientation directly. Therefore, the digital orthophoto production process in accordance with the present invention does not require the use of fiducials nor measurement of the corners of the image. Moreover, in accordance with one embodiment of the invention, this processing can be carried out on digital imagery data acquired using vertical aerial photographs including vertical aerial photographs taken with sparse stereo configuration.

In accordance with another aspect of the invention, two types of free-network adjustment are used to improve the quality of tie point measurements during and/or after point picking activity. A two-dimensional, free-network adjustment is used as an incremental solution performed within the image display and measurement process step to facilitate point picking. A three-dimensional, free-network adjustment is performed within the geometric block adjustment step as a quality control step to assess the quality of the point measurements. Moreover, the free-network adjustment can be used to define a viable coordinate system in situations where control data are not available.

The photogrammetric adjustment solution can be computed using a free-network adjustment or on a controlled adjustment basis. If none of the tie points is associated with a control point, the solution can be computed on a free-network basis. This involves computing a complete three-dimensional photogrammetric solution in three-dimensional space, effectively producing a block-wide photogrammetric relative orientation. However, if seven or more tie point or exposure station world coordinate values are available as control measurements, the solution can be computed on a controlled basis.

In accordance with another aspect of the invention, an approximate utilitarian orthophotoimage can be produced entirely without control by utilizing a free-network adjustment and including an approximately true assumption about photographic configuration. A typical instance of this process is to employ an assumption which is valid for most vertical aerial photographic configurations, viz., that the image exposure locations are approximately coplanar and/or that, on average, the look direction of images in the block is approximately aligned with the vertical. Introducing this assumption as the starting point for a free-network adjustment provides a photogrammetric solution that is, to a reasonable degree of approximation, aligned with the true vertical. These adjustment results are then used to produce image products which are orthorectified (to within a reasonable degree of approximation) but with unspecified geographic location and scale. The unspecified parameters can be established outside of the invention processes e.g., using image registration tools and techniques common within the GIS industry.

Computer System

Figure 4:
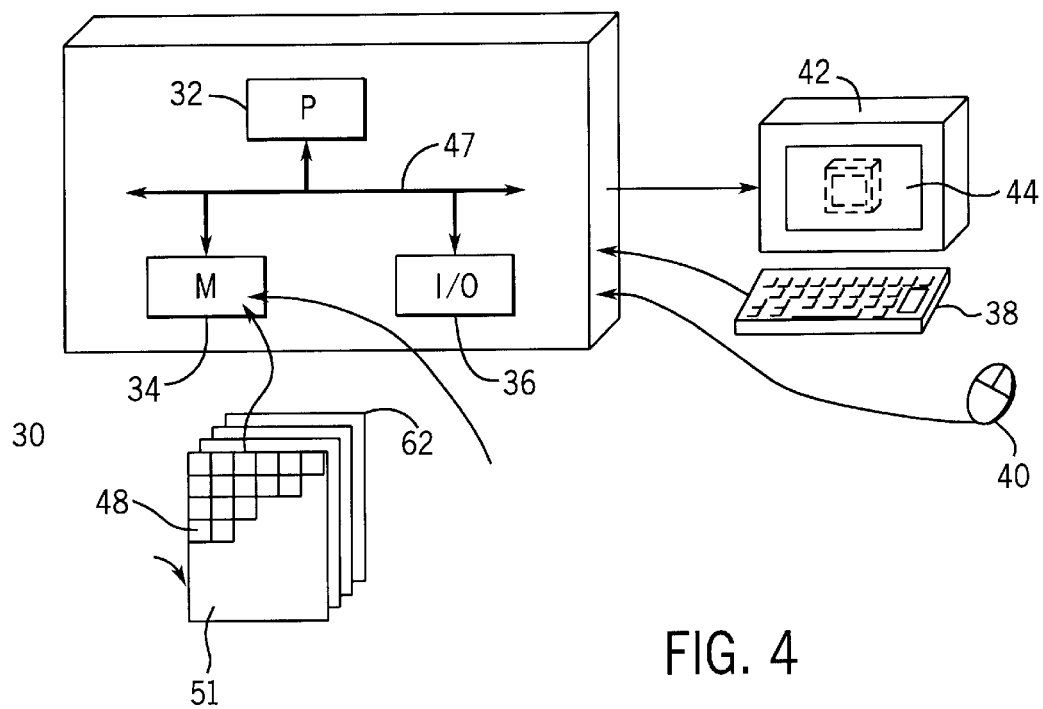
FIG. 4 is a representation of a computer system for use in carrying out the process of FIG. 1.

Referring to FIG. 4, the digital orthophoto production process according to the present invention can be carried out using a computer system 30. The computer system 30 includes a processor 32 and memory 34. The memory 34 can include read only memory (ROM) and random access memory (RAM). The processor is connected through suitable input/output interfaces 36 to input devices, such as a keyboard 38 and a mouse 40 and to output devices, such as a display device 42 having a display screen 44. The processor 32, the memory 34 and the input/output interfaces 36 can be interconnected by bus lines 47.

Figure 5:
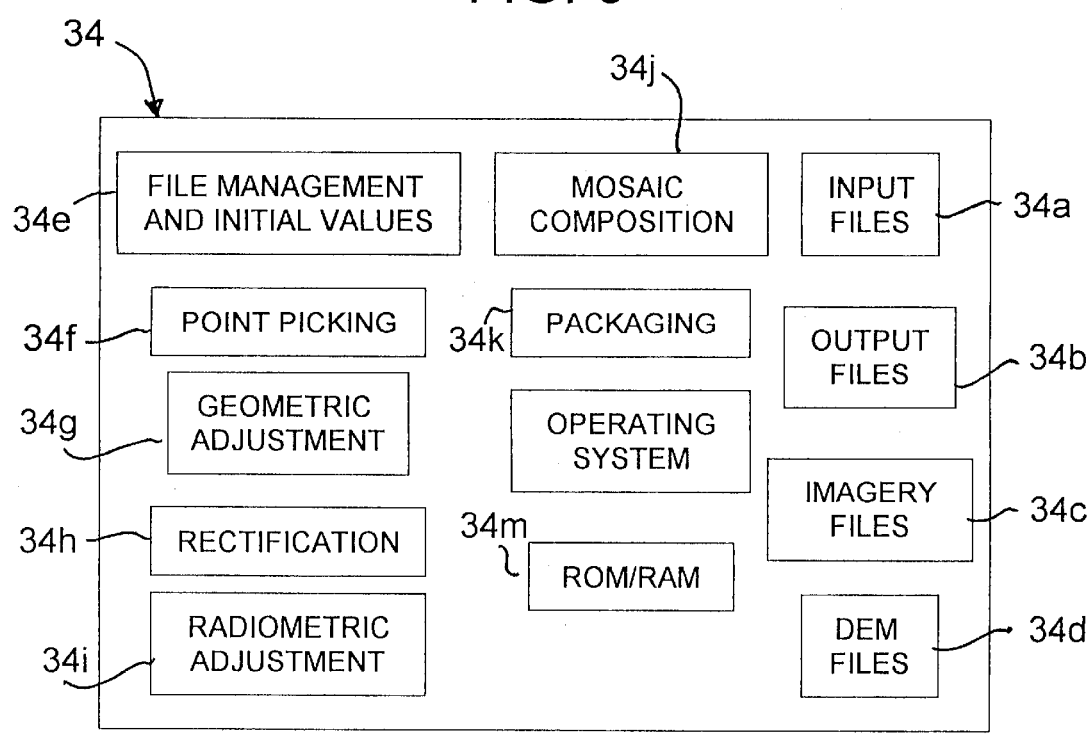
FIG. 5 is a representation of the memory of the computer system of FIG. 4.

In one embodiment, the memory 34 includes input files 34a, output files 34b and imagery files 34c. The newly acquired digital imagery or pixel data 48 for the sequences of frames 51–62 of images is stored on disc in the memory 34. The pixels encode the measured light intensity and color values representative of the photographed scene. Digital data representing the DEM can be stored in the memory 34 in a file DEM 34d, FIG. 5. Memory 34 also can include ROM and RAM for read only or temporary data storage.

Figure 6:
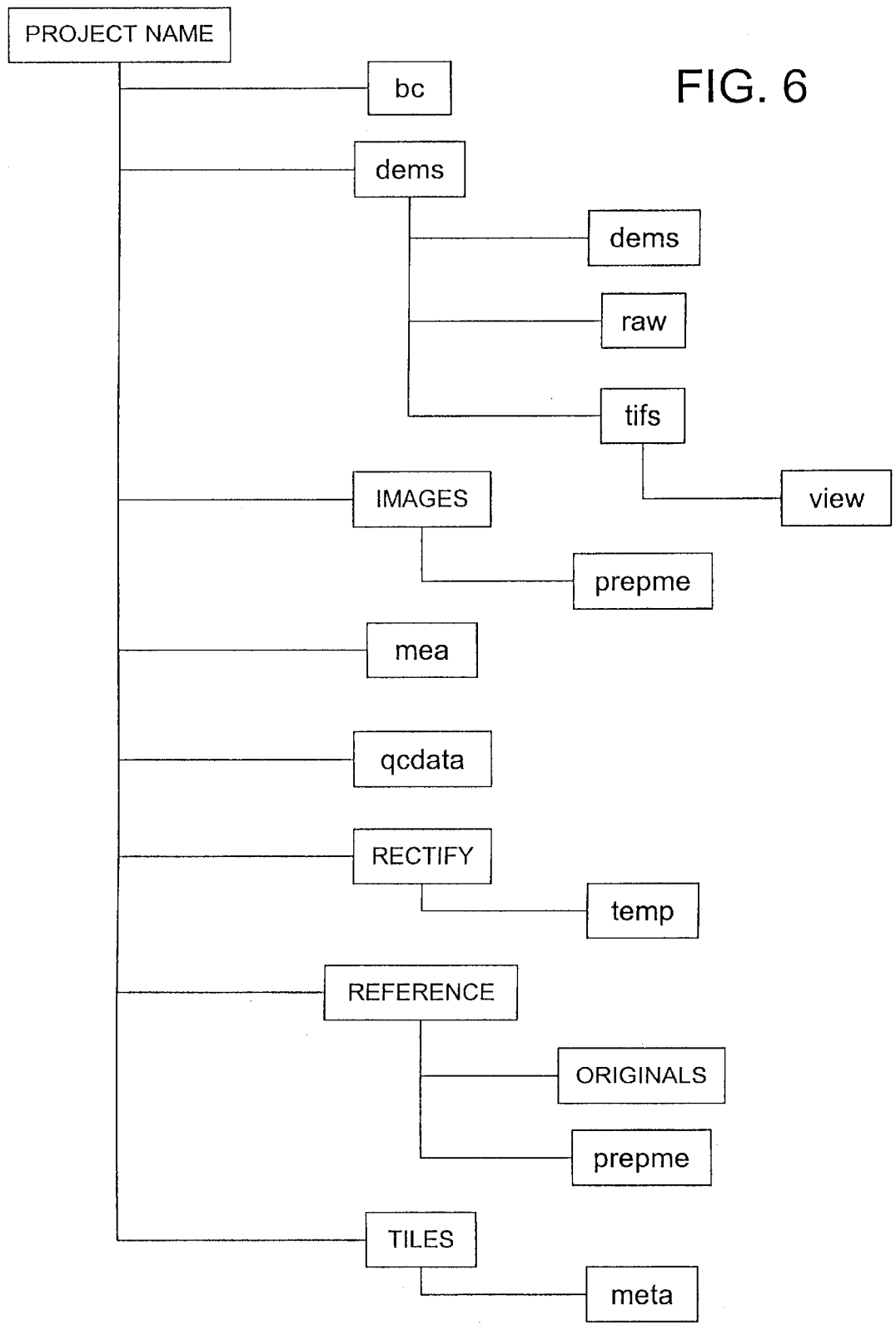
FIG. 6 is a sample directory structure of the computer system of FIG. 4.

FIG. 6 illustrates a sample directory structure used in the digital orthophoto process. Folder "bc" contains the bundle adjustment information. Folder "dems" is the work space for the DEM's. Folder "dems.dems" contains formatted DEM and Multi-DEM files. Folder "dems.raw" contains raw DEM data, which can include XYZ, ASCII files, USGS CDO format and USGS SDTS format, for example. Folder "dem.tifs" contains the tifs created from formatted DEM's. Folder "dems.tif.view" contains individual TIF files for viewing. Folder "images" contains preprocessed tile TIFF images. Folder "images.prepme" contains un-prepped TIFF images. Folder "mea" contains the measurements files for data obtained from point picking. Folder "rectify" is the work space for rectification. Folder "rectify.temp" contains temporary files created during orthorectification. Folder "reference" contains the image reference files. Folder "reference.originals" contains the reference image files if they need to be adjusted before final incorporation into production. Folder "reference.prepme" contains reference images that need to be converted to tiled TIFF's. Folder "tiles" contains the output tiles from the mosaicking process. Folder "tiles.meta" contains the metadata generated and utilized by the OrthoVista program.

The image data files include all of the image data. These files are created by scanning film images or are provided directly from a digital sensor system.

The "*.mea" point files contains image coordinate location data about every measured tie point and control point. This file is created by the export to bundle program in the point picking program.

The "bc.opc" file contains information and world coordinate data for control points. A flag can be set for each record to indicate if coordinate values for the associated point should be used as a control measurement and if so, which coordinate or combination of coordinate values.

The "bc.img" file contains apriori image station and attitude data. If a flag is set in a specific image record, then the station location values are treated as station control measurements (in addition to being used as a-priori initial value estimates) in the bundle adjustment process.

The "bc.cam camera data" file contains data pertaining to camera calibration parameters. These values are treated either as known values to be held fixed or as crude initial estimates to be replaced during self calibration computations. The interpretation depends on the settings in the "bc.cal" file.

The "bc.cal camera setting" file contains data pertaining to camera settings. This file contains a set of data flags, which control the, if any, camera settings, will be computed during self-calibration processes.

A "DEM data" file in memory 34 stores the DEM data.

Output files 34b stored in memory 34 include a "bundle adjustment output" file and a "rectified imagery data" file. The "bundle adjustment output" file is a text output file into which the bundle results are written. The "bundle adjustment output" file contains all the camera interior and exterior orientation information necessary to orthorectify the imagery in the project.

Computerized processes also are stored in memory 34 as instructions of software programs. These software programs include programs 34e for managing data files and computing various initial value estimates; programs 34f for the point picking process, including the main display, point picking and planimetric adjustment; programs 34g for the geometric block adjustment process, including controlled solution program and a free-network solution program; programs 34h for the orthorectification process including a generate footprint program, a generate resample program, and a perform image sampling program; a program 34i for radiometric block adjustment; a program 34j for mosaic composition; and a program 34k for packaging the digital orthophoto that has been produced. The software programs operate under the control of an operating system 34m.

The alignment of the images for the plurality of frames and the additional processing to remove seams can be accomplished automatically, using the computer system 30, allowing the image alignment and combination to be computer aided. The operator can use the mouse to manually select points on the processed images and cause those images to be aligned under computer control.

Detailed Description

Considering the sparse model digital orthophoto production process in more detail, for purposes of illustration of the process according to the invention, it is assumed that a series of aerial photographs has been taken using a frame camera.

As is stated above, a standard metric mapping camera or an uncalibrated camera can be used to take the aerial photographs. To optimize the imagery that will be obtained, the type of film to be used is predetermined prior to taking the aerial photographs, along with the number of exposures to be taken, and the amount of overlap between frames. The number of can be determined using nominal image ground footprint sizes such that the project area plus a safety margin is sufficiently covered by planned exposures.

As to overlap, a typical geometry for sparse stereo includes 10–20% in each direction (side and forward overlap). Conventional stereo geometry requires greater than 50% overlap in one direction and typically includes 20–30% in the other direction. Higher overlaps can be used in special situations, such as 80%. The percent overlap is specified in the forward and side directions between adjacent images, and the images can be acquired using either sparse stereo or full stereo.

When camera calibration data are available, the camera calibration data are stored in a computer file. Camera calibration data typically are provided as part of a USGS Camera Calibration Certificate, or equivalent information, specifying the fiducial mark locations, principal point, principal distance and radial distortion values. When camera calibration data are not available, any camera parameters required for the digital orthophoto production process are derived from image measurement data, according to the invention, as long as sufficient ground elevation data are available. Derived parameters are functionally equivalent to those provided in a typical camera calibration report.

The camera calibration constants include the photographic principal point, principal distance and optical distortion parameter values.

Imagery obtained from a series of aerial photographs is scanned to produce the new digital imagery. The aerial photos can be scanned at any convenient pixel size or resolution. Typically, the scanning pixels size is within the range of about 500–3,000 dots per inch (dpi), but more commonly, in the range of about 1000–2000 dpi. When scanning a full 9"×9" frame (nominal size) of aerial photography, at 1,000 dpi, the number of pixels in each row (and also in each column) of the image is approximately 9000 pixels.

In preferred embodiments, the image data for either full stereo or sparse stereo can be derived from aerial photographs.

Figure 17:
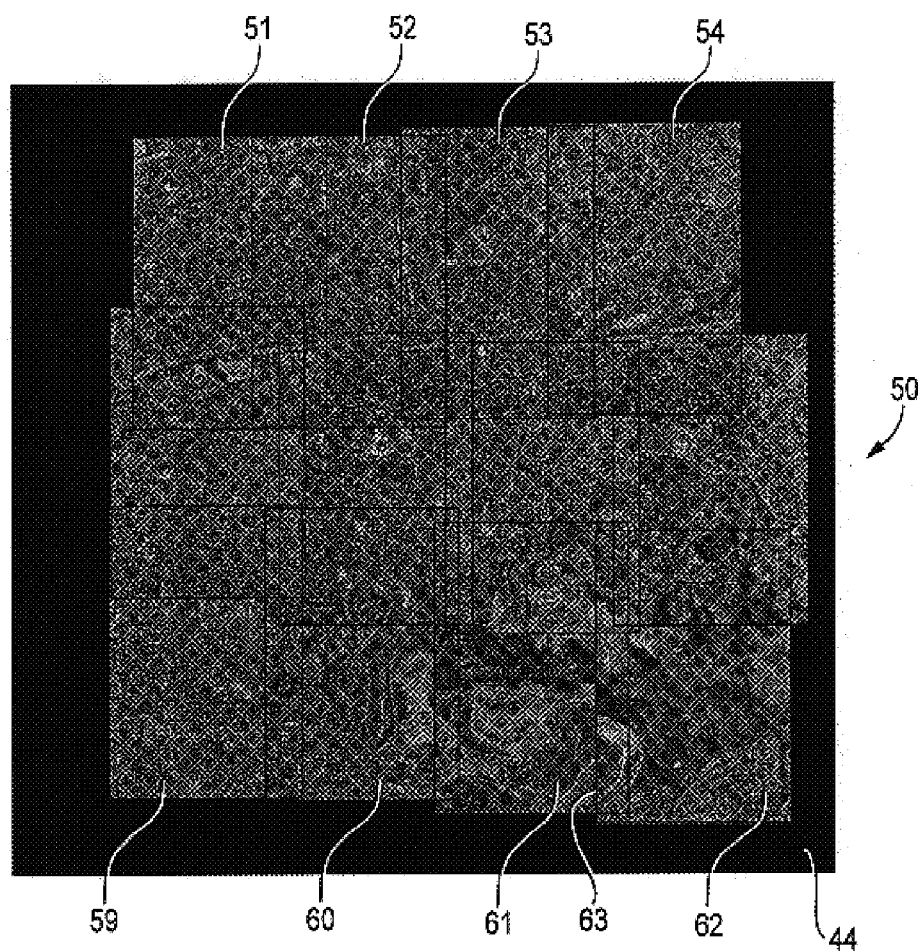
FIG. 17 is a screen showing a plurality of frames of raw image data.

Reference is now made to FIG. 17 which is a sample screen showing a plurality of frames 51–62 of raw imagery derived from a plurality of scanned photographs (or taken with a digital camera). The digital imagery data for producing the raw imagery illustrated in FIG. 17 is stored in memory 34. The program causes the frames 51–62 to be displayed on the display screen 44, arranged to form a block 50 of frames prior to electronic processing of the digital imagery data. The digital imagery data is electronically processed to align the images as will be described. The point picking program displays the frames 51–62 of raw imagery in locations based on the a-priori location values obtained from the coordinate system with the correct units.

For purposes of illustration, the block 50 is shown to be composed of only twelve frames 51–62 arranged in a matrix having four columns and three rows. However, it will be understood that producing digital orthophotos typically would involve the use of a very large number of frames, and can include hundreds of scanned photographs.

Referring to FIGS. 7 and 9, which are simplified representations of a block of frames, the type of image data that is used can be full stereo, illustrated in FIG. 7, or sparse stereo, illustrated in FIG. 9.

In FIG. 7, by way of example, eight frames F1–F8 are arranged in the block for full stereo. As illustrated in FIG. 7, in full stereo, the overlap between adjacent photos or frames is greater than 50% in at least one direction, as indicated generally by reference numeral 64. Typically, for full stereo, the amount of overlap between adjacent photos or frames is on the order of about 60%. Moreover, the picked points, such as points 65, are located within a stereo overlap portion of the project area. For conventional stereo flight configurations, the points can be selected in the well known Von Gruber pattern, shown best in FIG. 8, where only two of the frames F1 and F2 are illustrated for simplicity.

According to the invention, in sparse stereo, the overlap between adjacent photos or frames typically is on the order of about 10% to 20% in each direction, as represented by regions 121–123, for example. In sparse stereo, all of the picked points, such as points 147 and 149, are located within a small portion of the project area.

More specifically, with reference to FIG. 9, by way of example, twelve frames F1–F12 are arranged in a block of sparse stereo. Each of the frames F1–F12 overlaps with adjacent frames. For example, frame pairs F1,F2; F2,F3 and F3–F4 define "vertical" overlapping regions 121–123 (as viewed in FIG. 9), respectively. Similarly, frame pairs F5,F6; F6,F7 and F7,F8 define "vertical" overlapping regions 124–126, respectively. Frame pairs F9,F10; F10,F11 and F11,F12 define "vertical" overlapping regions 127–129, respectively. Moreover, frame pairs F1,F5 and F5,F9 define "horizontal" overlapping regions 131, 132 (as viewed in FIG. 9); and frame pairs F2,F6 and F6,F10 define a "horizontal" overlapping regions 133, 134. Frame pairs F3,F7 and F7,F11 define "horizontal" overlapping regions 135, 136 and frame pairs F4,F8 and F8,F12 define "horizontal" overlapping regions 137, 138, respectively.

Note that portions of regions 124–126, for example, also overlap portions of regions 121–123 and 127–129.

Also note that portions of regions 131 and 132, for example, also overlap portions of regions 133 and 134, respectively.

The overlapping of four frames, such as frames F1, F2, F5 and F6, defines a four-way corner, such as corner 141. Further corners are indicated by reference numerals 142–146.

FIG. 10 shows a screen shot of a smaller block of sixteen unadjusted images. FIG. 11 shows the same block of sixteen images with the resulting image footprints, and FIG. 12 shows the footprints only. In FIG. 12, each image is identified uniquely by a legend. In the exemplary block of images, the legend for each image includes a project identifier "alta20, a flight identifier, such as flight "17" for the image located in the lower right hand corner of the block, i.e., the "sample image", and a frame number, such as frame number 159 for the "sample" image. Thus, the identifier for the "sample" image is "alta2017_159". Note that the four images which are aligned vertically along the right hand side of the block all have the same flight number "17". A detailed view of a set of images having a four way overlap would be similar to the set of four images shown in FIG. 2, but the later set of images being shown in FIG. 2 prior to adjustment.

Points are picked or measured in a standard pattern. In one embodiment, a point is picked in each four-way corner, and at least three points are selected in each two-way overlapping region located between corners. Each overlapping region located between one corner and an outer edge of the block includes at least four points. Thus, for example, overlapping region 124 which is located between corner 141 and corner 142 includes at least three points 147. Overlapping region 121 between corner 141 and the upper edge 148 of the block includes at least four points 149. Thus, at least five points are selected or measured in common between each adjacent pair of frames. While five points are sufficient for carrying out a three dimensional adjustment, a minimum of six points are generally selected between adjacent frame pairs to provide redundancy in the adjustment process.

Figure 18:
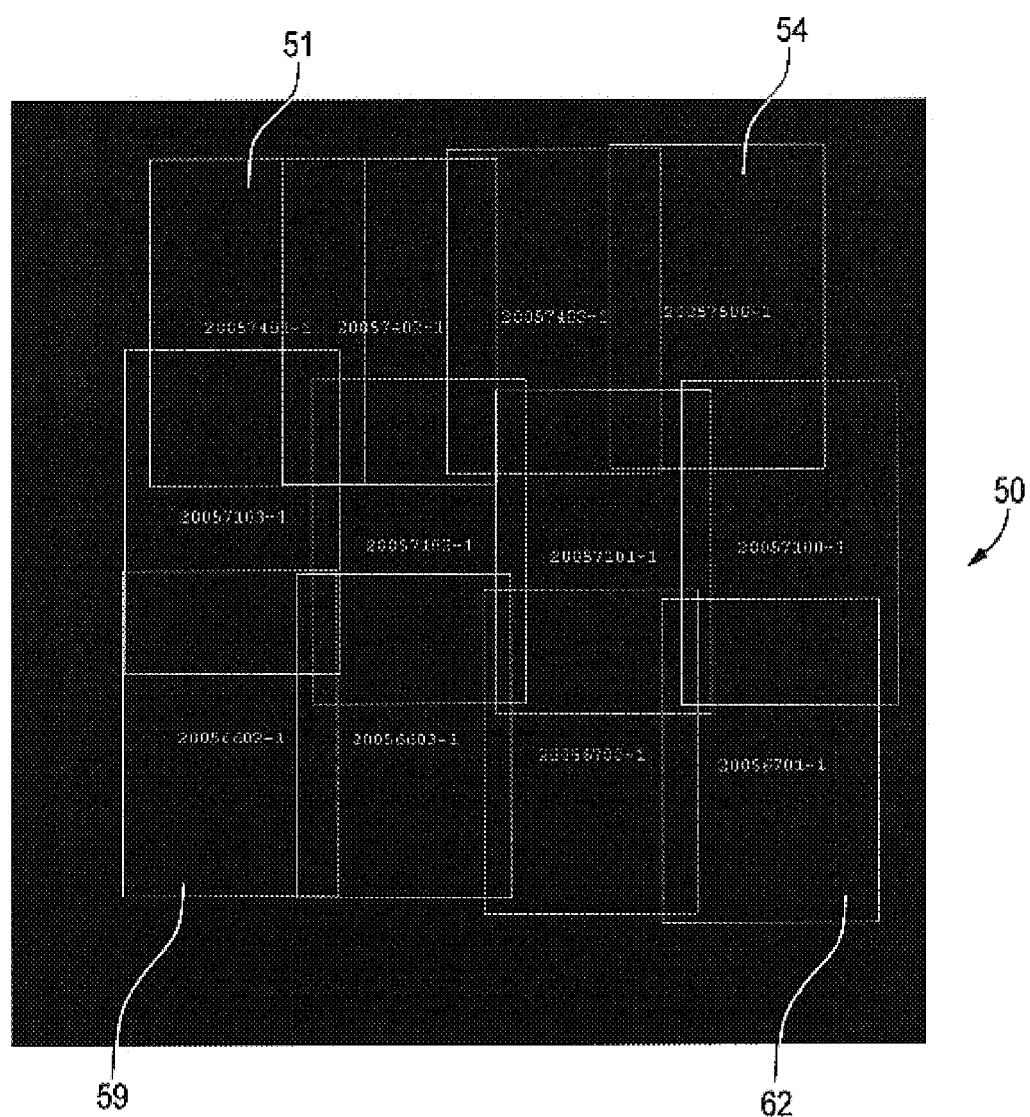
FIG. 18 is a screen showing footprints of the frames of FIG. 17.

Referring again to FIG. 17, close examination of the raw imagery reveals non-aligned edges, such as edges 63, and a reddish hue. The outline of the original image footprints is shown in FIG. 18. Although these photo images look somewhat aligned, inspection reveals that the images have mismatched edges as can be seen better in FIG. 17.

Point Picking Process

The main function of the point picking process is to make measurements in digital imagery so that a geometric solution can be calculated based on photogrammetric relationships. These measurements are made by identifying corresponding features in overlapping imagery. The measurements are called tie points and the procedure is called point picking.

The point picking process involves displaying all of the imagery in the block on the display screen 44 (FIG. 4), zooming and panning, and the use of the mouse 40 to select common points on overlapping frames. The point picking process, according to the present invention, involves displaying at once all of the imagery in the block, which can consist of hundreds of images. In contrast, known point picking processes used with conventional stereo geometries typically are limited to picking points in one or two frames at a time.

In accordance with the invention, the point picking process can use external two-dimensional control sources, from digitized map data, raster images, or other suitable sources.

There are two kinds of image measurements, namely, absolute or control points and relative or tie points. The control points are measurements of the same feature in images for which coordinate reference data are available. The reference data can include known coordinates, derived from the location of another georeferenced image, or be derived by evaluation (often involving interpolation) of a surface elevation model. The tie points are common points on two or more adjacent images. The tie points are measurements of the same feature in different images without reference data.

Some or all of the control and all of the tie points are picked for all of the pairs of overlapping frames in the block 50 of frames 51–62.

Flow Chart for Point Picking Process

Figure 13:
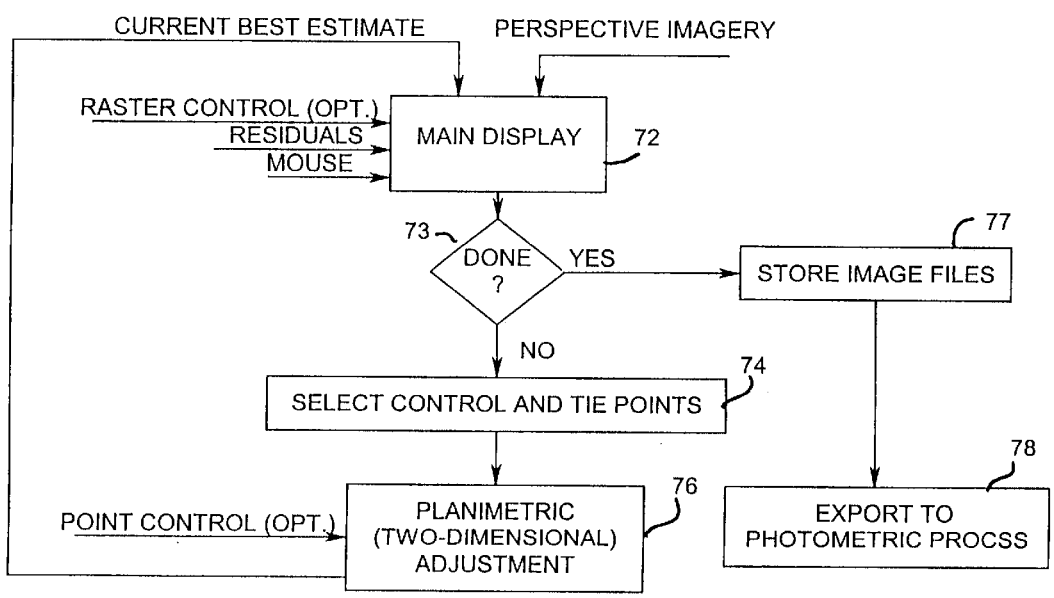
FIG. 13 is a process flow chart for a point picking program of the digital orthophoto production process of FIG. 1.

Reference is now made to FIG. 13, which is a process flow chart for the point picking process. The point picking process includes a main display program, block 72, a control and tie point picking program, block 74, a planimetric adjustment program, block 76, image file storage, block 77 and an export to photogrammetric process, block 78.

More specifically, with reference to FIGS. 4, 13 and 17, perspective imagery is supplied to block 72 along with a current "best position estimate" which is obtained from the "a priori" information. A further input to block 72 is operator supplied input produced using the mouse 40. In addition, external control, such as raster image control data, can be supplied optionally to block 72. Also, external point control optionally can be supplied to block 76. Thus, raster image control can be supplied to block 72 and point control can be supplied to block 76. Alternatively, raster image control can be supplied to block 72 without point control being supplied to block 76, or point control can be provided to block 76 without raster image control being supplied to block 72. Moreover, neither raster image control nor point control can be provided. In the latter case, where no control is provided, a free-network solution can be produced by the point picking program, as will be described.

In accordance with the invention, points are selected in two or more runs through blocks 72–76. Initially, corner points, such as corner points 141–146 (FIG. 9), are selected in block 74. The process flow continues through block 76 which calculates adjusted imagery data and the flow is returned to block 72, updating the current "best position estimate". On the second, and any successive passes, additional points can be selected by the process of block 74.

In one embodiment, after a number of new points are picked, the operator selects the software "update" command which causes the displayed frames are adjusted in position.

Block 72 initially causes the imagery data for the block of frames 51–62 to displayed on the screen 44 as raw image data, as shown in FIG. 17.

Raster image control data are supplied to block 72. The planimetric control can include a raster image, such as a previously generated (i.e., earlier generation) digital orthophoto of the orthophoto currently being produced, a digitized map of the area for which the digital orthophoto is currently being produced, or any other suitable georeferenced planimetric data.

The raster control images are displayed as geo-referenced imagery which allows the pixels to be related to world coordinates through a "transformation", as is known in the art. Typically, the georeference transformation is based on a standard two-dimensional conformal transformation (4-parameter: 2-shift, 1-scale, 1-rotation) or an affine transformation (6-parameter: conformal plus 1-shear, 1-stretch). The point picking program uses the geo-referenced imagery to provide the same function as planimetric ground control points obtained by a conventional survey. However, the raster imagery provides tens of thousands of pixels whereas a ground survey provides only a few isolated points.

Main Display Program

Figure 14:
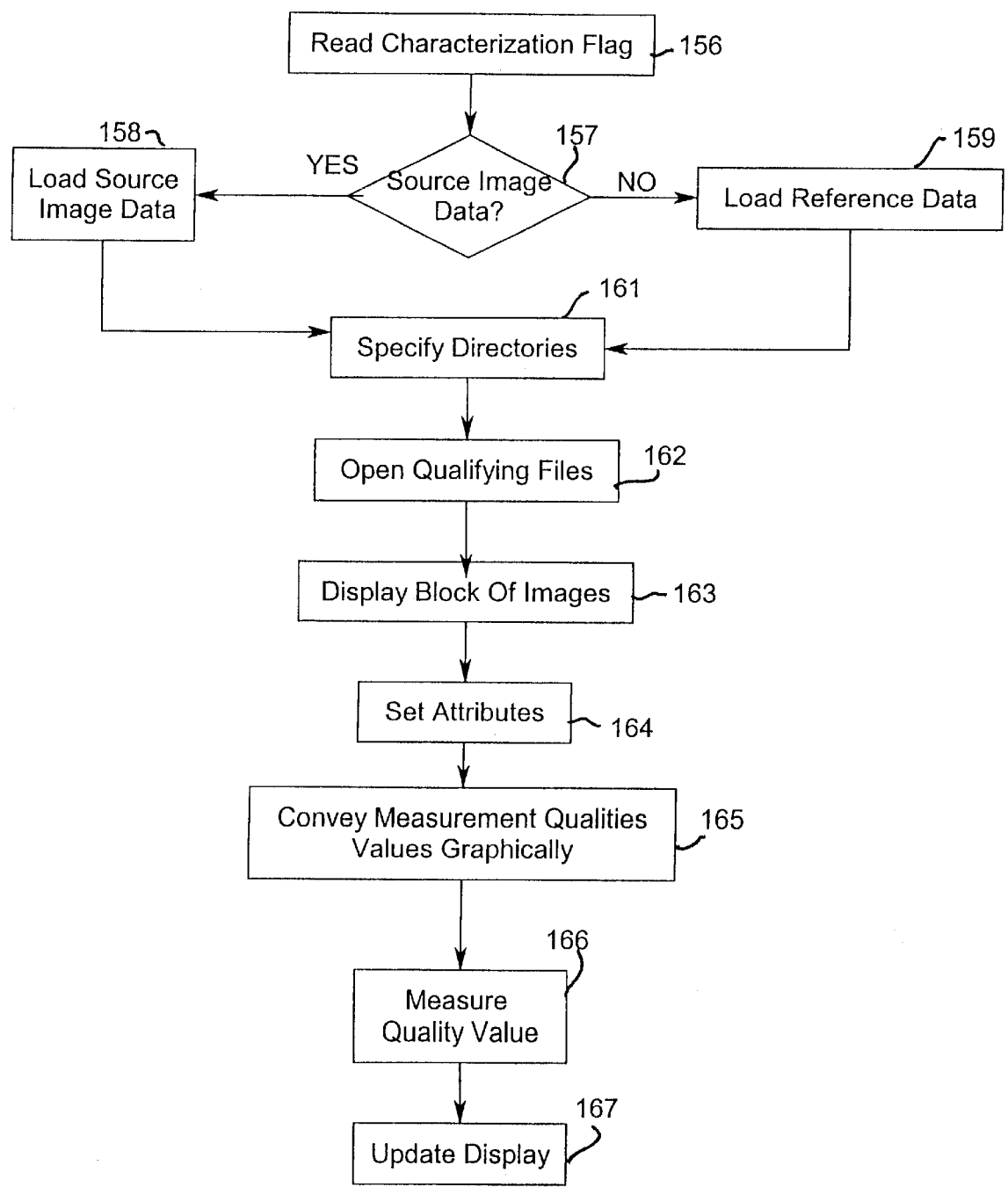
FIG. 14 is a process flow chart for a main display process of the point picking program of FIG. 13.

Referring also to FIG. 14, which is a process flow chart for the main display program (block 72, FIG. 13), block 156 reads a characterization flag. The characterization flag is set to a first state, or tie point state, in response to the operator selecting a "pick a tie point" option from the main menu and is set to a second state, or control point state, in response to the operator selecting a "pick a control point" option from the main menu. In one embodiment, selecting the tie point option causes the cursor to be displayed as a "+" sign (or a circle o) and selecting the control point option, causes the cursor to be displayed as a triangle glyph "Δ" to provide a visual indication to the operator of the mode in which the point picking program is operating. The operating mode is changed using the menu option on the main menu.

If the flag is set to the tie point state, this indicates that only new imagery will be displayed so that the operator can identify the point location in this image. If the flag is set to the control point state, this indicates that raster reference data will be displayed for operator point location in addition to the source image data that are displayed for point location. The program operates the same regardless of the type of image data being presented to the operator for point measurement. The manner in which the data is stored is the same. The source and reference data include image data and data providing a world-to-image transfer relationship for the associated image data.

Of many types of transforms which are supported, one embodiment utilizes the industry standard "World File" format popularized within the Geographic Information Systems (GIS) product "ArcInfo" by ESRI. With this convention, the image-to-world transformation, which is referred to herein as "tfwinfo", is a six parameter affine transformation in the form of:

$$x' = Ax + By + C \quad (1)$$

$$y' = Dx + Ey + F \quad (2)$$

where (x',y') are coordinates of a map location; (x, y) are column/row locations in pixels; A is the x-scale dimension of a pixel in a column X; B,D are rotation terms; E is the negative of y-scale, pixel Y dimension; C,F are translation terms; and x,y the map coordinates of the center of the upper-left pixel.

Formulae for the elements of this file are given in the following relationships:

$$A = \cos(\text{heading}) * gsd; \quad (3)$$

$$D = -\sin(\text{heading}) * gsd; \quad (4)$$

$$B = -\sin(\text{heading}) * gsd; \quad (5)$$

$$E = -\cos(\text{heading}) * gsd; \quad (6)$$

$$C = tx; \quad (7)$$

$$F = ty. \quad (8)$$

where gsd is ground sample size (pixel on ground); heading is clock-wise from North to column 'up'; tx=east of center of the upper-left pixel; and ty=north of center of the upper-left pixel.

By way of example, for an image with pixel size of 3.0 ground units, no rotation, and CENTER of upper-left pixel location at 17.0 East, 23.0 North, the values for equations (3)–(8) are:

3.0
0.0
0.0
−3.0
17.0
23.0

For an image with pixel size of 3.0 ground units, +30° of rotation (i.e., in the "up" direction of image), column points 30° East of North, and CENTER of upper-left pixel location at 17.0 East, 23.0 North, the values for equations (3)–(8) are:

2.98076
−1.50000
−1.50000
−2.98076
17.0
23.0

For reference data, the world-to-image transformation is exact and is held fixed. For source data, the world-to-image transfer relationship is approximate and can be modified during subsequent steps, e.g., during two dimensional planimetric adjustment. The approximate transformation parameters can be obtained, for example, from flight plan information or from a-priori assumed values.

If decision block 157 determines that the program is operating in the tie point mode, then source data are loaded, block 158. By selecting the tie point option, the operator specifies directories which contain the imagery data for the frames 51–62. On the other hand, if decision block 157 determines that the program is operating in the control point mode, then both source data and reference data, such as raster control images, are loaded, block 159.

Block 162 opens qualifying data files, and block 163 uses the current "best estimate" planimetric orientations to display the block of images on the screen 44. All of the image files for the block are opened at the same time and the entire block of images is displayed on the screen. This allows point picking to be carried out on the entire block without opening and closing individual image files during point picking across the block.

The footprints for source images can be displayed in one color and the footprints for raster control images can be displayed in a second, different color, providing visual feedback to the operator. Point measurement data are displayed with appropriate symbology and attributes. In one embodiment, source images are displayed in red, reference images are displayed in white, tie points are displayed as circle glyphs, and control points are displayed as triangle glyphs.

Figure 15:
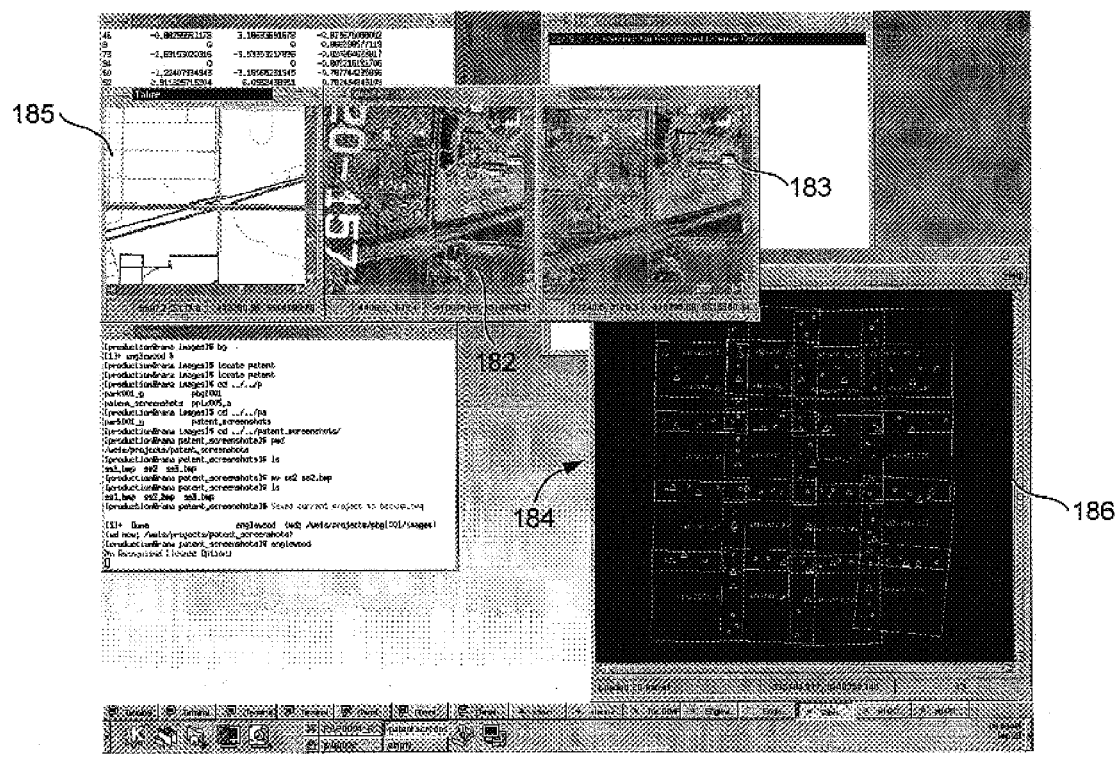
FIG. 15 is a screen shot that shows the two pop-up windows that are used for simple overlap point picking, in accordance with the invention.

In one embodiment, clicking within a footprint or within overlap area of multiple footprints causes the corresponding images to be displayed (See FIG. 15). When the program is operating in the tie point picking mode, only the source images are displayed. When the program is operating in the control point picking mode, both the source and reference imagery are displayed, as seen in FIG. 15.

Block 164 sets display attributes. The display attributes are used in the control and tie point picking process, (block 74), to provide a geographic measurement display that provides to the operator information about measurement quality. The measurement quality values, typically measurement quality metrics are conveyed graphically, block 165. In one embodiment, the attributes can be displayed as a modification in color or intensity of the pixels, and/or as symbols.

During tie point picking (block 74), the program opens pop-up windows for each source image predicted to contain the selected tie point. During control point picking, the program opens a pop-up window for each source image expected to contain the selected control point and a pop-up window for those reference images containing the selected control point. This is based on inverse and forward transformation via the parameters of the image-to-world transformation "tfwinfo". As is stated above, the characterization flag suppresses opening of reference data images when tie points are being selected. Opening of source data images for tie point measurement is the default condition.

Each operator selected screen location is converted to a "world space location" based upon pan and zoom settings. Internally the software uses a transformation equivalent to the image-to-world transformation "tfwinfo", but in which "world map" is replaced by "world space" and "image" is replaced by "screen" pixels. This step converts the operator mouse click into an x,y coordinate pair in world coordinates. For each image in the block, the "world (map) coordinates" are transformed into image coordinates using the current "best estimate" world-to-image transform parameters.

Figure 19:
FIG. 19 is an enlarged view showing a pair of overlapping frames.

Referring again to FIG. 13, decision block 73 determines whether selection of control and tie points is to be carried out. Assuming the current pass is the initial pass, then, block 74 allows control and/or tie points to be picked manually for each pair of overlapping frames by selecting pairs of overlapping frames in sequence. The points picked can be all control points, all tie points, or a combination of control points and tie points. Reference is now made also to FIG. 19, which illustrates image window views of two adjacent frames (identified, respectively, as alta2018_100 and alta2018_102 at the tops of the frames) of the block of FIG. 17, prior to adjustment. The image windows have been zoomed-in to enhance the depiction of the frames herein.

FIG. 19 illustrates the predicted location for points 68 and 69 in images 100 and 102, respectively, based upon the current "best estimate". Note the significant distance between point 69 in image 102 and point 68 in image 100.

Figure 20:
FIG. 20 is view similar to that of FIG. 18 with a pair of control points selected on the two frames.

FIG. 20 is view similar to that of FIG. 19, and shows picked points 68 and 69, after remeasuring the point 69 such that points 68 and 69 are in corresponding locations in both of the images.

In one embodiment, the control and tie points are picked manually using the mouse 40 to click on the features in each pair of adjacent images of the block. Image windows are selected using the mouse to click on an area in which footprints of two or more frames overlap frames. The mouse 40 is used to pick common points in overlapping areas of adjacent frames. Points normally are picked in all areas of overlap.

When using raster reference imagery which has an abundance of control point candidates, typically two control points and four tie points are picked per frame in adjacent frames, including pairs of frames which are located either in side-by-side or one-above-the-other relation Subsequently, the control points are referenced to ground (elevation) as will be shown. The image windows can be zoomed-in to make point picking easier.

Point Picking

More specifically, with reference to FIG. 22, the results are the image coordinate values measured for this point in each (source & optional reference) image. Coordinate values are stored internally in data records of the form:

Image-identifier, Point-identifier, Column-number and Row-number, where:

Image-identifier is the path/filename to image

Point-identifier is an arbitrary point number

Column-number is subpixel location xxx.xxxx

Row-number is subpixel location yyy.yyyy

Block 168 provides a software "window" which allows the presentation of information in a two-dimensional, virtual world coordinate system. Block 169 displays all of the images in relation to this common world space coordinate system using the world-to-image transformation "tfwinfo" (equations 1–8) for each image. Block 170 uses the "current" world-image transformation parameters to transform coordinate values to/from world space and image pixel locations using equations 1–2.

Block 171 provides pan and zoom capabilities using a world-to-screen transformation which can be equivalent to "tfwinfo" but in which "image" is replaced with "screen". Pan and zoom are effected by updating the value of parameters in that "world-to-screen" transformation. Block 172 provides mouse tracking in world coordinates. Block 173 displays an outline of the original image footprints, as shown in FIG. 18. Block 174, responds to the operator clicking on the screen 44 within an image in which points are to be picked and determines the location of the pixel. The pixel location corresponds to a world location (upper-left pixel corner). Block 175 obtains the two-dimension coordinates from the display location.

Blocks 176–177 generate a list of image candidates which can contain the selected point. Block 176 computes each possible image location using current world-image transforms. This relates the screen 44 to world coordinates. Block 177 selects images for which the transformed world locations are interior to the images, i.e., within the boundaries of the images. For example, if an image has 1234 columns of pixels, the "x" coordinate values 0.000–1233.999 are within the image while "x" coordinate values <0.0 or ≧1234 are outside of the image. Block 177 performs a check of each image to determine whether the location of the selected point is interior to the image. If the selected point is interior to an image being checked, that image is added to the list of candidate images to be displayed. If the selected point is not predicted to be interior to an image being checked, that image is ignored. Only images for which the point is interior to the image are considered and displayed. At this early stage of the process, "interior" is defined as the image file boundary.

Figure 16:
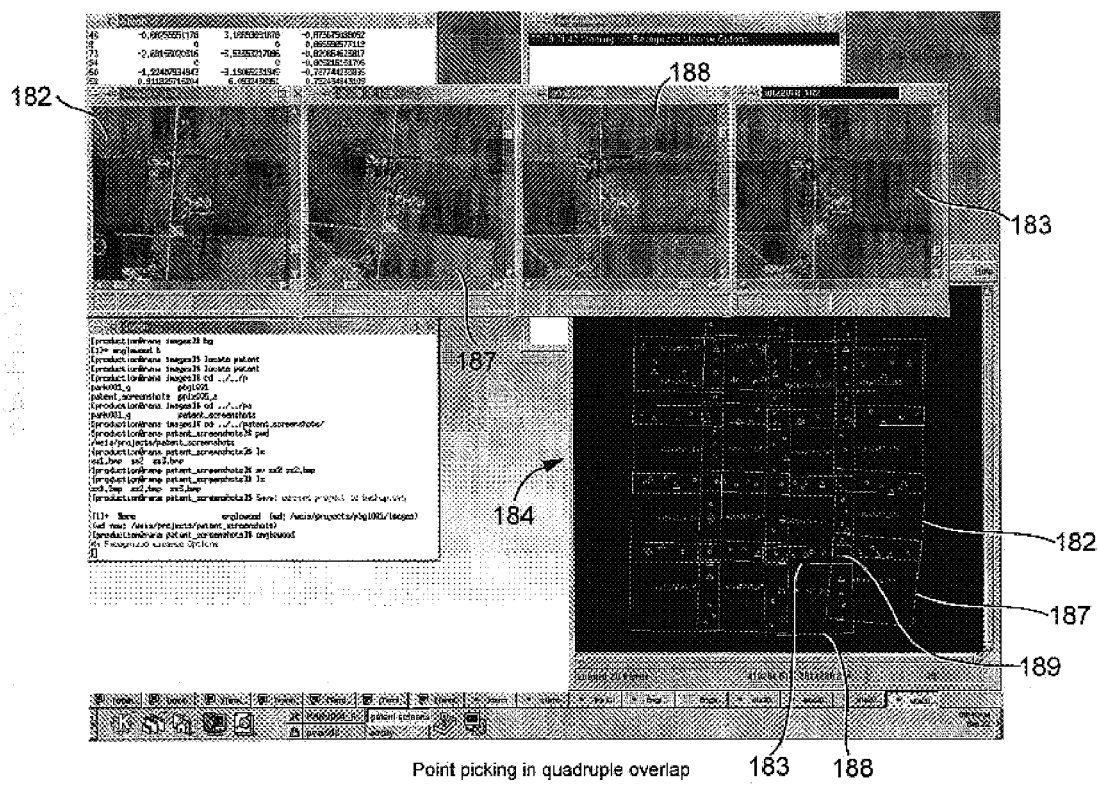
FIG. 16 is a screen shot that shows the four pop-up windows that are used for quadruple overlap point picking, in accordance with the invention.

Blocks 178–180 associate a display window with each image candidate on the list. Block 178 creates a separate display, i.e., pop-up window, for each image candidate on the list. Block 179 displays the selected images in the respective pop-up windows. FIGS. 15 and 16 show screen shots of the pop-up windows, for a simple overlap and for a quadruple overlap, respectively. Referring initially to FIG. 15, there is illustrated point picking control in simple overlap. FIG. 15 illustrates a pair of overlapping images 182 and 183 which are identified as alta2017_157 and alta2017_102, as illustrated by the footprint indicated generally at 184. A map 185 is used as a control source. Images alta2017_157 and alta2017_102 are located near the lower right hand corner of the block of images. In one embodiment, control points are represented by green glyphs and tie points are represented by green circles. The program causes the color of the active control point 186 to be changed to blue.

Referring to FIG. 16, there is illustrated point picking in quadruple overlap. FIG. 16 illustrates a set of four overlapping images 182, 183, 187 and 188. Images 187 and 188 are identified as alta2017_159 and alta2017_100, as illustrated by the footprint indicated generally at 184. Images 187 and 188 are located near images 182 and 183 at the lower right hand corner of the block of images. In one embodiment, tie points are represented by green circles. The program causes the color of the active tie point 189 to be changed to blue as indicated by reference number.

Block 180 provides image coordinate interaction, i.e., pan and zoom , etc. within the pop-up image displays. This determines the portion of the image to show for displaying the selected point. Initially, the pan and zoom are set to display the image at an appropriate default scale and to center the predicted point location as determined by block 176. Block 181 provides image measurement, i.e., pixel selection, capabilities, allowing the operator to pick points using the mouse.

Preferably, the control points 68 (FIG. 20) are selected as points which are clearly defined and readily locatable on both an adjacent frame and within the reference data. Examples of such control points include the intersection of roads, a stream passing under a bridge, bushes, patches of grass, or anything identifiable on the reference image. The point data obtained as the result of the point picking can be stored in a temporary point file as each point is picked.

Planimetric Adjustment

Figure 21:
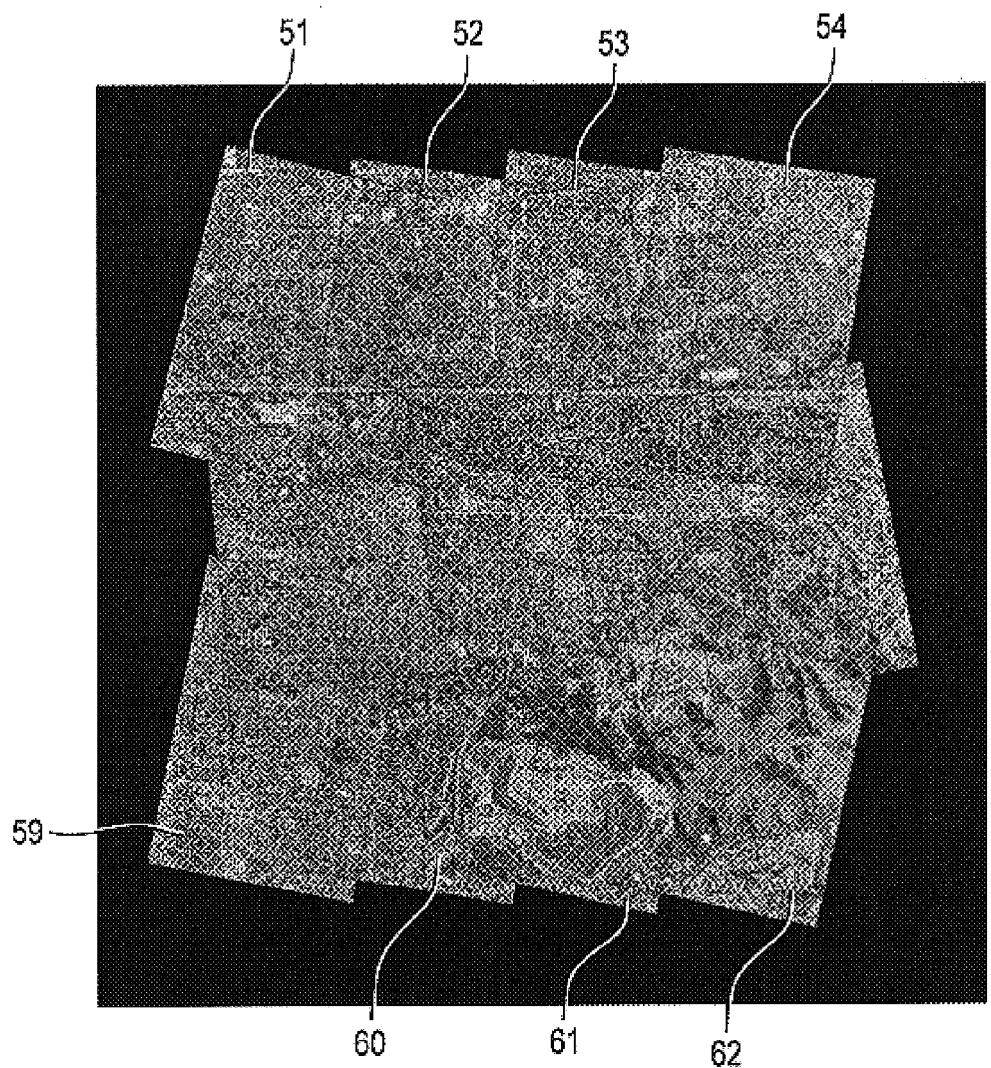
FIG. 21 is a screen showing the image adjusted after point picking has been completed, producing a gross mosaic.

Referring again to FIG. 13, when the initial point picking process is completed, flow proceeds to block 76 which provides a planimetric, or two-dimensional, adjustment by processing the point picking data by the processor 32. In response to the planimetric adjustment, the image display is updated and the images are moved to line up with one another as can be seen by comparing FIGS. 17 and 21 (also see FIGS. 30 and 31). To provide visual feedback, the displayed graphic footprints translate, rotate and/or scale as the adjustment is computed. The result is a display which better aligns the individual images with one another and optionally also with the reference image data across the project area. This provides preliminary alignment of the individual images with each other and optionally with the reference images as shown in FIG. 21. The improved alignment facilitates picking additional points.

Process Flow Chart

More specifically, referring also to FIG. 24, which is a process flow chart for the planimetric adjustment process, block 190 loads the image measurement data. Decision block 192 determines whether point control data are being provided. This decision is made automatically: (Yes) if reference data have been loaded and control points have been picked; (No) if no reference data are loaded and/or if no control points were picked.

When control data are to be used, flow proceeds to block 194 which calculates a controlled planimetric adjustment. A controlled adjustment includes the use of "world coordinate" indirect measurements which are derived from measurements of the reference image(s) and their associated georeference transformations.

In one embodiment, if point control data is not being provided, the flow proceeds to block 196 which calculates a planimetric adjustment on a free-network basis. In the case of the free-network adjustment, constraints are introduced into the adjustment to fix values for the average planimetric location, scale and rotation values. Planimetric transformation equations are not usually accompanied by constraint equations.

In one embodiment, when a free-network adjustment is performed, the images are aligned in an arbitrary frame of reference. When a controlled adjustment is performed, the images are aligned nominally with the coordinate system in which the control data values are expressed.

Free-network Planimetric Adjustment

When point control data are not provided, the planimetric adjustment can be calculated as a free-network, utilizing arbitrary datum definition constraints to establish coordinate system origin, alignment and scale. It is utilized as a preliminary step to refine a priori block layout information to facilitate point picking and to provide general quality control capabilities before undertaking a rigorous 3D photogrammetric adjustment. In one embodiment, the planimetric adjustment is used as a quality control tool to assess detailed overall block configuration, to search for image identification blunders, and also as an initial test to detect potential measurement blunders.

A free-network adjustment approach can be used to accomplish a two-dimensional planimetric free-network adjustment and/or to accomplish a three-dimensional photogrammetric free-network adjustment. The concept of a free-network photogrammetric bundle adjustment is known in the art, particularly as it pertains to "close range" photogrammetric applications where it is often called Zero Order Design (ZOD) of the network geometry. See, for example, Section 9.5 of the book *Close Range Photogrammetry and Machine Vision*, edited by K. B. Atkinson, 1996, Whittles Publishing, ISBN 1-870325-46-X.

In one embodiment, free-network adjustment is used to initially position images relative to each other within the two-dimensional "world space" represented by the display screen. This adjustment is performed using only two-dimensional (e.g. X- and Y-coordinate) information. It should not be confused with the Photogrammetrically rigorous three-dimensional free-network bundle adjustment which may also be utilized by the invention during subsequent steps of the process.

In accordance with the present invention, a two-dimensional free-network adjustment is performed using all tie point measurements within the block to simultaneously compute a two-dimensional orientation transformation for each image in the block of images, essentially orienting the images against each other in 2D. A commonly used practical minimum requirement for performing the two dimensional free-network adjustment is that the tie points 'at the corners' be measured. The two-dimensional planimetric adjustment may also be invoked with any larger number of tie points. This transformation is performed on demand by operator whenever an update is desired.

The 2D transformation is operator selectable and includes various Degrees Of Freedom (DOF). In one embodiment, the implementation provides a two DOF transform (shift only), a three DOF transform (shift and rotation), a four DOF transform (shift, rotation and scale), and an eight DOF (a standard photogrammetric rectification transformation). The operator individually controls which components are included in the transformation and adapts the transformation based on experience and/or to particular data configurations. In one embodiment, the user is allowed to pick what transformation parameters will be solved for, allowing, for instance, to remove scale, and/or rotation, and/or shift from the solution.

This planimetric adjustment process is essentially a block-wide, simultaneous planimetric adjustment. In the two-dimensional adjustment case the ZOD problem is somewhat simplified from that of three-dimensional adjustment, although it is fundamentally the same. These can be handled with any of the standard free-network solution techniques.

The two-dimension, free-network transformation improves relative alignment between individual images within the evolving block. This facilitates future measurements. The two-dimension, free-network transformation also aids in identifying blunders in tie point measurements. Blunders are gross errors which radically different from expected measurement quality. One example of a blunder would be if an operator accidentally and incorrectly modified a measurement by setting a cup of coffee on the computer mouse. The planimetric free-network adjustment provides a relatively robust tool by which the overall quality of tie point measurements can be assessed and blunders can be identified (on the basis of residuals listings) and remedied.

Flow Chart for Free-network Planimetric Adjustment

Figure 25:
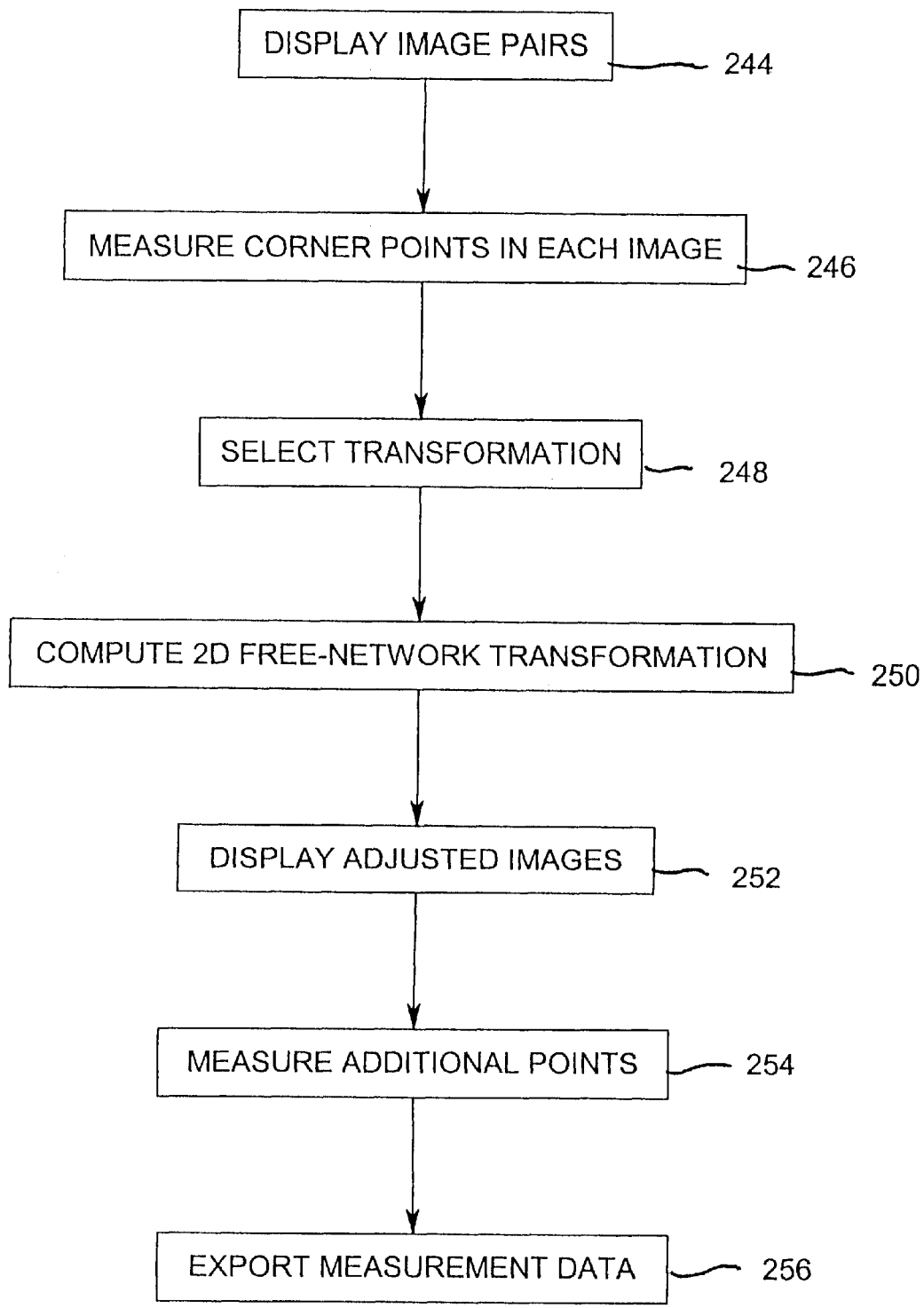
FIG. 25 is process flow chart for a two-dimension, free-network adjustment process of the planimetric adjustment program of FIG. 13.

Referring to FIG. 25, there is shown a process flow chart for the two-dimension, free-network adjustment process. Block 244 displays all imagery in the block of frames. Then, corner points in overlapping frames are measured first, block 246.

The type of transformation to be used is selected in block 248. For the two-dimension case, a four DOF transform is selected by the operator. In the two-dimension case, ZOD singularity is of rank 4 resulting from 1-scale, 2-translations and 1-rotation deficiency.

Then, a two-dimension, free-network transformation is computed to better align the images. This facilitates picking the remaining points efficiently. Thus, in subsequent passes, additional points, such as points 147 and 149 (FIG. 9), can be selected. Selection of these points is made easier by the preliminary adjustment resulting from use of the "corner" tie points in the planimetric adjustment.

The adjusted imagery is displayed, block 252, and the flow proceeds to block 254 where additional points are measured. The resultant measurement data is exported to free-network adjustment (FIG. 28), block 256.

Referring again to FIG. 13, after a free-network planimetric adjustment has been calculated, the flow proceeds back to the main display program, block 72, with the refined world-to-image transformations (e.g. consisting of the new improved "adjusted" parameter values) serving as a new current "best estimate".

Controlled Planimetric Adjustment

Referring to FIG. 24, when point control data are being supplied, block 194 calculates a controlled planimetric adjustment. The process is implemented by a software program based on principles generally known in the art of photogrammetry. The process includes the use of a standard two-dimensional transformation model (translation, conformal, affine, etc.) formulating a simultaneous equation system for the entire block; utilizing tie point coordinates as measurement observations in the adjustment system; introducing control point data values as measurements as appropriate, and solving equation system parameter values that satisfy "least squares residual" criteria.

Referring also to FIG. 23, the raster images of the raster control chip are displayed on the screen 44. The operator views the screen 44 and selects a pixel 79 by clicking on a pixel, using the mouse, and the point picking program provides the row and column coordinates for the selected pixel which are stored in file ".mea" as image measurement with record content. The program converts the pixel row and column coordinates into world "x" and "y" coordinates, as indicated at 80 using image-to-world transformation "tfwinfo" given by equations (1) and (2) above. These values are used to identify a position within the DEM 81 at the position identified by those "x" and "y" coordinates. When a DEM is available, that position is evaluated to obtain a "z" coordinate. The "z" coordinate can be used along with "x" and "y" coordinates to produce a "full" control point having with (indirectly measured) values for each of the "x", "y" and "z" coordinates. Thus, the operator views the screen 44 and clicks on a pixel and the result is a fully coordinated control point. This provides control for the bundle adjustment to be provided subsequently in the process.

When raster imagery is provided as external control, then, during the adjustment process, the source images move and rotate to be lined up with raster control images. However, the raster control images are always held fixed in position during planimetric adjustments. Because source image footprints are displayed in one color and raster control image footprints are displayed in a second, different color, visual feedback is provided to the operator. This allows the operator to interact visually with the progress of the adjustment.

It is also possible to use the DEM as control data if there are distinct topographic features which can be recognized in the DEM topography as well as in the imagery, like a stream confluence or a hilltop. To do this, the DEM elevation data are rendered as pixel brightness values. The resulting georeferenced height-image is used as a reference image to provide "x" and "y" control values and the corresponding elevation data provide the "z" control value.

The DEM is tied to the real world coordinates whereas the newly acquired images are not initially. However, if there are at least two planimetric (x,y) control points, the entire block of imagery can be related to the real world during the planimetric (and also subsequent) adjustment step. Then, the images are related to the same world coordinate system in which the DEM data are expressed. This makes it possible to incorporate the DEM as elevation (z) control measurement data in subsequent adjustment steps. This can be accomplished by computing the location ("x" and "y" coordinates) of every pixel relative to the locations of the control points, and then looking up the elevation data "z" on the DEM. Depending on the specific transformations selected, a minimum of either two or else three control points are required to relate the image block and DEM coordinate systems during planimetric adjustment.

Post Planimetric Adjustment

Referring to FIG. 13, when decision block 73 determines that point picking is complete, the data identifying the selected points for the entire block are stored in their respective memory files all at once, block 77, and flow continues to block 78. The efficiency of the point picking process is increased by opening the files for all of the images in one operation to display the entire block of images, carrying out point picking over the entire block, and then saving all of the modified image files all at once.

Then, block 78 causes the partially adjusted image data to be exported to the photogrammetric process 90 (FIG. 28) which includes a 3D bundle block adjustment program. Invoking the export to bundle function causes a separate point measurement file to be produced for each frame. The point measurement files, together with image and camera a priori data files, along with other "bc.*" files identified above, are used by the photogrammetric process 90.

Moreover, when no control data and no DEM data are available, a fully rigorous, photogrammetric three-dimensional solution can be calculated on the basis of a free-network adjustment. The steps in the free-network solution process include carrying out calculations inside the block using only image tie points to determine orientation parameters relative to an arbitrary three-dimensional coordinate frame. In contrast, the prior art as it pertains to vertical aerial photography requires a controlled solution using control points.

It is pointed out that the planimetric adjustment of block 76 adjusts only in two dimensions, "x" and y coordinates, for example, so that the image data are only partially adjusted, i.e., adjusted in two dimensions. Adjustment in three dimensions is provided by a fully rigorous photogrammetric bundle block adjustment step of the process as will be described.

Multi-DEM

Multiple-DEMs, StcDEM, can be used on a prioritized basis during several phases of the digital orthophoto production process. In one embodiment, the collection of DEMs is contained in an index file which can be a subfile of the "dems.dems" directory. Thus, data from two or more DEMs can be "mixed" and the higher priority DEM data will be used during the digital orthophoto production process. For example, in some instances, a portion of a DEM can become inaccurate due to substantial change in a portion of the topography. In such instance, one or more additional DEMs can be used to provide more accurate topographical data for those portions of the original DEM. The additional DEMs can be obtained in any suitable manner, including making a ground survey of the area in question using LIDAR or obtaining the data from other existing topographical data. A separate file can be created in the "dems.dems" file for the data of the collection of DEMs.

A text file "MDM" specifies the configuration of a Multi-DEM listing file. It is a simple ASCII file that is a list of individual StcDEM files. The individual StcDEM files are "layered" and combined to appear as a single DEM file, i.e., as a StcDEMMulti. This is called a "Multi-DEM" herein. The MDM file can be created "by hand" using a standard text editor or word processor, for example. In one embodiment, all StcDEM files are created with "World-Space" coordinate interpretation.

Figure 26:
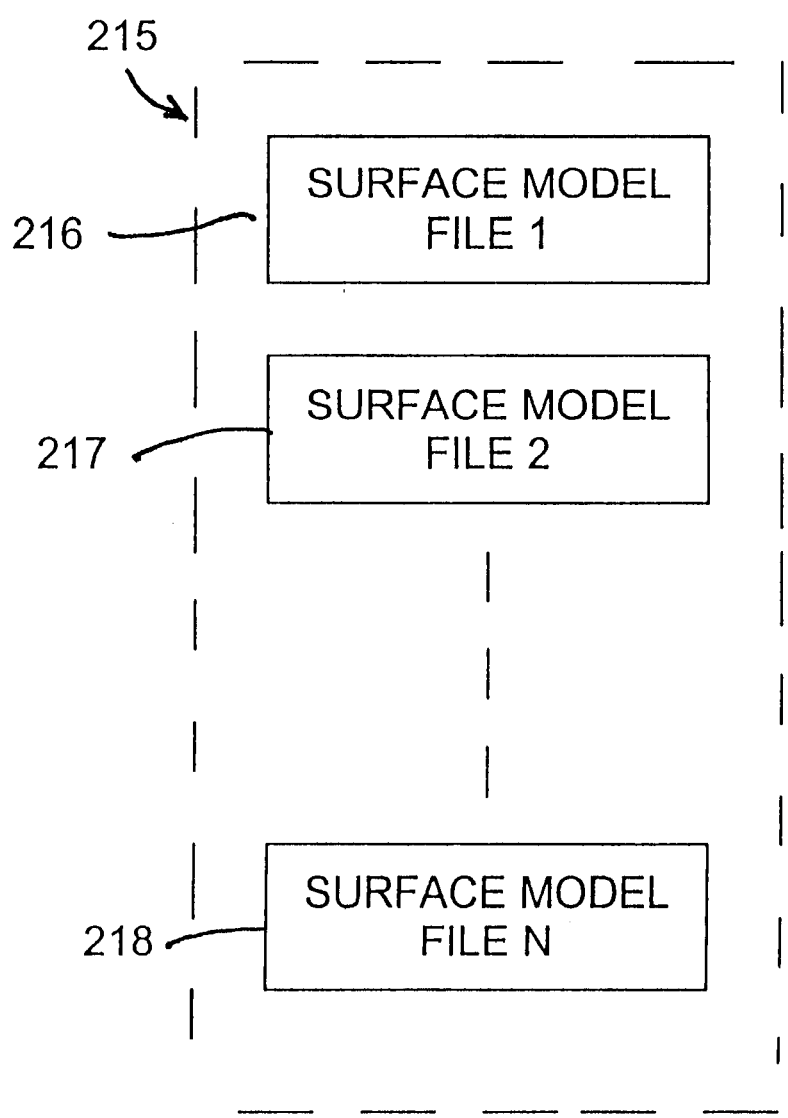
FIG. 26 is a simplified representation of the layout of memory storage for a Multi-DEM in accordance with the invention.

Referring to FIG. 26, the independent DEM files "StcDEM1", "StcDEM2", "StcDEMn" can be organized in order of priority and the data for the collection of independent DEMs can be stored in sequence in locations 216, 217, 218 etc., of the DEM data file 215 in memory in that order. For example, data for StcDEM1 is stored in the first location 216, data for StcDEM2 is stored in the next location 217, etc., and data for the lowest priority StcDEMn is stored in location 218. The priority in which the data of the collection of DEMs is stored in memory can be based on any criteria, e.g., currency of data, data fidelity, etc. When organized and arranged as described herein, the collection of DEMs becomes the Multi-DEM.

In one embodiment, the Multi-DEM can be used in several steps of the digital orthophoto production process as a direct substitution for a single DEM. For example, the Multi-DEMcan be used in place of a single DEM in one or more or all of the following process steps: as a source of external control to constrain photogrammetric adjustment (FIG. 26, block 97); as a source of one-dimension DEM data in deriving full three-dimensional control from a two-dimension map and one-dimension DEM (FIG. 24, block 194); in orthorectification (FIG. 37, blocks 220 and 225); and in orthorectification using an independent map system or an independent surface coordinate system (FIG. 39, block 227), as will be described. The decision to use either a single DEM or a Multi-DEM is made when acquiring the DEM data. After that point, the process uses a Multi-DEMin the same manner as it uses a single DEM.

Figure 27:
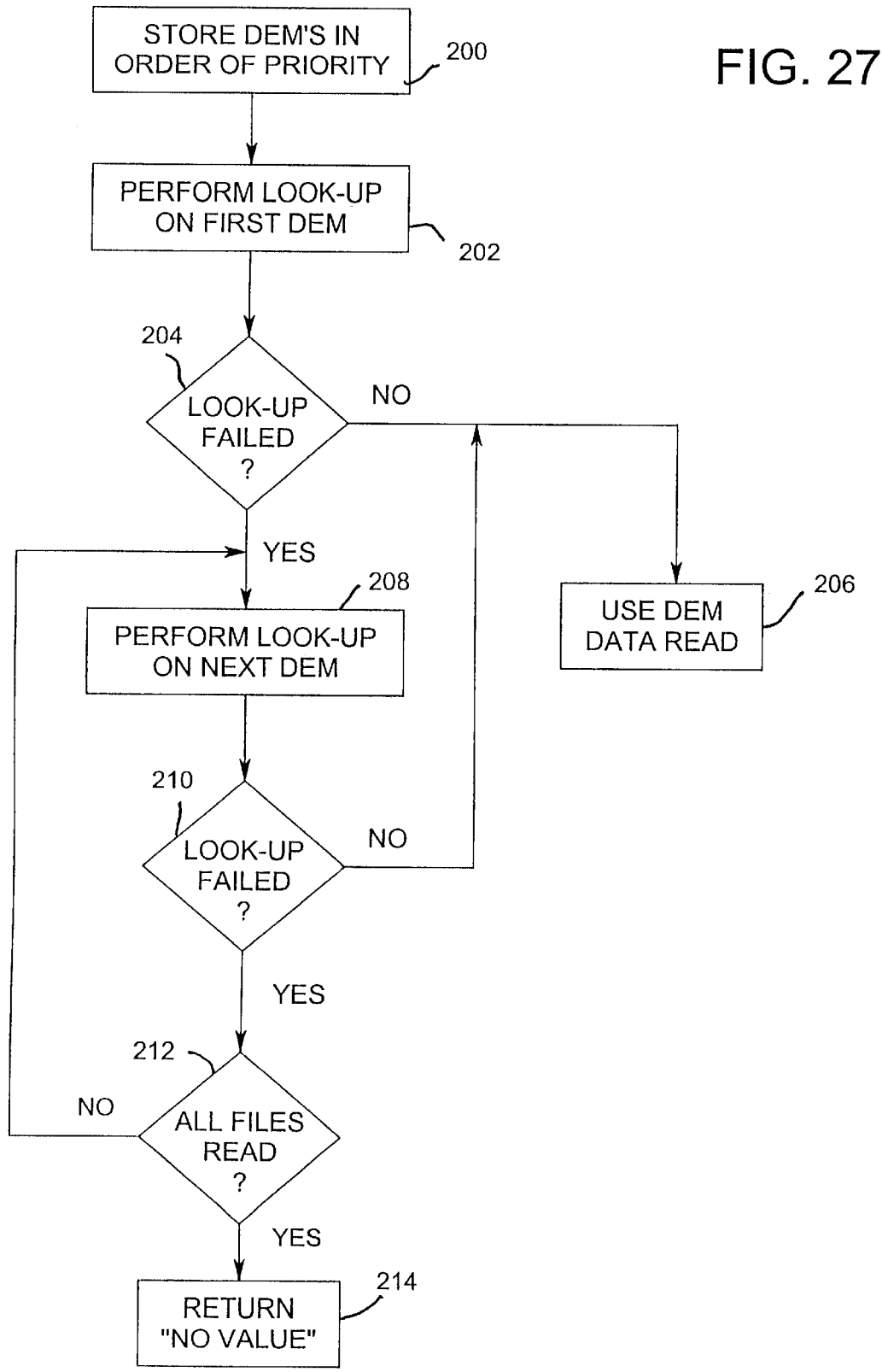
FIG. 27 is a process flow chart for a Multi-DEM program in accordance with the invention.

Referring to FIG. 27, there is shown a process flow chart for the Multi-DEM program. In block 200, the data for a collection of DEMs is stored in memory in order of priority.

In block 202, a look-up is performed on the first DEM stored in location 216, FIG. 26. If look-up is successful, block 204 outputs the data to the process, block 206. If the lookup fails, flow proceeds to block 208 which performs look-up on the next DEM stored in location 217. If look-up is successful, block 210, the data is outputted to the process, block 206. If the look-up fails, block 212 determines whether all of the data files in the collection have be read and if not, flow is returned to block 208 which performs look-up on the next DEM stored in location 218. If no single DEM resolves the look-up after all of the files have been read, then flow proceeds to block 214 which returns "no value".

The order of the DEM records is significant to the characteristics of the final composite StcDEMMulti. The StcDEMMulti is essentially a "layered" collection of DEMs. When a program requests an elevation value from a StcDEMMulti, the StcDEMMulti returns the value from the first StcDEM (e.g. the topmost layer) which can resolve a meaningful elevation. The order in which the individual StcDEM layers are queried is the same as the order of the corresponding DEM records in the MDM file.

For example, to illustrate only one of the many alternatives, assume a situation along a coast line or large lake where valid DEM's are only available up to the shoreline, but the particular application still requires "filling in" elevation values for the water area. Also assume that most of the available DEM data are of the thirty meter posting variety, but that one or two areas are covered by ten meter posting DEMs. In addition, assume that both the thirty and ten meter DEMs are known to contain small "holes" (e.g. data dropout points) which should be interpolated from neighbor values. Furthermore, assume that a recent, "high resolution" LIDAR DEM is available from a corridor mapping project. All DEM data are assumed to be in consistent coordinate systems and consistent units. However, each DEM can have it's own location, spacing, and alignment. For example, the "lake" DEM could have been created from only four "fake" coordinate values, while the LIDAR DEM can have two meter postings and be aligned with some arbitrary corridor heading.

In one embodiment, the process is as follows. First, the recent LIDAR DEM, which is known to not have holes, is tried. The hole-filling function is disabled to avoid extrapolation over the edge of the DEM being accessed.

If no LIDAR data are found, or if there a hole, the ten meter DEM is tried. Hole filling is enabled to interpolate over the ten meter DEM. Interpolation of the ten meter DEM is better than using the coarser, older underlying thirty meter DEMs. If there is overlap between the two DEMs, the overlap is resolved in the priority as listed.

Next try the one big composite 30$m$ DEM covering project land areas. Hole filling is enabled because it is composite of quad DEMs. If a DEM is not found, the faked background DEM is used. Although hole filling is enabled because that is the default value for StcDEMs, hole filling is inconsequential because this DEM was created with initial values, so that there are no holes.

If a "hit" hasn't occurred (i.e. if the interrogated DEM point is outside the boundary of all the above DEMs), then an "out-of-DEM" value command is returned to the application which can generate a warning, prevent rectification of the image data here, or take some other action to alert the user to the fact that the interrogated DEM point is outside the boundary of the DEMs which are currently available.

Photogrammetric Process

The bundle block adjustment program used in this process has specific photogrammetric capabilities including: explicit independent control over calibration of each principal point coordinate (x and y values separately), principal distance value, and independent control over optical distortion model parameters, film deformation model parameters and additional parameters such as can be used to model or approximate atmospheric refraction effects. To accommodate the demanding numerical solution requirements associated with vertical aerial photography and particularly to accommodate the marginal numeric stability of sparse stereo block configurations, the bundle block adjustment is implemented with equation systems, photogrammetric models and algorithmic techniques that provide very high numerical stability.

Sufficiently capable bundle adjustment programs for carrying out the photogrammetric process are known commercially to a niche application of photogrammetry often called "close-range" or "non-topographic" photogrammetry. These programs are generally known in the industry and in the literature. One commercially available bundle block adjustment program of sufficient sophistication and capability is the STARS program available from Geodetic Services Incorporated. Although any sufficiently capable commercial program can be employed, one embodiment of the invention utilizes the "BC" program developed by Stellacore Corporation. The "BC" program embodies state-of-the-art knowledge that is taught in universities and generally available in the industry literature. Program characteristics that specifically support the invention include: standard data ingest and reporting capabilities, unique classification of each parameter as one of "unknown", "measurement" or "constant", numerical normalization of all input data, allowance for both object and station control in any combination, sensor model self-calibration capabilities, free-network constraint capabilities, stable numerical solution algorithms (e.g. Singular Value Decomposition for normal system solution is one common technique—and is the technique utilized within the "BC" program), uncertainty estimation propagation, and industry standard solution statistics reporting.

The equations used are the same as those used for block adjustment in close-range photography. However, in accordance with the present invention, the program is written for use in aerial mapping. The adaptation is accomplished primarily through the selection of which parameters can be determined for a given project configuration. The exact selection of calibration parameters depends strongly on a number of configuration and data quality parameters. The determination of which parameters to calibrate for particular block is generally made by an individual who has acquired experience from past projects or by trial and error experimentation.

Process Flow for Photogrammetric Process

Figure 28:
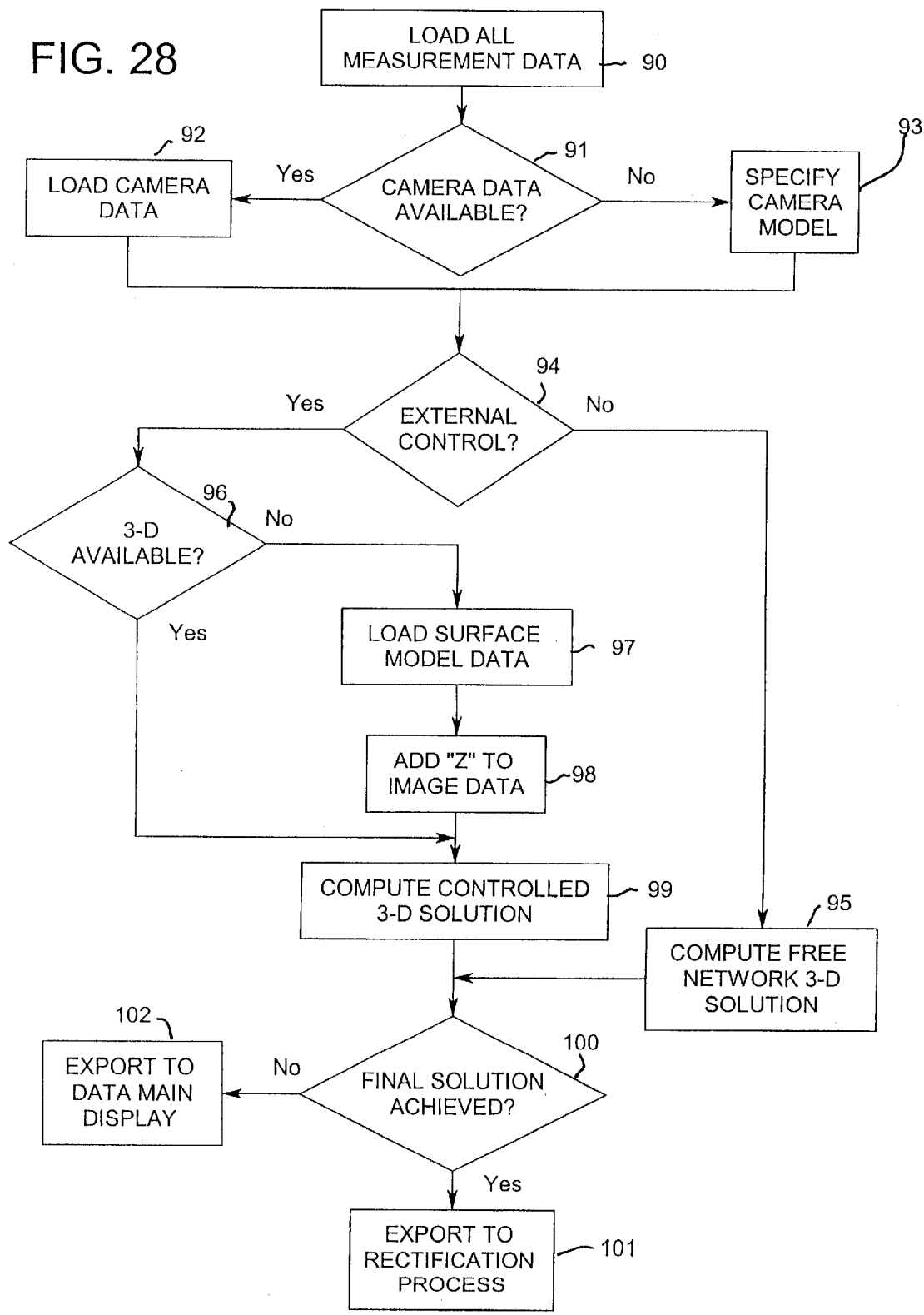
FIG. 28 is a process flow chart for a photogrammetric program of the digital orthophoto production process of FIG. 1.

Referring FIG. 28, which is a process flow chart for the photogrammetric process, the measurement data are supplied to the photogrammetric process from the point picking process 70 by the export to bundle block adjustment program (block 80 in FIG. 13).

The measurement data, along with camera calibration and a-priori orientation data contained in the set of "bc*" files are used as the "starting point" of the bundle block adjustment process. This process does not provide an immediate solution, but requires initial (a priori) seed values which the process "corrects" in successive calculation cycles ("iterations"). The desirable outcome of the calculations is that successive corrections to initial seed values become smaller and smaller, ultimately converging to zero. Based on the image measurement record data, new values are computed for the world-to-image transformation parameters associated with each of the multiple images and are augmented by approximate or assumed flying height information to provide a three-dimensional 'seed value'. The form of the world-to-image transformation, "tfwinfo", is expressed by equations (1) and (2). The values used are the needed seed values and need not be exact. However, if the seed values used are too far off, the adjustment process is initialized poorly and may converge slowly or may not converge at all. One of the important benefits provided by the two-dimensional planimetric adjustment is that it verifies and refines the 'seed values' so that this rigorous adjustment can be undertaken in confidence.

The measurement data are the x, y coordinates of the pixels for each tie and/or control point picked from the images. The measurement coordinates are generally interpreted as measured "observation" values for purposes of least squares adjustment. The coordinates are used as measurements which the adjustment procedure attempts to "best fit" in the least squares sense. The final solution does not, in general, exactly fit all measurements. The (two-dimensional) difference from the observed measurement value and the computed "best fit" value for each point is known as a measurement residual.

The bundle block adjustment process can be accomplished in several ways. The adjustment can be made with external control or without external control, i.e., on a free-network basis. Moreover, the bundle adjustment can include in-situ, self-calibration capabilities.

With reference to the flow chart of FIG. 28, at block 90, the measurement data are received from the export to the photogrammetric process step 78 of the point picking program 70 (FIG. 13).

Decision block 91 determines whether all of the camera data required for performing the bundle block adjustment are available. This includes independent values for each coordinate (x, y) of the principal point, and the principal distance, as well as values for optical distortion and/or additional parameters associated with the camera used. If values for all of the required camera parameters are available, block 92 loads the camera parameter values. If all of the required camera parameter values are not available, block 93 specifies a camera model based upon use of camera parameter values that are known and computation of values which are unknown.

In either case, flow proceeds to decision block 94, which determines whether external control data are available. For example, the DEM can be used as a source of elevation measurements during the photogrammetric adjustment.

3D Free-network

When external control data are not available, flow proceeds to block 95 and a free-network solution is computed. The free-network solution process is essentially an "N-image relative orientation". The equations required for performing a free-network adjustment are well known in the industry and are available in various commercial software adjustment programs. In applying these programs in the process of the present invention, the photogrammetric bundle adjustment program used must be robust and numerically stable. Such bundle adjustment programs are known to a specialized application within the industry known alternatively as "close-range" or "non-topographic" or "industrial" photogrammetry.

The underlying photogrammetric bundle adjustment techniques are based on the standard photogrammetric collinearity condition and standard perspective camera model. This collinearity condition, expressed in various forms in the collinearity equations, are the foundation of state-of-the-art photogrammetry. In general, "close-range" photogrammetric bundle adjustments can be applied to "aerial" photogrammetric projects—but not vice versa. As an example of a typical photogrammetric bundle equation system for aerial photogrammetry and for a treatment of perspective camera models, see, for example, *Manual of Photogrammetry*, Chapter II, Basic Mathematics of Photogrammetry, Editor K. W. Wong, Fourth Edition, Published by American Society of Photogrammetry, 1980, ISBN 0-937294-01-2.

In accordance with the invention, the technique of free-network adjustment (optionally including self-calibration) is applied to vertical photography in either full stereo or sparse stereo configuration. The free-network photogrammetric adjustment solution enables the operator to assess, investigate and diagnose the quality of tie point measurements within an aerial configuration photogrammetric block. Also, if desired, the operator can force a free-network solution even though external control data are available. This allows diagnosis of image measurement quality independent from considerations or potential problems related to control data quality.

Flow Chart for 3D Free-network

Figure 29:
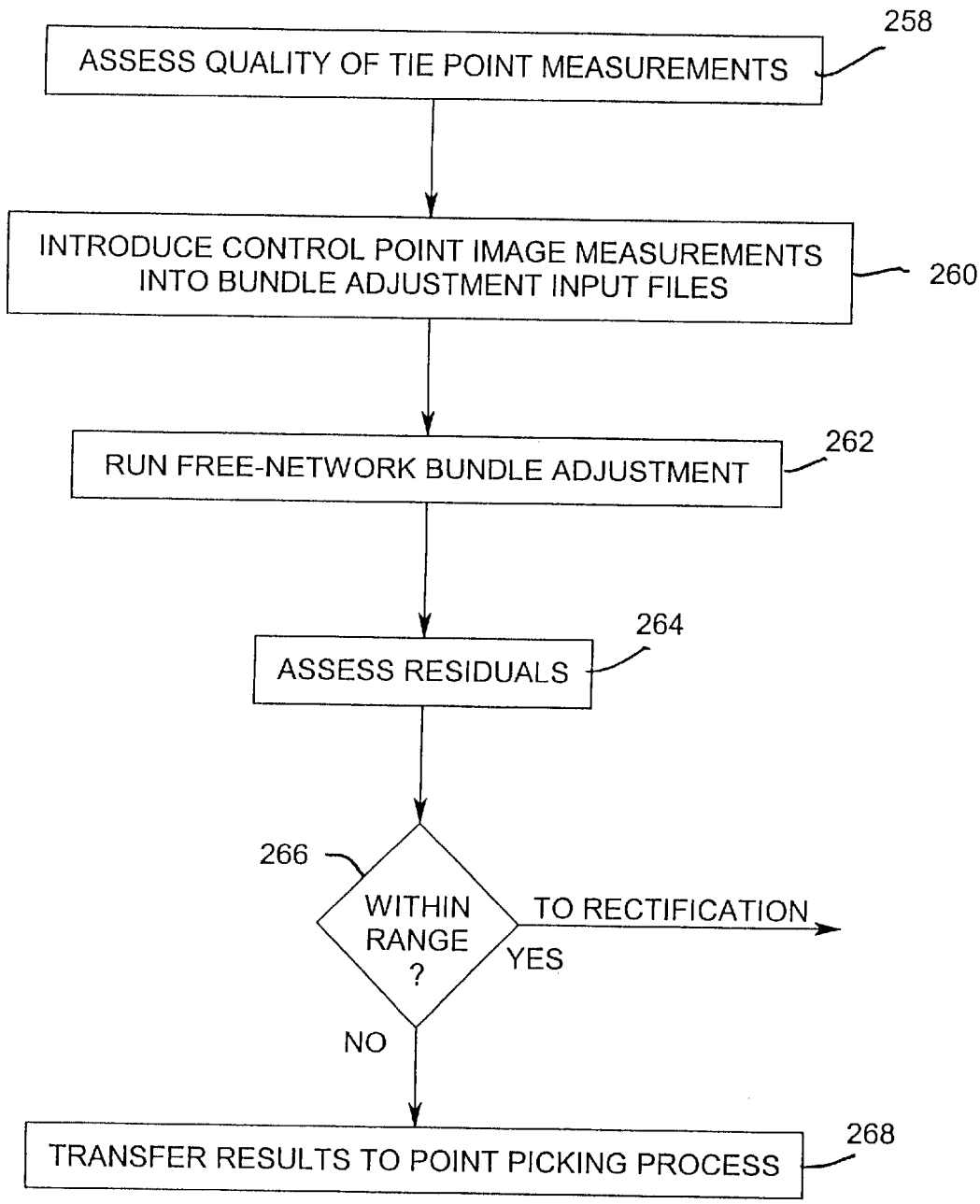
FIG. 29 is process flow chart for a three-dimension, free-network adjustment process of the photogrammetric program of FIG. 28.

Referring now to FIG. 29, there is shown a process flow chart for the three-dimensional, free-network adjustment process. In block 258, the quality of the tie point measurements is assessed. Statistics computed from the residuals and estimated parameter uncertainties are utilized to assess the quality of the tie point measurements. At this stage, a typical condition is that the estimated image measurement residual is commensurate (in a statistical sense) with the expected precision of the measurement (point picking) technique.

If the estimated residual value is too large, the operator can search for poor measurements. This is accomplished by loading the adjustment residuals back into the point picking program. Using the point picking program, the operator displays and manipulates the residuals (e.g. sort by various criteria) and to view the corresponding image locations. A common technique is to select the highest residual values and to reassess the measurement of each of the corresponding points. A related, useful feature of the point picking program in accordance with the present invention is its ability to highlight the display of points which are associated with the highest residual values.

The overall workflow then continues with the introduction of control point measurements and subsequent industry-standard controlled photogrammetric network adjustment. Control point image measurements are introduced into the bundle adjustment input files, block 260. The operator uses the point picking program to identify image positions associated with control points. The corresponding control point measurement values can be derived from various sources mentioned, such as georeferenced raster data, a list of coordinate values, elevation from external DEM's, or other sources. The operator introduces these control point image measurements, and the corresponding "known" values of the control points, into the bundle adjustment input files.

After the tie point measurements have been refined, a further three-dimension, free-network, adjustment is performed, block 262. This time, because control points are available, the adjustment is performed in a coordinate system associated with the Datum defined by the control measurement values rather than as a free-network solution with arbitrary Datum elements. The entire process can be iterated as required.

Figure 37:
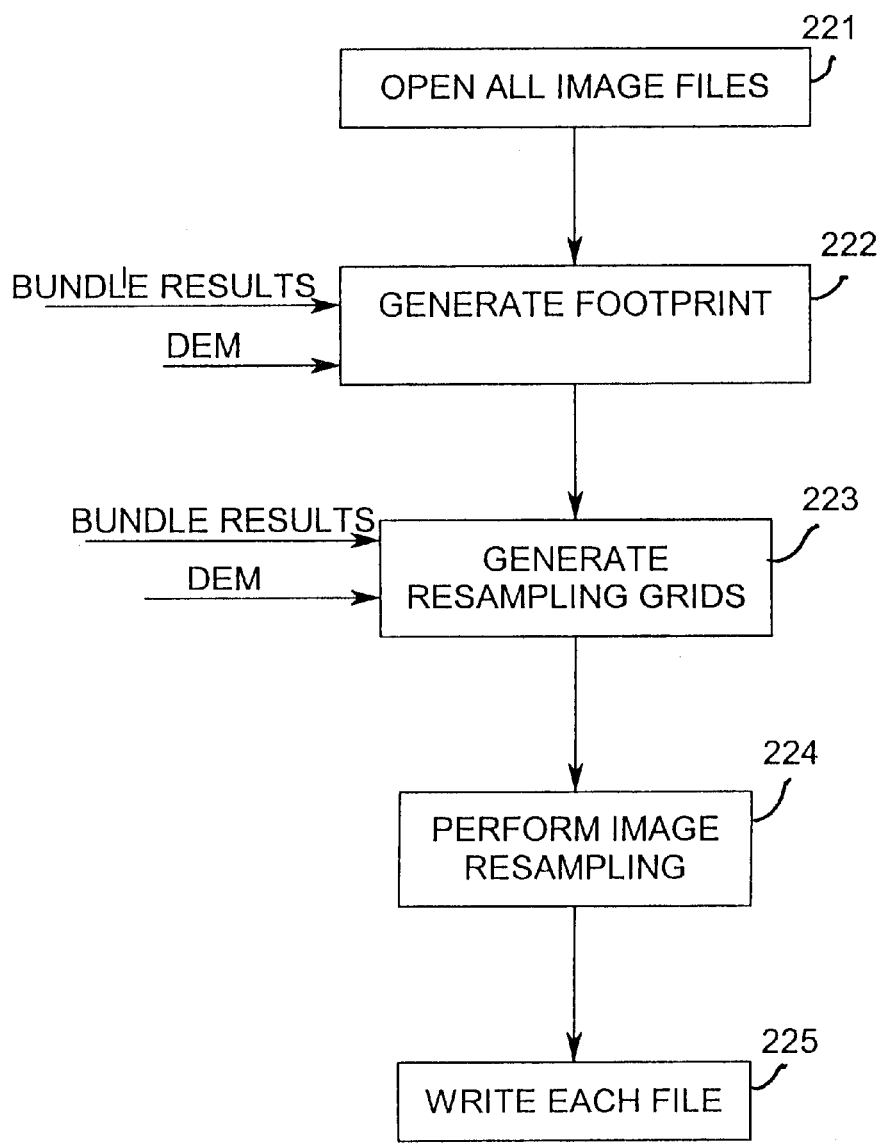
FIG. 37 is a process flow chart for the orthorectification program of the digital orthophoto production process of FIG. 1.

In block 264 the residuals are assessed, and if decision block 266 determines that the residuals are within range, flow proceeds to the rectification process (FIG. 37). However, if block 266 determines that the residuals are not within range, flow proceeds to block 268 which transfers the results back to the point picking for editing.

Whereas the two-dimension, free-network adjustment is typically computed during the point picking process, the three-dimension, free-network adjustment normally is computed at or near the completion of point picking. It is generally used as a blunder detection, and tie point measurement quality diagnosis tool, completely analogous to the manner in which the two-dimension adjustment is used as described above.

However, whereas the planimetric two-dimension adjustment, is photogrammetrically approximate, the three-dimension free-network adjustment is photogrammetrically rigorous. The results of the three-dimension adjustment include photogrammetrically meaningful residual values as well as propagated uncertainty estimation, possibly self calibration parameter values, and statistics relevant to solution quality.

After checking image measurement quality with a free-network adjustment, control data can be included for subsequent computation of a controlled bundle adjustment solution which relates to a desired map or world coordinate system.

Controlled Bundle Adjustment

Referring to FIG. 28, when decision block 94 determines that external control data are available, a controlled block adjustment can be computed and the solution expressed relative to an absolute world or map coordinate frame of reference.

Figure 30:
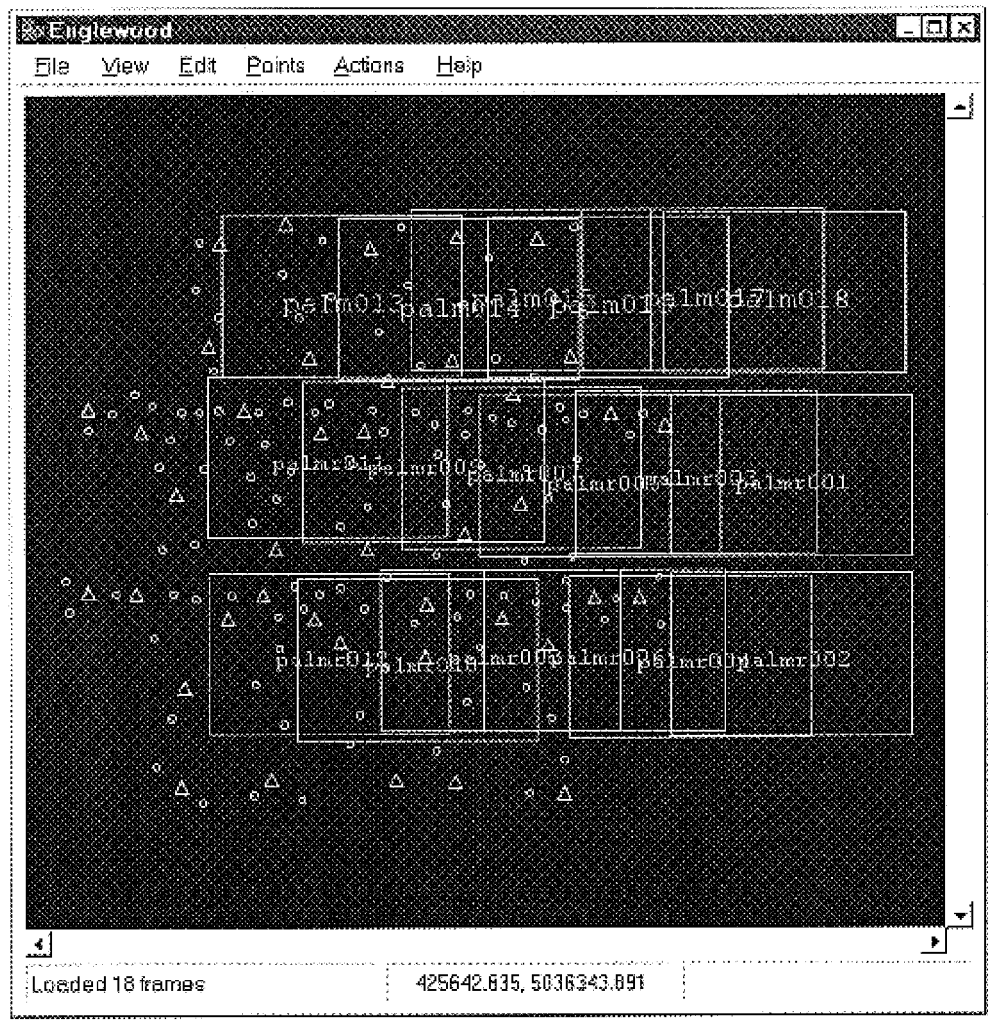
FIG. 30 is a screen shot of a block of image footprints, showing a group of points that is out of position with the block, prior to adjustment.
Figure 31:
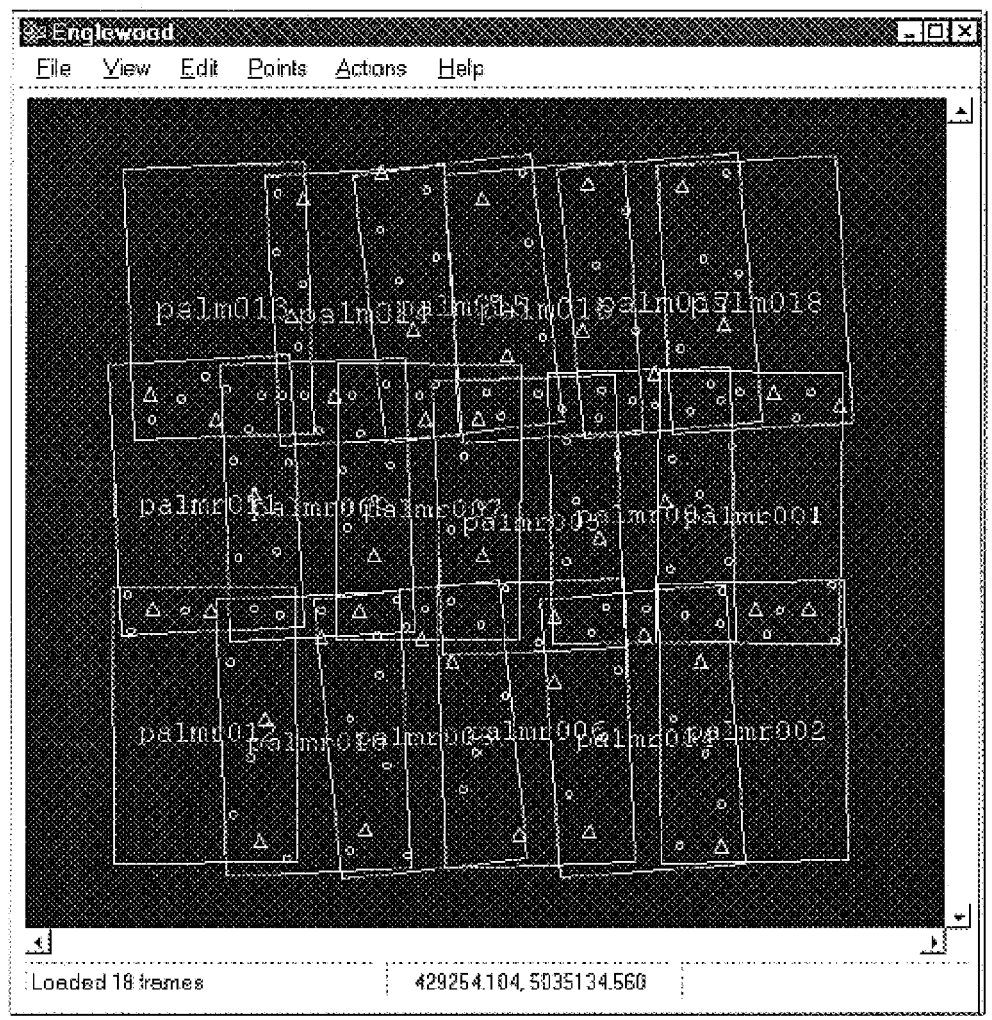
FIG. 31 is a screen shot of the same block of image footprints as FIG. 30, but showing the position of the points after adjustment.

FIG. 30 shows a small block of images and a non-adjusted control points, while FIG. 31 shows the same block after adjustment.

Control measurement values can be obtained in a variety of ways including, use of individual control points with known coordinates, planimetric control points (e.g. derived from reference imagery) and/or by using a DEM or a Multi-DEM to provide independent or supplemental elevation observation values.

The adjustment is accomplished using primarily the two-dimensional control obtained from a reference image and at least one elevation value which can be obtained in any of several ways. That is, the elevation values of the block solution are obtained knowing the altitude from which one or more exposures have been taken, or by computing elevation values from any ground control point which includes a vertical coordinate, such as a vertical control point, or from a full control point.

Alternatively, elevation values can be derived from the DEM and used as elevation "measurements" in the context of a photogrammetric bundle adjustment. This latter technique can be implemented "simultaneously" with, i.e., carried out within the photogrammetric bundle adjustment, or can be carried out after an initial photogrammetric solution has been obtained. In the latter case, the initial photogrammetric solution is obtained with an emphasis on planimetric control data to obtain an absolute planimetric solution. Then, approximately known three-dimension tie point coordinates are extracted from the photogrammetric solution.

Referring again to FIG. 28, when external control data are available, flow from decision block 94 proceeds to decision block 96 which determines whether the external control available is three dimensional or two dimensional. If three dimensional external control data are available, flow proceeds to block 99.

If only two-dimensional external control data are available, then vertical, or z coordinate data, are obtained from another source. This elevation data source can include a DEM or a Multi-DEM, or it can include individual one-dimensional elevation control point data (vertical control point(s)) or a known elevation of one of the camera stations.

If DEM data are used to compute the elevation solution, flow proceeds to block 97, which loads the DEM data. Then, block 98 obtains elevation or vertical data from the DEM and adds the vertical data to the control point data in the point file for all of the control points. The vertical data are contained in the DEM data file stored in memory 34.

Then, at block 99, the controlled bundle block adjustment program is run. The bundle block adjustment program reads the completed control point data, and also any available camera calibration parameter data, and computes the bundle solution including exterior and optional interior orientation parameter values. The bundle block adjustment program uses those values in the computation of a "least-squares optimal" solution to the photogrammetric orientation parameters including location and attitude of each image in the block as well as optional camera self-calibration parameters. The solution is optimal in the least-squares sense in that it minimizes measurement residuals. The exterior orientation parameters and optional camera calibration parameters are stored in bundle adjustment output data files. The parameter values of this solution are used in the orthorectification process.

Bundle Solution Computed

When the bundle solution has been computed, block 95 or 99, flow proceeds to decision block 100 which determines whether the bundle results data are written to the block adjustment output file, block 101 or provided to the main display (FIG. 13) block 102, for operator assessment of the residuals. A solution is acceptable if the size of the block adjustment residuals (for pass, tie and control points) is smaller than desired project accuracies. The main display updates the display using the new data.

Measurement Residuals

Digressing, the measurement residuals represent the numeric difference between actually observed measurement data values and corresponding computed "best estimate" values. In this process, the two-dimensional planimetric adjustment, block 76 (FIG. 13), is used to effectively locate extreme measurement errors (known also as "blunders" and/or "gross errors").

Since the planimetric adjustment has effectively removed or "filtered" the measurement blunders, the results from the subsequent three-dimensional bundle block adjustment are relatively free from blunders and are typically assumed to be normally distributed. In this situation, the largest measurement residuals tend to correlate well with relatively poor measurement (e.g. with sloppy point picking, or a failure of automated matching algorithms).

Therefore, in one embodiment, as a result of the two step adjustment approach (two-dimension planimetric adjustment, followed by three-dimension bundle adjustment), the measurement residuals (from the bundle adjustment) can be utilized effectively to diagnose the quality of image measurements and quickly locate and correct "bad" measurements and thereby increase the fidelity of the photogrammetric solution and hence the quality of the digital orthophotos being produced.

Point List

Figure 33:
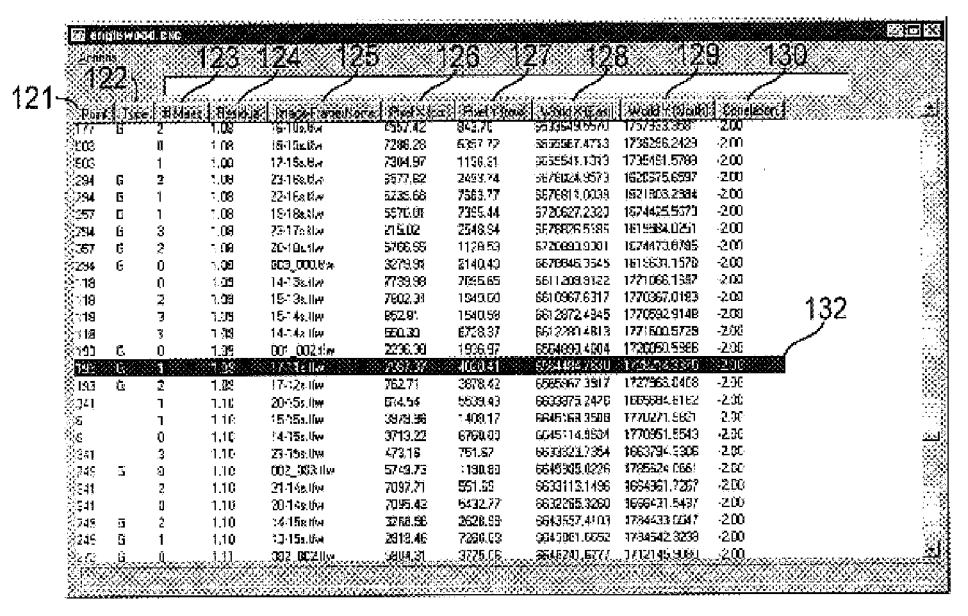

Referring to FIG. 33, there is shown an example of a block adjustment output point list. In one embodiment, the list of points includes ten columns 121–130. Column 121, which is labeled "Point", is the point ID number assigned roughly in the order the points are measured. Column 122, "Type" is the type of point measured, and is blank for tie points and includes the letter 'G' for control points. Column 123, "#-Meas" is the number of measurements for each point. Column 124, "Residual" is the radial residual for each point. Column 125, "Image-Frame Name" indicates the image in which the point is measured. Column 126, "Pixel X (col)" is the location in each image where each point is measured in terms of the columns of pixels in each image. Column 127, "Pixel Y (row)" is the location in each image where each point is measured in terms of the rows of pixels in each image. Column 128, "World X (East)" is the East-West world coordinate measured for each image. Column 129, "World Y (North)" is the North-South world coordinate measured for each image.

The residual value in column 124 indicates the "least-squares estimated error" present in each measurement. Thus, a residual of 1.09 means that the actual measured point location is 1.09 pixels away from the "best estimate" location of that point computed in the bundle adjustment solution.

The point list presented in FIG. 33 is an output assembled from all results of the block adjustment. As is usual in the art, a more detailed part of the output shows point names, X-, Y-, and Z-residuals for corresponding to each adjusted image. A sample image output, i.e., an adjusted point residual list, is shown on FIG. 32. If there is control, the program computes the difference between the current "best estimate" and the actually observed measurement data values to obtain the residual. In FIG. 32, point 84 includes elevation data only. Point 46, which is a ground control point (such as that shown in FIG. 15) includes x and y residual values in addition to a z residual value.

Residuals Within Limits

Referring to FIGS. 13 and 28, when operator assessment of the residuals indicates that the residuals are within acceptable limits, decision block 100 (FIG. 28) returns the process flow back block 163 (FIG. 14) of the point picking program which loads the current bundle adjustment results. The measurements are sorted by quality metric, such as the magnitude of the computed adjustment residual the magnitude of computed uncertainty estimates or any attribute that can be reduced to a scalar value and used for ordering the display properties.

The point picking program continues to block 164 which sets display attributes as a function of position within a list ordered by a data quality metric and to convey the measurement quality values graphically, block 165. The entire block of images is displayed and the control and tie point estimated quality can be indicated by a display color or intensity which is directly related to the magnitude of the corresponding measurement residual. That is, the points can be color coded to distinguish the control and tie points having an inconsistently high residual, referred to herein as bad points, from the rest of the control and tie points. In one embodiment, bad points are displayed on the screen as white points and the rest of the control and tie points are displayed on the screen as green points. See FIG. 36 which shows a screen shot of a block of images where some of the points 140 are white.

Because the entire block of images is being displayed, it is easy to visually identify bad points. Also, inferences can be drawn from the visual pattern and geometric distribution of bad points. For example, if all of the control and tie points appear near a particular image, this can indicate to investigate data associated with that image. The measurement of points having high residuals can be edited, as desired, to improve the quality of the measurement. Points can be selected and modified by using the mouse to position the cursor on the point and clicking the mouse to select the point. Clicking on a point when using "edit mode" causes pop-up windows to be opened, automatically bringing up display images of all frames in which this point is measured. This allows the operator to check the original measurement and/or interact with the display to improve a poor measurement. During editing operations it is possible to pan and zoom the display windows to facilitate efficient investigation and improvement of measured values.

Figure 36:
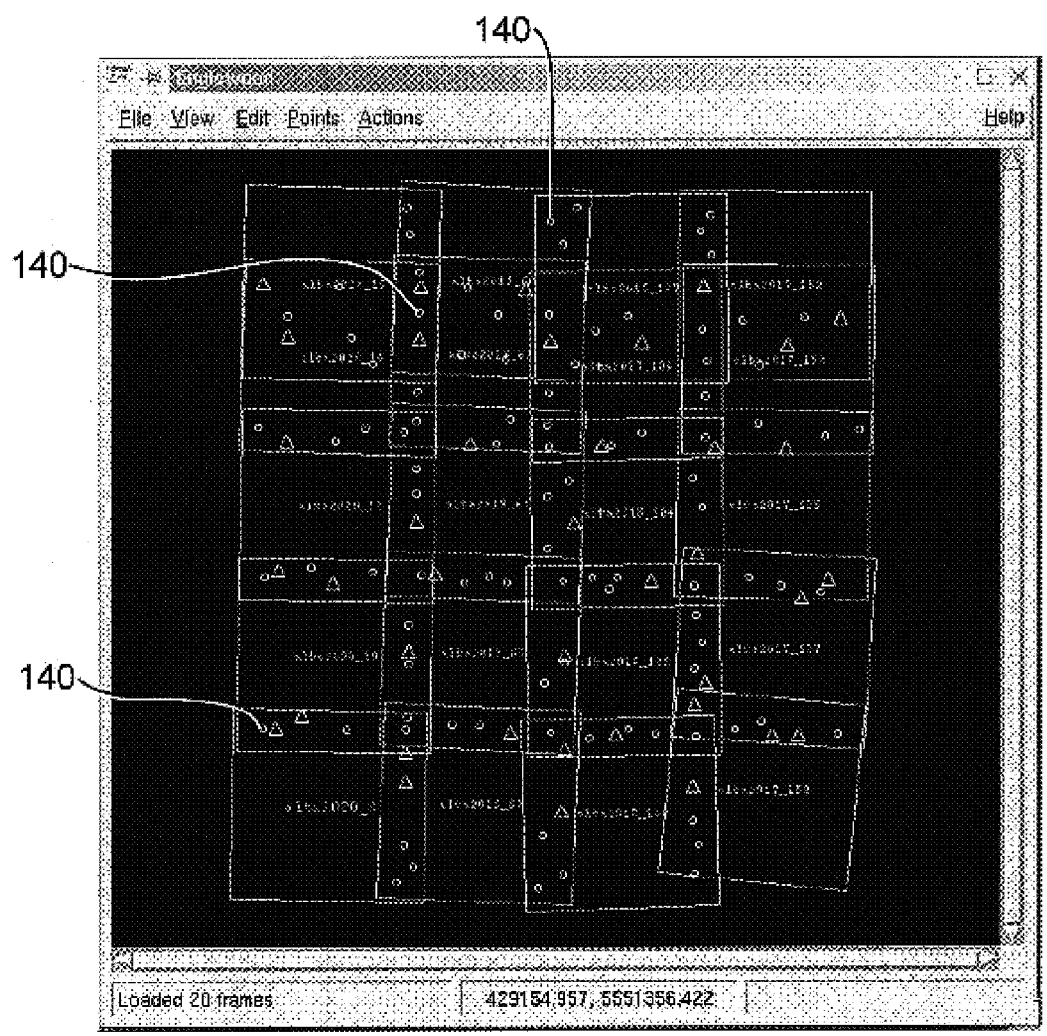
FIG. 36 is a screen shot of a block of frame footprints after conformal transformation was done, showing some bad points in white; in accordance with the invention.

Referring to FIG. 36, the block of images is displayed on the screen 44. For any point, such as points 140, for which the residual is out of range, the program changes the color of the glyph, such as triangle glyph "Δ" for control points or the circle glyph "o" for tie points. In one embodiment, the color of any glyph for which residuals are in range is displayed as green and glyphs for which residuals are out of range, or too large, are displayed as white. Any color scheme can be used to distinguish bad points from the rest of the points. Moreover, different colors can be used to distinguish control points from tie points. In general, the concept is using the geometric "world-view" display as an effective means of visualizing any of the standard (or nonstandard) data quality metrics conventionally associated with photogrammetric bundle adjustment results.

Figure 34:
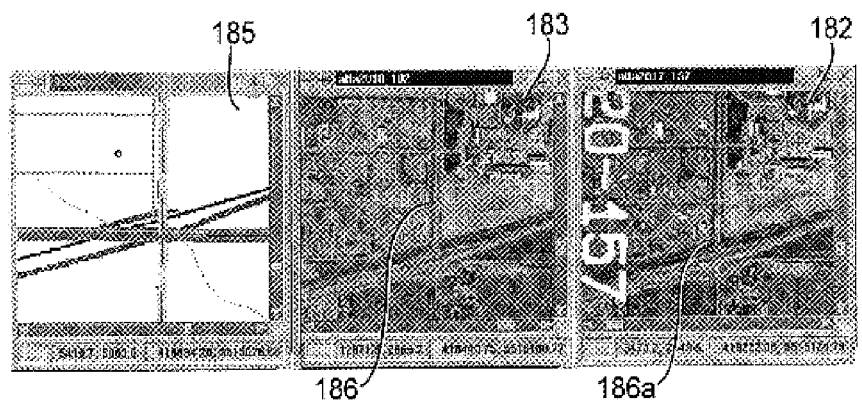
FIG. 34 is a view of pop-up windows showing the locations of the control point picked in FIG. 33.
Figure 35:
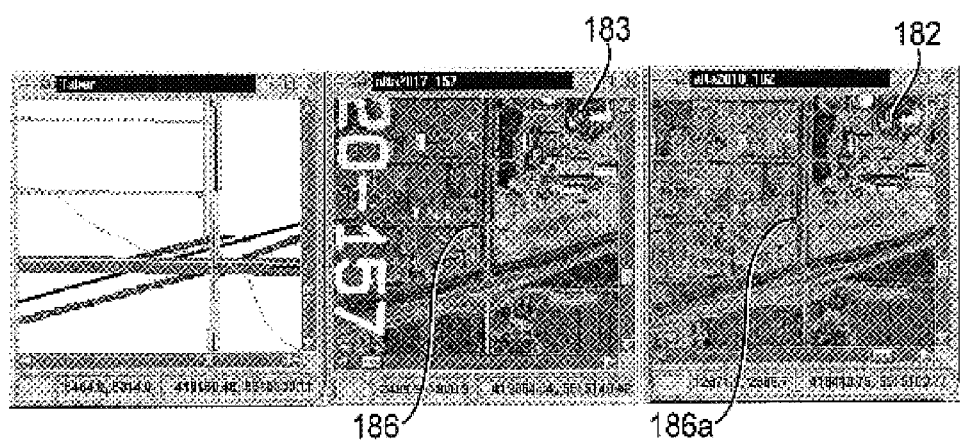
FIG. 35 is a view similar to that of FIG. 34 and showing selection of a different control point.

Referring also to FIG. 13, the flow proceeds to block 74 to allow the operator to select a new point in the manner used for point picking as described above with reference to blocks 168–181, FIG. 14. The operator can zoom-in to take a closer look at the images 182,183 being displayed as shown in FIG. 34, which is a portion of FIG. 15. The point 186*a* can be reselected, using the mouse, resulting in repositioning point 186*a* as shown in FIG. 35.

Point Editing Complete

Referring again to FIG. 28, when the point editing is completed, the updated measurement data are supplied to the photogrammetric process and bundle adjustment (block

95 or 98) is rerun as described, causing the residuals to be updated to reflect the point reselection.

After each bundle adjustment, the operator can look at the residuals graphically, edit any point or points, and then rerun block adjustment. The process can be repeated as long as results are not acceptable. When point picking reduces the residual to be within the error range anticipated, the results of the bundle adjustment are deemed to be acceptable.

When the results of the geometrical solution obtained are acceptable to the operator, block 100, the process flow continues to block 101 to evoke the orthorectification program.

In-Situ Calibration

Referring to FIG. 28, if values for all of the required camera parameters are not known, as determined by block 91, a camera model is specified, block 93, based upon available information, including information known from the a-priori solution. Rather than assign specific values to the unknown camera parameters, such as principal point-x, principal point-y and the principal distance, the parameter values are computed as "unknown" parameter values within the mathematical set of equations which form the photogrammetric bundle formulation.

Various camera self-calibration processes are known in the industry in applications alternatively known as "Close Range Photogrammetry" or "non-topographic photogrammetry". For example, one camera self-calibration process is described in *Non-Topographic Photogrammetry*, Second Edition, Editor in Chief H. M. Karara, Chapter 5: Camera Calibration in Non-Topographic Photogrammetry, Author John G. Fryer, 1989, American Society for Photogrammetry and Remote Sensing, ISBN 0-944426-23-9. Any commercially available bundle adjustment which supports camera self calibration can be used.

As stated above, in accordance with the invention, camera self-calibration techniques are applied to aerial photo configurations including those with sparse stereo. When applied to aerial geometries, the self-calibration is applied only for the parameters which are determinable for a given geometry. Parameters typically included in the self-calibration process allow compensation for each independent component of the calibration constant vector (e.g. Principal Point-x, Principal Point-y and Principal Distance); optical distortion/correction parameters of variable order, film deformation; and atmospheric refraction. The selection of which parameters are significant and determinable is made primarily based on operator experience from past projects and is aided by monitoring "equation stability parameters" reported by the adjustment program (in particular to monitor the normal equation system condition number). Parameters which are not determinable via self calibration are typically insensitive and relatively invariant within the photogrammetric configuration and can therefore normally be set to nominal or assumed values with only minimal effect on the quality of final results. However, when doing so, the a posteriori quality control process assumes additional importance.

Then, depending upon whether or not camera calibration data are provided, block 95 or 98 computes the least-squares solution values for each camera parameter being calibrated. These parameters along with the other bundle adjustment result data are provided to the orthorectification process.

Camera Model

In one embodiment, the camera model is specified by selectively setting flags to indicate whether the camera parameter values should be treated as observation measurement values (associated with residuals) or as parameters with unknown values to be determined during solution. Each of the camera parameters can be represented by a flag with all of the flags being in a common data file. The flags for parameters for which the values are known and therefore should NOT be determined by calibration are set to a "0" (zero="OFF") state whereas values that are not well known and should be determined by calibration are set to a "1" (one="ON") state. The bundle block adjustment program reads this file and treats the parameter as either a measurement (associated calibration flag is in the "OFF" state) (block 92) or an unknown (associated calibration flag is in the "ON" state) (block 93) in computing the least squares bundle block adjustment solution. If the parameter is to be treated as a measurement, then the a-priori calibration data are utilized as observation values with a corresponding residual to be minimized during the least-squares solution. If the parameter is to be treated as an unknown, then the value of the parameter is computed entirely from other data values and their (indirect) relationship to the camera parameters as propagated through the system of equations.

In general, the calibration is performed in a configuration which includes ground control measurement data. However, it is also possible to compute certain of the calibration parameters during free-network bundle solutions. Which parameters can be determined depends on the specific configuration of the block.

Orthorectification

Orthorectification of the imagery data is carried out after the photogrammetric process is complete. The orthorectification process, in accordance with the present invention, differs from most conventional rectification processes in some aspects as will be described. The fundamental aspects of the rectification process correspond to those that are well known in the industry. However, one embodiment of the invention extends the basic capabilities through incorporation of several improvements. For example, the rectification process can perform a "one-step" rectification with an independent map coordinate system or an external DEM. Moreover, the rectification process can use Multi-DEMs, as will be described. Also, the geometric interpolation model utilized in one embodiment differs from those common within the industry. One embodiment utilizes a sophisticated geometric interpolation model to provide geometrically smooth interpolated orthophoto images. In addition, a sophisticated radiometric interpolation model has been adapted from other products known in the industry and applied to the rectification process. The rectification is done on a batch basis. That is, all of the image files stored in the block image file are opened at once, rectified sequentially but as one process, and the resulting orthorectified images are all saved together at the same time.

A process flow chart for the orthorectification process is shown in FIG. 37. Referring to FIG. 37, the orthorectification process includes three main components including steps 222, 223 and 224 with each of the images being processed individually in steps 222, 223 and 224. In one embodiment, all of the image files are opened at once, block 221, and, following rectification, each image file is written, block 225. For each image, step 222 generates a footprint. For each image, step 223 generates a resampling grid. Then, for each image, step 224 performs image intensity resampling. Preferably, the bundle block adjustment solution produced by the photogrammetric process is verified and accepted as accurate before orthorectification is performed.

Generate Footprint

Figure 38:
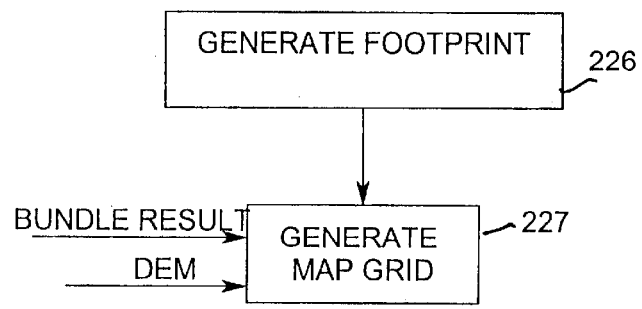
FIG. 38 is a process flow chart for a footprint generating program of the orthorectification program of FIG. 37.

More specifically, with reference to FIG. 38, step 222 includes blocks 226 and 227. In block 226, for each image, the image pixels from around the exterior edge of the image are mathematically "projected" onto the DEM to generate a detailed, three-dimensional polygon footprint. These three-dimensional values are then transformed from the coordinate system of the DEM to obtain the associated planimetric coordinates of the polygon vertices expressed in the coordinate system associated with the map projection desired for the final orthophoto. The result is a two-dimensional bounding polygon expressed in the map coordinate system.

The planimetric extent of this footprint (defined by min/max x and y values) is used to establish the maximum possible extent of the final orthophoto data, block 227.

Generate Resampling Grid

Figure 39:
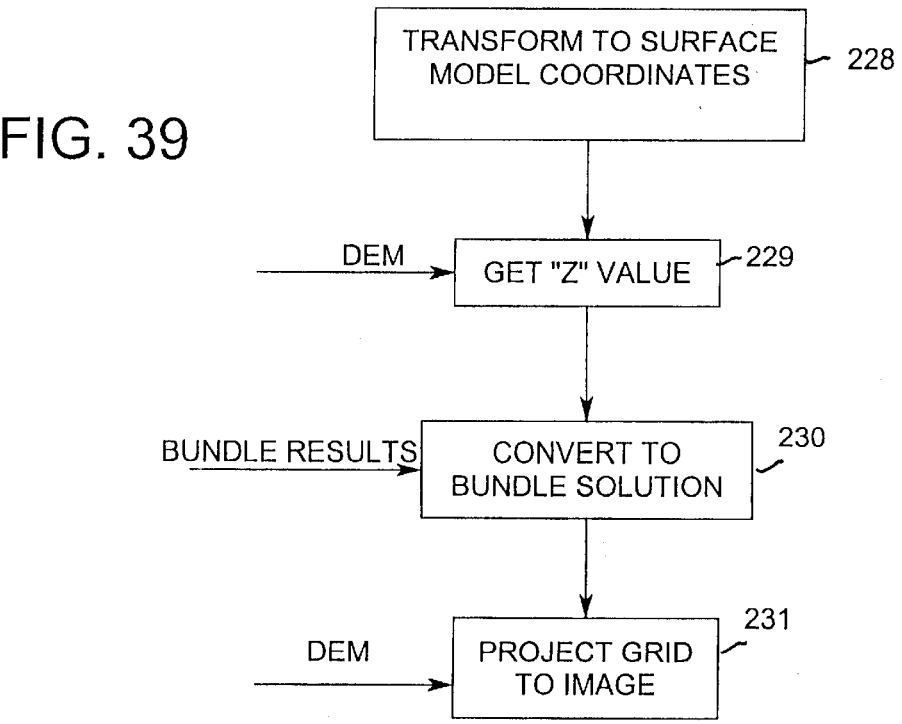
FIG. 39 is a process flow chart for a resampling grid program of the orthorectification program of FIG. 37.

Referring now to FIG. 39, step 223 includes blocks 228–231. Within the extent defined by block 227, a virtual grid of transitory evaluation points is generated "on the fly". In one embodiment, this component supports the creation of digital orthophotos in a variety of map coordinate systems without the need to convert or recompute DEM or photogrammetric solution data. Given the DEM and photogrammetric solution data in a particular coordinate system, the orthophoto imagery data can be produced in any map coordinate system. In contrast, known rectification software solutions which perform the rectification, require all inputs and the outputs produced to be in a single coordinate system. Therefore, if it is desired to produce an orthophoto in a different coordinate system, conventional systems require that the orthophotho image be resampled a second time, which significantly adversely affects image quality, or require that the DEM data be transformed to a new coordinate system and or the photogrammetric solution be recomputed in the new coordinate system before computing the new orthophoto.

More specifically, in block 228, each evaluation grid location is rigorously converted from the planimetric map coordinate system into the coordinate system associated with the DEM (or Multi-DEM) via the inverse of the map projection conversion. The map projection conversions are performed using complex mathematic equations that are standard to the mapping industry. In one embodiment, the process uses transformations from "PROJ" or "PROJ4", NAD2NAD, NADCON, CORPSCON, or other software that is in the public domain. For example, PROJ4 software is described in "Cartographic Projection Procedures for the UNIX Environment", Evenden, Gerald I. Aug. 29, 1991, U.S. Geological Survey Open-File Report 90–284. The DEM is used to add an elevation coordinate, or z value, to the converted value to provide a three-dimensional evaluation point in the coordinate system of the DEM, block 229.

Block 230 transforms this three-dimensional point from the coordinate system in which the DEM is expressed, into the coordinate system in which the photogrammetric solution is expressed using appropriate map projection and datum conversions of the PROJ software referred to above.

Next, using the photogrammetric solution obtained from block 99 (FIG. 28), in block 231, the three-dimensional point is mathematically "projected" into the image to obtain the associated image pixel coordinates (at subpixel precision). This step can be performed using photogrammetrically rigorous equations containing the exterior and interior orientation parameters computed during the photogrammetric block adjustment. The equations used for this are based on the collinearity condition inclusive of the various interior orientation (self calibration) camera parameters. These equations are well known and standard in the art. The type of coordinate system is determined by the operator and can be specified by the operator, using the mouse.

The net result of the rigorous projection process is a two-dimensional grid of image coordinate displacement values. Each displacement value is a two-dimensional entity (delta-x, delta-y) which represents the distance by which an specific pixel must be moved within the image (e.g. column, row movement) so that relief displacement is offset. Computation of the displacement value is repeated for each map evaluation point in the map evaluation grid area. Often this rigorous computation of the displacement values is done at a spacing larger than the pixel spacing of the input image. In that case, the rigorously computed displacement values must be interpolated at the position of individual input image pixels.

Note that the overall process allows the DEM to be expressed in any arbitrary coordinate system, independent of the final orthophoto output map projection, and independent of the coordinate system in which the photogrammetric solution has been computed.

Perform Image Resampling

Figure 40:
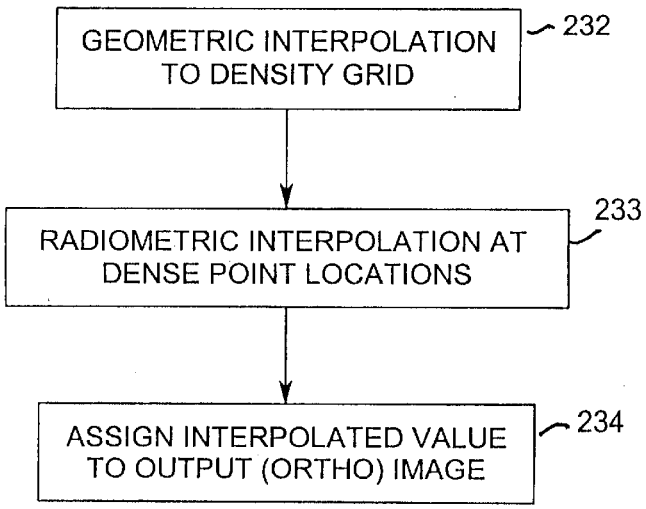
FIG. 40 is a process flow chart for a image resampling program of the orthorectification program of FIG. 37.

With reference to FIG. 40, step 224 (FIG. 37) includes blocks 232–234. Block 232 provides a geometric interpolation to densify the relatively sparse displacement value grid to obtain values at each pixel location for each input image. Given the (possibly interpolated) displacement value at a specific input image pixel location, in block 233, a conventional pixel intensity interpolation is performed for each image. This provides radiometrically interpolated pixel values. Block 234 assigns the interpolated radiometric value to the output, or orthorectified image pixel location which is specified by the input image pixel location plus the corresponding displacement vector.

One Step Resampling

Figure 41:
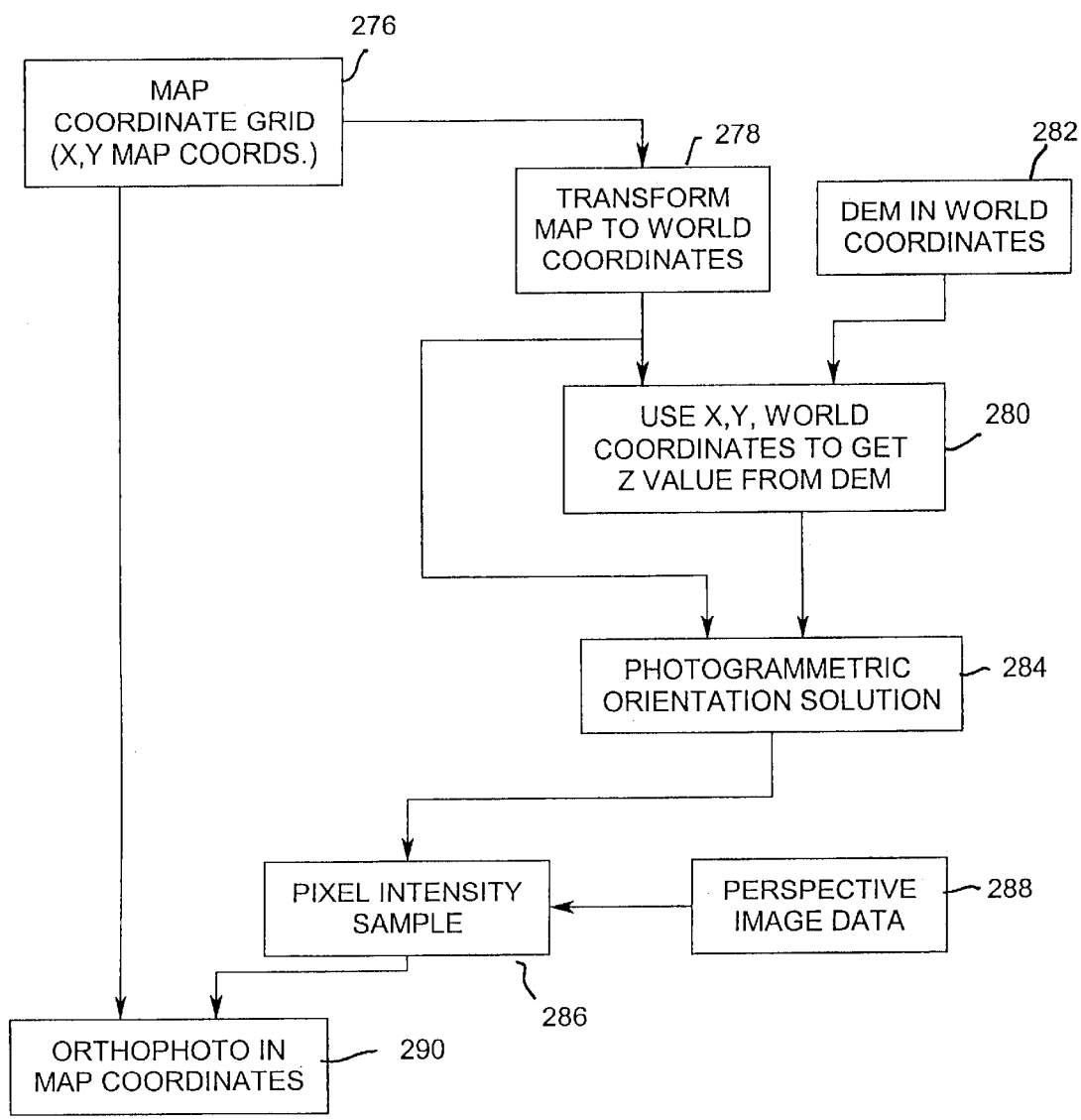
FIG. 41 is process flow chart for a program providing one-step resampling in accordance with the invention.

In accordance with the present invention, the radiometric interpolation step of the digital orthophoto production process is performed only once. This process is represented by the process flow chart of FIG. 41. Referring to FIG. 41, first, all of the geometric coordinate transformations including photogrammetric orientations, block 270 and cartographic transformations, block 272, are performed. Also, processes involving use of the DEM(s) are carried out, block 274.

Block 276 obtains the map coordinate grid in x,y, map coordinates. Block 278 transforms the map coordinates into world coordinates (x,y world). Block 280 uses the x,y world coordinates to obtain the z value from the DEM (block 282). Block 284 uses the x,y world coordinates and the z coordinate data obtained by block 280 to compute a photogrammetric solution in world coordinates.

Then, in block 286, the results of the photogrammetric solution and perspective image data from the data file 288 are used to obtain a pixel intensity resample.

Conventional in the industry, when working with color imagery consisting of Red, Green and Blue ("RGB") data channels, is to perform radiometric computations independently with each data channel. For example, each band of the color image is independently treated as a single gray-value image for computation purposes. After performing the computations, the individual "gray-value" results are recombined into the Red, Green and Blue channels of the output image. Although mathematically correct, this process can introduce certain visual artifacts—especially when the radiometric computations involve pixels with substantially disparate color values. In one embodiment, "perceptual color" algorithms are utilized to perform radiometric computations in a manner that is consistent with human visual perception. The technique using perceptual color computations was introduced to the industry in 1997 by the OrthoVista software product from Stellacore in the context of digital image mosaicking. The current invention, adapts this technique to the radiometric interpolation computations utilized during rectification. In principal, this involves to perform computations in one of the "perceptual color spaces" established within the graphic arts and human vision sciences. Although many options exist, one example is the use of the HSV (Hue, Saturation, Value) color space. The mathematic transformations between RGB and HSV color spaces and the inverses are well known in the industry. One embodiment of the invention utilizes, HSV computations for interpolation of sub-pixel position radiometric values. This process includes the transformation of all (only for color imagery) source image data from RGB into HSV color space, then performing the interpolation in HSV color space (via any of the standard interpolation models—such as bilinear, bicubic, nearest neighbor for example) and then inverse transforming the result from HSV back into RGB color space.

The resultant pixel values at locations (x,y) on the map are used to produce an orthophoto in map coordinates, block 290.

This one-step resampling process avoids the situation in which multiple image resampling operations unnecessarily degrade the color content of the resulting imagery.

A geometric interpolation method utilized commonly in the photogrammetric industry is the "bilinear surface interpolation model". Although computationally fast, this model produces visual artifacts in the resulting orthophoto image. The current invention supports this interpolation model as an option, but it also provides for various other geometric interpolation models. One embodiment utilizes a bivariate Bezier interpolation across regularly spaced DEM data values in order to provide smooth and continuous interpolation of elevation values.

Independent Coordinate Systems

In accordance with another aspect of the present invention, orthophotos can be created in a variety of map coordinate systems without the need to convert or recompute DEM or photogrammetric solution data. Alternatively, an identity transformation can be used so that map coordinates and world coordinates are identical. With this process, given DEM data and photogrammetric solution data in a particular coordinate system, the orthophoto image data can be produced in any map coordinate system.

In contrast, typical rectification software solutions perform the rectification, produce output and require all input to be in a single coordinate system. Therefore, if it is desired to produce an orthophoto in a different coordinate system, conventional systems require that the orthophoto image be resampled (significantly adversely affecting image quality) or that the DEM data be transformed to a new coordinate system and/or the photogrammetric solution be recomputed in the new coordinate system before computing the new orthophoto.

Figure 42:
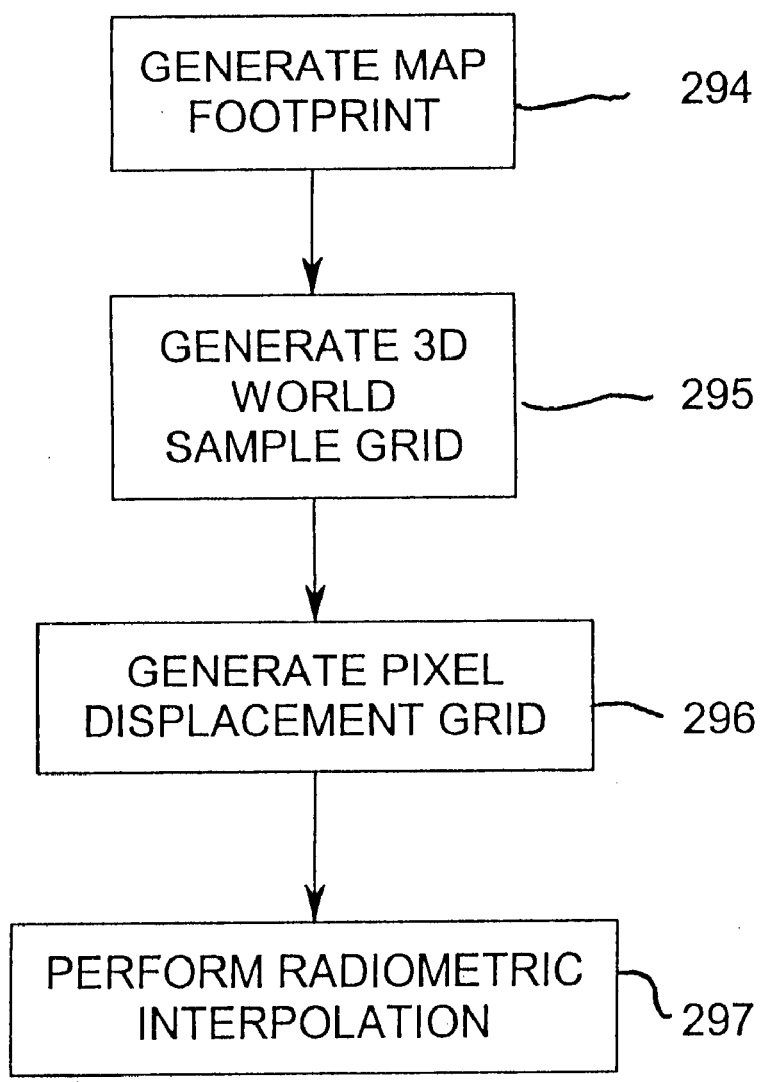
FIG. 42 is process flow chart for a program which provides rectification with independent map/surface coordinate systems.

FIG. 42 is an overview flow chart for the process for performing rectification with independent map/surface coordinate systems in accordance with the invention. Block 294 generates a map footprint which represents the outer edge of meaningful pixel intensity values expressed in a coordinate system related to the internal geometry of the taking camera geometry. Block 295 generates a three-dimension world sample grid which is a grid of points representing a point sampling of the DEM in a manner consistent with a regular and homogeneous spacing in map coordinate system. Block 296 generates a pixel displacement grid wherein every pixel location of the output image has a lookup value (a two-dimension pair) which indicates from which source image location to extract the radiometric information. Finally, block 297 performs radiometric interpolation.

Figure 43:
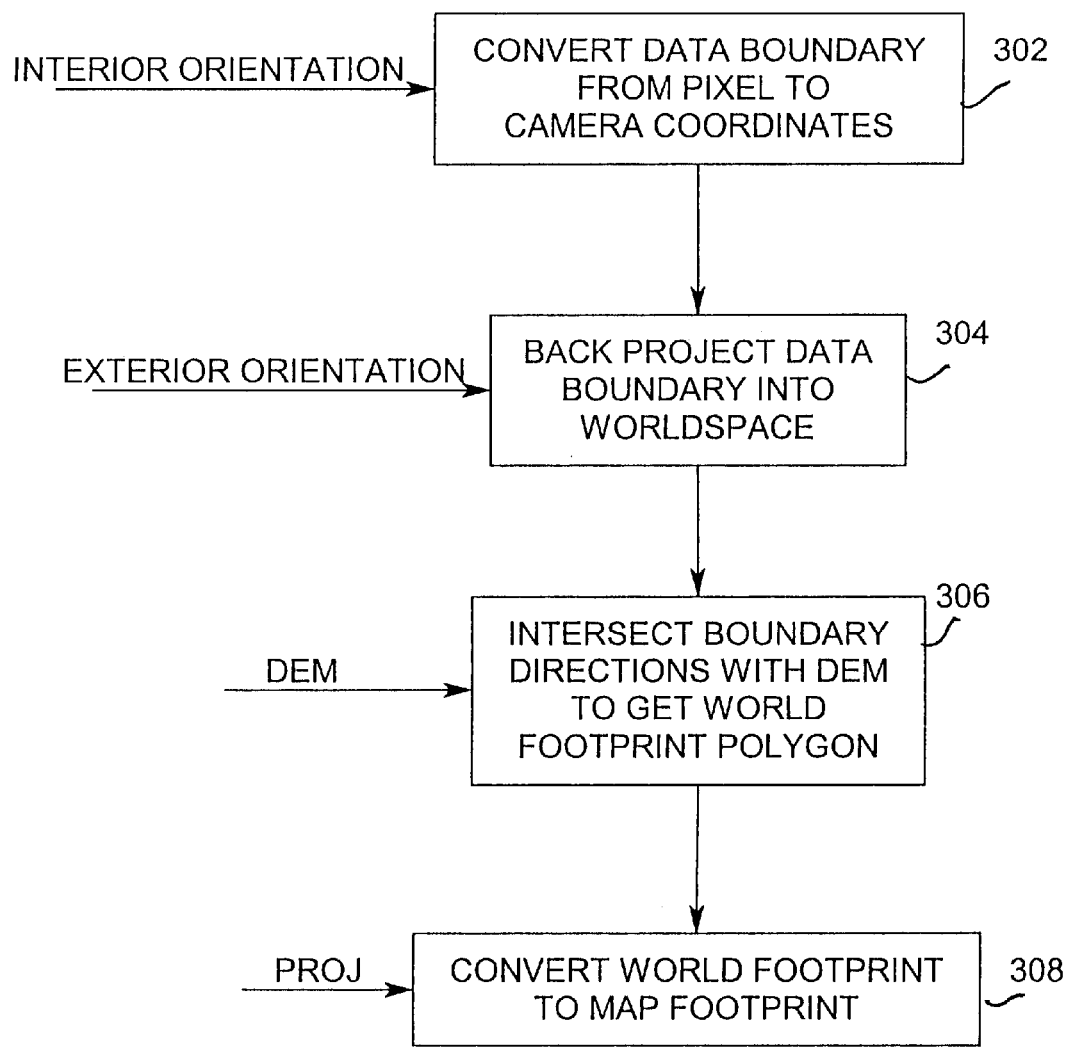
FIG. 43 is process flow chart for a map footprint generating process of the program of FIG. 42.

More specifically, with reference to FIG. 43, which are process steps of block 294 (FIG. 42), in block 302, the data boundary is converted from pixel coordinates to camera coordinates using interior orientation parameters. All pixels at the edge of the image are converted from pixel coordinates into perspective image coordinates using the inverse interior orientation parameters from file "bc.out". The interior orientation parameters derive from the bundle adjustment self-calibration process or can be provided by the camera operator. This provides the effective image boundary (e.g. the outer edge of meaningful pixel intensity values) expressed in a coordinate system related to the internal geometry of the taking camera geometry. This locates the image pixels versus the background pixels by "tracing" the outer edge of the input image.

Digressing by convention, image data files normally contain pixel data in a rectangular array of values. That is, the length of a row and the length of a column of pixels are constant throughout the file. However, this may not necessarily agree with the outline or edge of the image. For example, if a film image is scanned, the area scanned can be larger than the physical image. In this case, the difference area, that is, data locations outside the image but inside the rectangular file area are considered background pixels.

Figure 44:
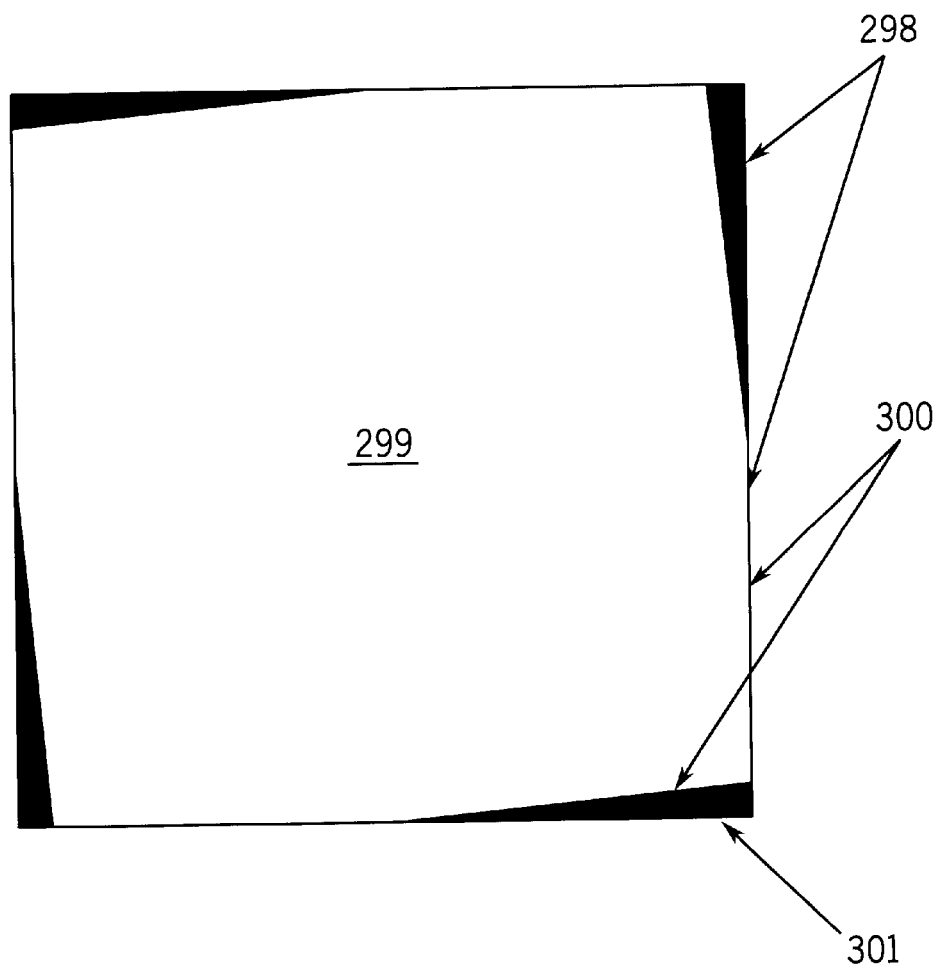
FIG. 44 is a simplified representation of image and background pixels of an image footprint.

A similar situation arises during production of an orthophoto image. In this case, the file data values represent a rectangular area of a map coordinate system within a data file border 298, shown in FIG. 44. However, the available image pixels may occupy only a subset of this area, i.e., a valid image area 299. Pixels, such as pixels 300, which are outside the valid image area 299 but still inside the file boundary 298 are considered to be "background pixels".

The dividing line between the "image pixels" and the "background pixels" is the "image pixel border" 301 and represents the image "footprint" within the orthophoto data file. The image border within the orthophoto data file is determined by "tracing" the outer edge of the input image, any user specified subregion with is to be rectified, as it forward projects onto the DEM.

Referring again to FIG. 43, then, block 304 back projects the image footprint into world space using the exterior orientation parameters read out from file bc.out. For all edge pixels (or pixels inside the outer edge of the image just short of the background area), the perspective image coordinates are backward projected into lines in world coordinate space using the inverse exterior orientation transformation characterized by the exterior orientation parameters provided from the bundle adjustment program and which are read out of file "bc.out". This creates an irregular cone in object space with a vertex coincident with the image exposure station and surface consisting of "rays" emanating from edge pixels and projected through the exposure center. Points interior to the cone are (mathematically) projected interior to the image whereas points exterior to the cone are not imaged.

Then, the boundary cone is intersected with the DEM (or Multi-DEM), block 306, to provide a world footprint polygon. In similar fashion, the world coordinate line for all edge pixels is projected onto the DEM to determine the point of intersection expressed in world coordinates. The intersection of the surface of the projected cone and the DEM is an irregular polygon consisting of three-dimensional points for vertices. Each vertex simultaneously satisfies the mathematic condition of being on the surface of the irregular cone and also satisfy the relationships present in the DEM. A three-dimension world coordinate polygon is generated consisting of the DEM intersection points from all the pixels on the edge of the image. This polygon is consistent with the DEM and forms the boundary, in world space, of the image footprint.

Then, in block 308, the world footprint is converted to a map footprint. The three-dimensional world footprint polygon is transformed from world coordinates into map coordinates using an appropriate map projection formulae. A variety of standard formulae and public domain and commercial software packages are known in the art. Examples of these commercial software packages include CORPSCON, PROJ, PROJ4, NAD2NAD, NADCON, for example.

Figure 45:
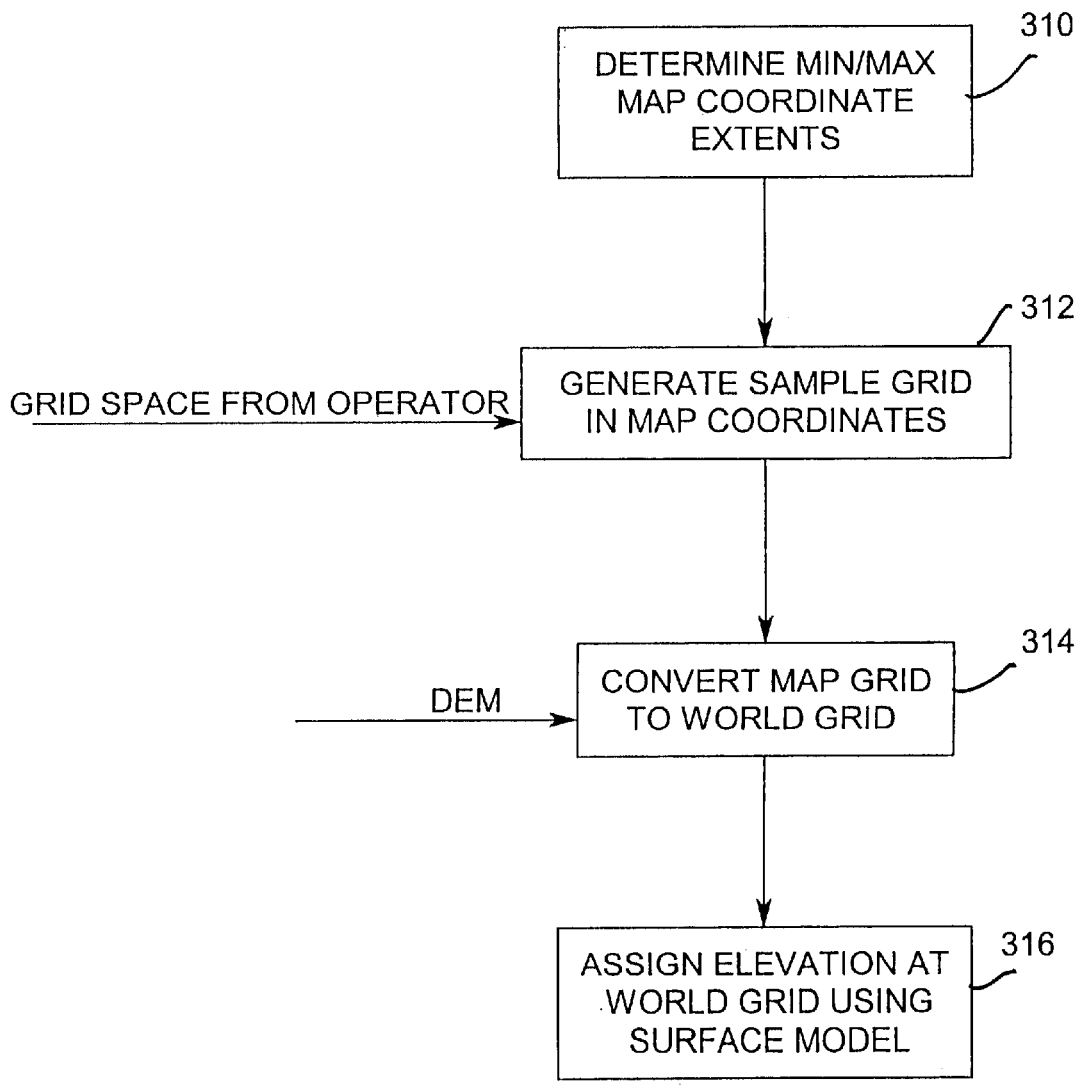
FIG. 45 is process flow chart for a three-dimension world sampling grid generating process of the program of FIG. 42.

Referring to FIG. 45, which are process steps of block 295 (FIG. 42), in block 310, the minimum and maximum coordinate extents of the three-dimensional map footprint are determined. These values, together with the orthophoto pixel size (from project/customer specifications) are used by block 312 to determine a sample grid of (x,y) points in the three-dimension map coordinate system.

Block 314 converts the map grid to a world grid. For each grid point in the map coordinate system, the location is inverse transformed from the map coordinate system into the world coordinate system (planimetric coordinates) using appropriate map projection formulae, such as those referred to above relative to block 308.

Block 316 uses the DEM to determine the elevation coordinate corresponding to the planimetric world coordinate location and assigns elevation at world grid points. The planimetric and elevation data values are combined into a single 3D coordinate triple expressed in world space. This produces a grid of three-dimensional points that have a systematic (but irregular and not homogeneous) planimetric spacing (spacing is regular in map coordinates but is distorted by map projection during transformation into world coordinates). The points have elevation values which are consistent with the DEM. Therefore, the grid of points represents a point sampling of the DEM in a manner consistent with a regular and homogeneous spacing in map coordinate system.

Figure 46:
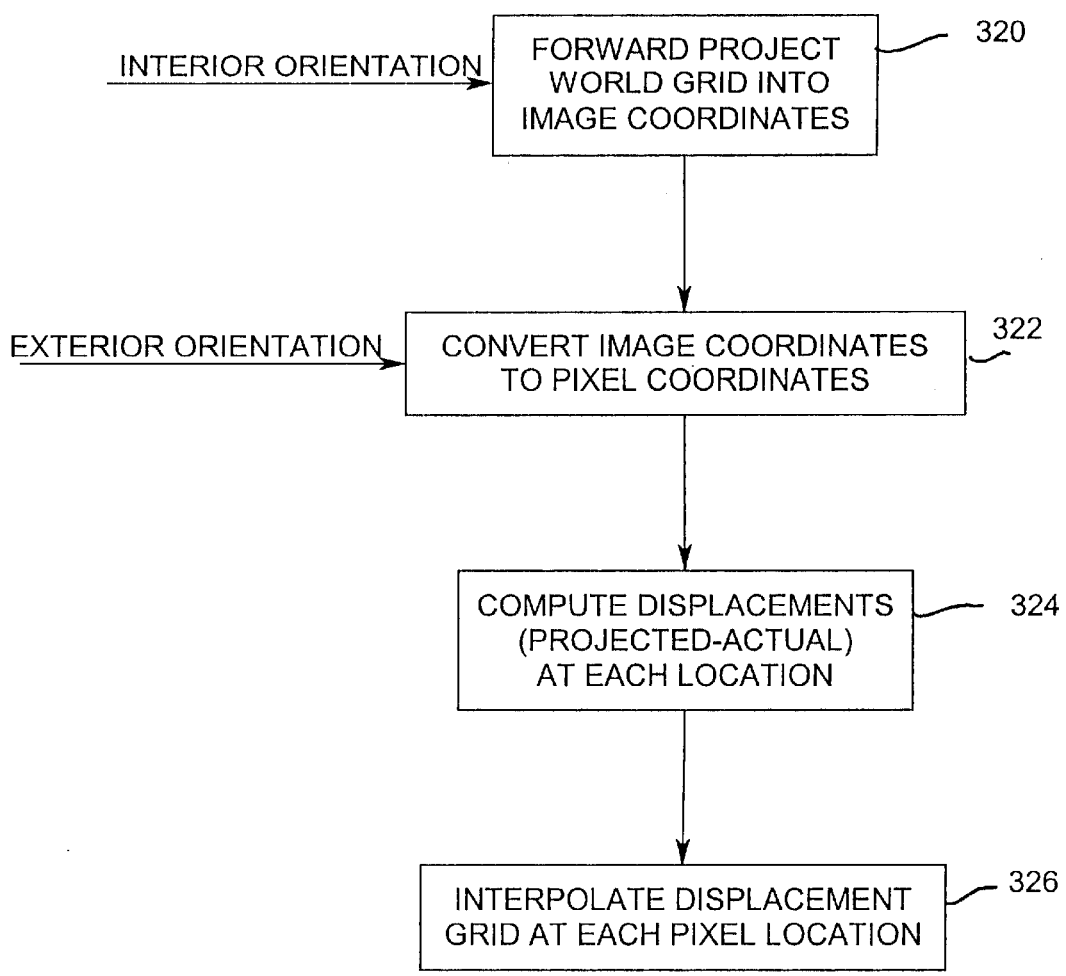
FIG. 46 is process flow chart for a pixel displacement grid generating process of the program of FIG. 42.

Referring now to FIG. 46, which are process steps of block 296 (FIG. 42), in block 320, the world grid is projected into image coordinates. Each three-dimension World Space point is back projected, using the exterior orientation parameters. This results in perspective image coordinates. The set of three-dimension world points is converted to a set of two-dimension points. Because of the construction process that creates the irregular cone in object space as described above, each two-dimension point is situated interior to the valid image pixel area which may be smaller than or equal to the area covered by the image data file.

Block 322 converts perspective image coordinates to observable pixel coordinates by applying the interior orientation parameters from file bc.out. Block 324 computes displacements, both projected and actual, at each location. Block 326 interpolates the displacement grid at each pixel location. The process steps 322–326 convert the two-dimension collection of points from the camera coordinate system into the same pixel column/row coordinate system in which the original point measurements were made.

The pixel row/column value is assigned to the location of the corresponding output orthophoto pixel. This is the location for which the corresponding map grid point was generated. The assigned location values represent the difference of the coordinate values between the original output ortho pixel column/row location and the computed column/row location within the source image. These values indicate the location within the original source image from which to extract pixel radiometric values for assignment to this output orthophoto pixels.

The domain of the lookup values is a grid of output orthophoto pixel locations, each of which corresponds one-to-one with a map grid location. Typically, the spacing of this grid is sparse relative to the desired output image pixel spacing. When this is the case, this sparse grid is densified by interpolation (using any number of common two-dimension interpolation schemes, e.g. bilinear interpolation, bicubic interpolation, surface splines, etc.) in order to assign an interpolated lookup displacement value at the intervening pixel locations.

As a result, every pixel location of the output image now has a lookup value (a two-dimension pair) which indicates from which source image location to extract the radiometric information. Note that the source image location is, in general, a fractional, subpixel location.

Referring again to FIG. 42, in block 297, given the corresponding sub-pixel source image coordinates, radiometric pixel values (e.g. intensify and/or color values) are assigned via radiometric interpolation of the pixel values associated with source image pixels at neighboring integer-pixels locations.

Note that the above described process results in rectification directly into an arbitrary map coordinate system, while performing only a single radiometric interpolation, which is carried out in the last step of the process.

Vertical Photo Assumption for Self-rectification

If no control data are available after performing the three-dimensional, free-network solution as part of a quality control process, then it is possible to use a modified version of the free-network solution technique for subsequent image processing. One approach is to introduce a network constraint that assumes an average vertical direction in order to support the process of self rectification.

In one embodiment, this approach can be utilized when "nothing else" is known about a block of vertical aerial photographs provided the photo stations are well distributed (e.g. a block with more than one "flight line"). The ensemble of all photographs is assumed to have an average "look-direction" that is near vertical. This assumed vertical direction constraint is introduced as a condition that must be satisfied by the otherwise free photogrammetric network of the block adjustment.

This process is referred to herein as "relative self-rectification". Relative self-rectification is useful because the resulting block of images can be easily related in close approximation to a variety of map coordinate systems by a simple conformal transformation (two shifts, one rotation, and one scale).

Figure 47:
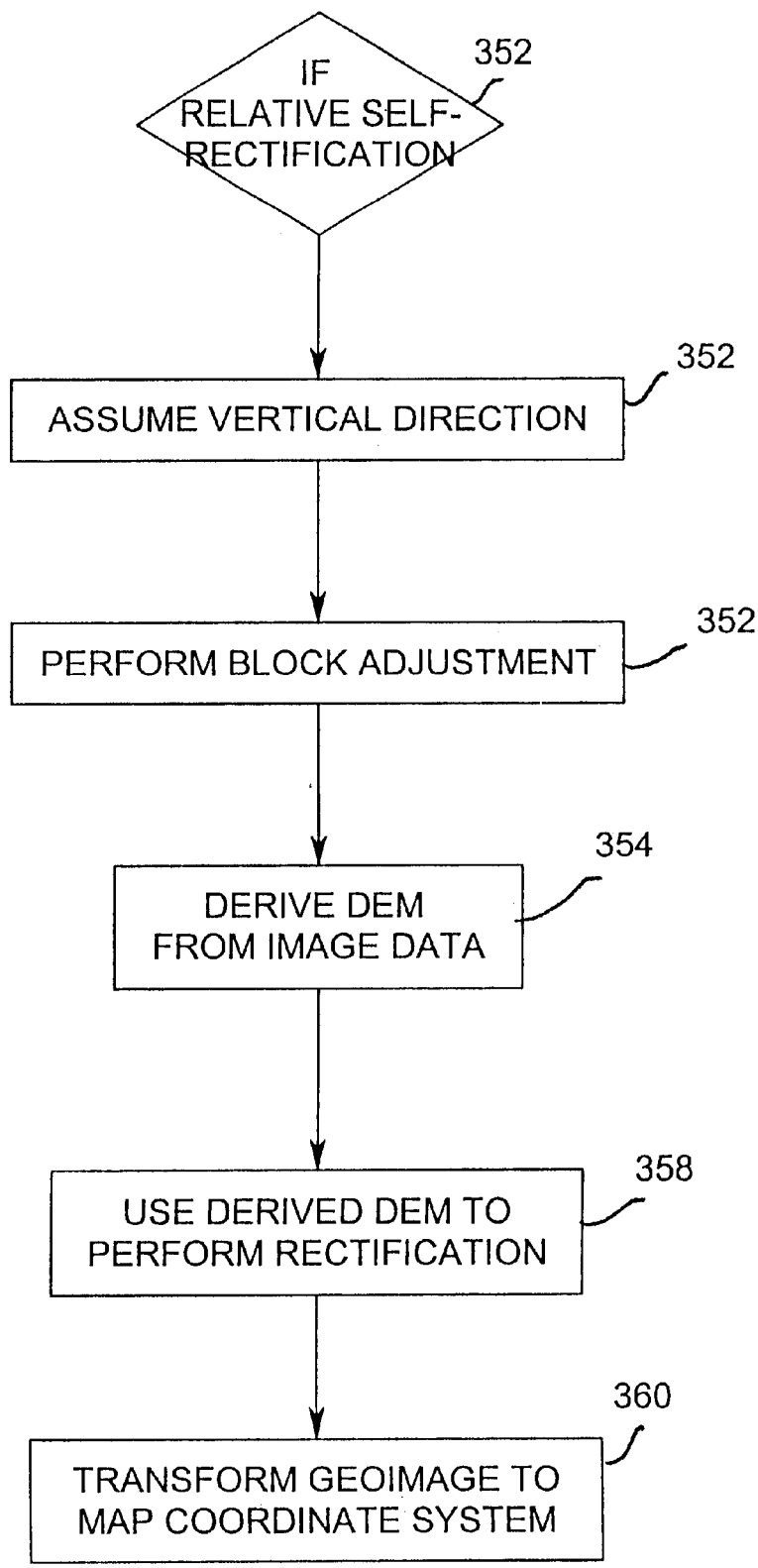
FIG. 47 is process flow chart for a program which uses vertical assumption for relative self-rectification in accordance with the invention.

Referring to FIG. 47, if relative self-rectification is called for, block 350, a vertical direction is assumed for the block of imagery, block 352. The introduction of the "assumed vertical direction" constraint is implemented in a manner analogous to the various ZOD conditions referred to above, except that the orientation conditions are modified to enforce that the average look direction of all photographs in the block is downward (e.g. that the block-wide average of the roll and pitch angles is zero).

Block 354 performs block adjustment using the measurement data in which roll and pitch are set to zero. This essentially is equivalent to placing a constraint on the block average that both the "roll" and "pitch" are equal to zero.

Block 356 derives DEM data from the image data, and block 358 uses the derived DEM data to perform rectification. The resulting block of images is transformed to a map coordinate system, block 360.

The resulting photogrammetric orientation parameters are then consistent with an average image look direction which is nearly aligned with the true world vertical. This substantially permits correctly decoupling the planimetric (X,Y) and elevation (Z) components of the photogrammetric solution. Because the planimetry and elevation can be separated, it is therefore practical to derive a sparse DEM, or a sparse stereo DEM from the source photography itself. Since it is derived directly from the photogrammetric solution parameters, the resulting DEM is consistent with the photographic geometry. Since the photogrammetric solution is aligned with the vertical direction to reasonable approximation, the DEM is therefore approximately level to the same reasonable degree of approximation. Consequently, an orthorectification process can be performed onto this approximately leveled DEM.

Because the vertical direction is established approximately, the standard rectification process correctly compensates for terrain elevation induced image displacement. The resulting rectified image is then an approximately correct orthophoto which has approximately correct rectification projection, but with arbitrary alignment and arbitrary scale. This orthophoto is therefore related conformally (shape-wise), via two-dimensional conformal transformation, to a true orthophoto of the area, as accurate as the original images are vertical—the more vertical the images, the better the solution. It is important to note that most "vertical" aerial images are so within 3° or less. Modern cameras have extensive correction mechanisms (gyroscopically controlled bases) that keep camera verticality to within less than 1°. The correctness of the self-rectification solution is an ensemble average and is therefore better yet—with precision approximating $1/\sqrt{N}$ times that of any individual image ("N" is the number of images in the block).

Sparse DEM

This novel technique can be used to create orthophoto images under demanding conditions where typical photogrammetric orthophoto production techniques fail. One example is the condition in which rectification must be performed, as best as practical, using imagery without stereo overlap and without availability of an external DEM.

To accomplish this, a standard photogrammetric adjustment is performed (e.g., either a controlled adjustment using tie points, control points, etc., or a free-network adjustment) for the sparse stereo geometry. In addition to the interior and exterior orientation parameters, the bundle adjustment provides three-dimension coordinate values for all points which have been measured in two or more images. By way of example, these points are referred to herein as ground points.

Figure 48:
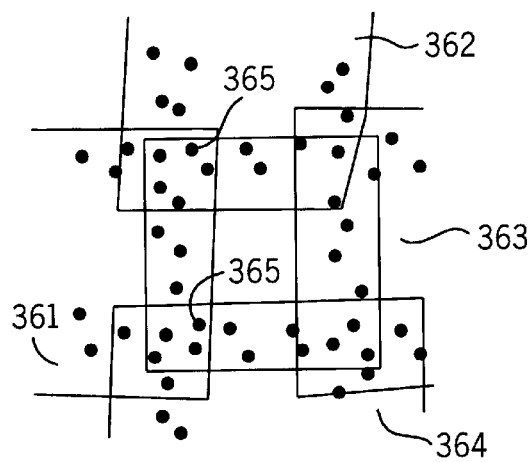
FIG. 48 is a simplified representation of a plurality of overlapping frames for which a plurality of ground points have been measured.

Referring to FIG. 48, there are shown four overlapping frames 361–364. Ground points 365, which are indicated by dots, are selected in overlapping pictures of the frames. Taken together, the ground points (associated with tie and/or control points and therefore distributed in accordance with the point picking geometry of sparse stereo) form a sparse sampling of the ground DEM. Viewed from above, the pattern of the ground points is similar to the sparse stereo point pattern, although exhibiting differences associated with terrain relief displacement removal. Due to the block adjustment process, each point is three-dimensional. If ground control is used, the adjustment process in not free-network, and the adjusted points will have a known elevation value as well as planimetric location, with all coordinate values expressed in world space.

Figure 49:
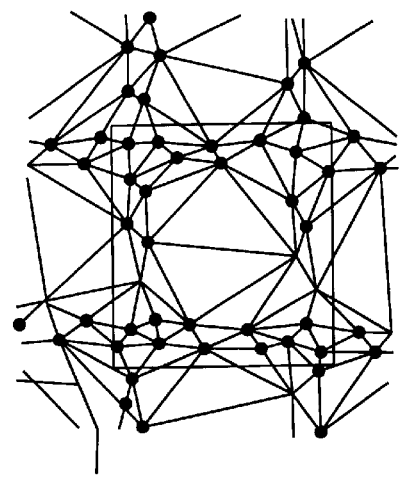
FIG. 49 is an example of the results of a Delaunay triangulation based upon planimetric coordinates.
Figure 50:
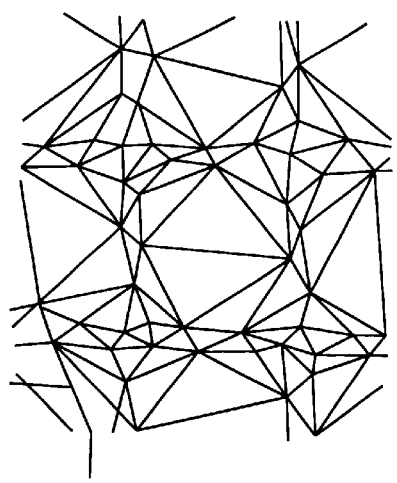
FIG. 50 is a view similar to that of FIG. 49 and with the ground points removed.

A Digital Terrain Model (DTM) is built between these ground points using a standard surface building technique. In one embodiment, a Delaunay triangulation is used to build optimal triangles between ground points. FIG. 49 illustrates the Delaunay triangulation of the sparse stereo geometry (planimetric (x,y) coordinates) shown in FIG. 48. FIG. 50 is similar to FIG. 49, but with the ground points removed. The associated point elevation coordinate values are assigned to the vertices of each triangle. The resulting 3D triangle mesh is used as an approximation to the overall topography of the ground surface . This surface represented by triangles can be used to extract elevation information in lieu of a DEM.

Figure 51:
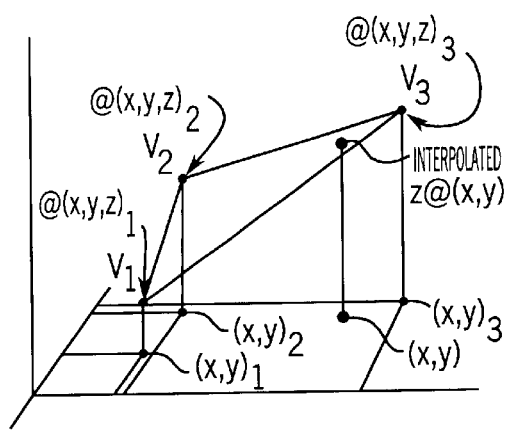
FIG. 51 is a representation of three dimension coordinates of a ground point.

Referring also to FIG. 51, each ground point has three coordinates (x,y,z). These coordinates are arranged into triangles each of which represents a planar approximation to the local terrain surface, such as triangle 366, based on the x,y coordinates using the Delaunay triangulation criteria and algorithms. Each triangle, such as triangle 366, is then a local approximation of the surface. Elevation for any point interior to the triangle is interpolated from the elevation values at the three vertices 367, 368 and 369, as represented in FIG. 51. Although triangle based interpolation is a common technique, any other interpolation technique may be applied. For example, one embodiment uses bivariat "thin plate" surface splines. Any surface interpolation algorithm can be utilized provided it can handle interpolation of two-dimensional point locations which are irregularly distributed.

Figure 52:
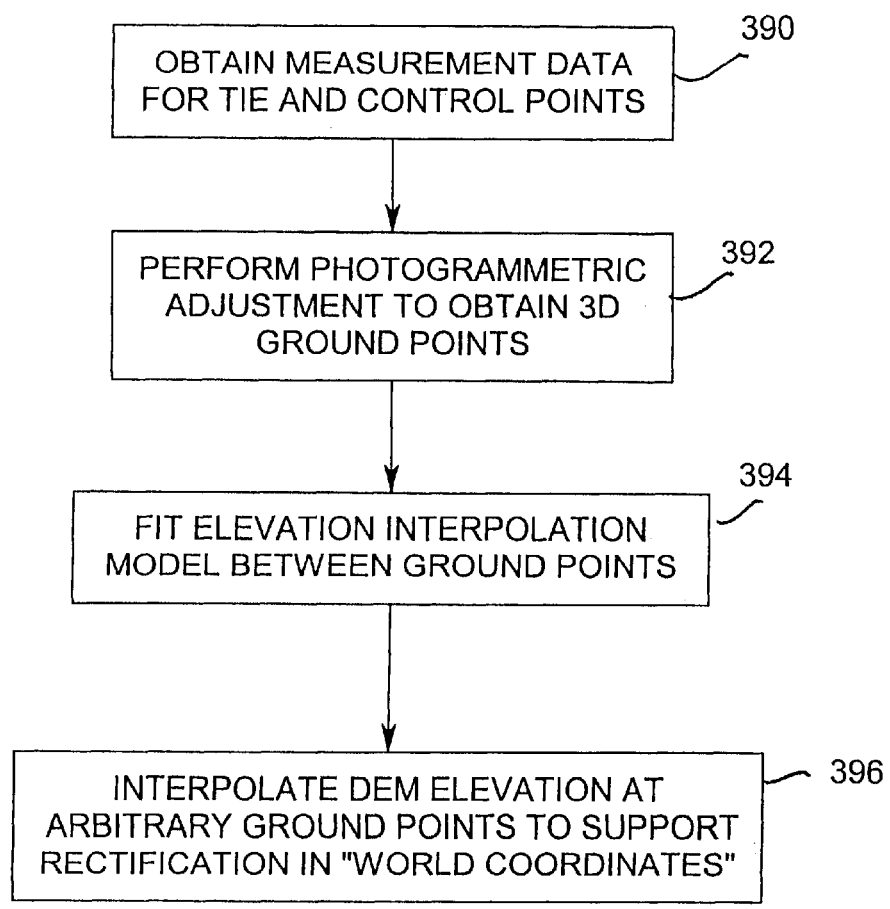
FIG. 52 is process flow chart for using sparse stereo for rectification with a sparse DEM in accordance with the invention.

FIG. 52 is a process flow chart for sparse stereo rectification. Referring to FIG. 52, block 390 obtains measurement data for tie and control points.

Block 392 performs photogrammetric adjustment to obtain three-dimensional ground points. The coordinates of these ground points may be expressed in one of several coordinate systems depending on which data were utilized to accomplish the photogrammetric solution. If a "controlled adjustment" was performed, incorporating one of the various combinations of planimetric and/or elevation ground control and/or photogrammetric station control, then the resulting ground point coordinates will be expressed within the same coordinate system as the control data. However, if a partially free network adjustment was performed where no sufficient control information is available, then the ground point coordinates will be expressed in a somewhat arbitrary coordinate system. If a completely free network adjustment was performed, where no ground control is used, the resulting ground points will be expressed in a completely arbitrary coordinate system. However, if an "assumed vertical" constraint is introduced into a free-network bundle adjustment, as in the case of a "self-rectification procedure", then the ground point coordinates will be expressed in a coordinate system which is approximately "leveled" with respect to the local vertical while the remaining datum elements (location, bearing and scale) remain arbitrary.

Block 394 fits the elevation interpolation model onto the computed ground point locations. The interpolation model can assume various forms such as a triangulated (Delaunay) irregular network (TIN), a finite element model, a polynomial terrain model, a single high-order bivariat "thin plate" spline model, or any mathematical surface model.

Block 396 interpolates elevations at arbitrary ground points to support rectification in "world coordinates. The results are interpolated across the image in the central areas (where the sparse coverage doesn't provide points, or where points are far apart) of the perspective source photography. However, potential adverse effects of this interpolation are somewhat mitigated by the near-verticality of the images.

Fine-tuning

Preferably, the orthorectified digital orthophoto is subjected to color adjustment to compensate for differences from one frame to the next, in the imagery that is used in producing the updated digital orthophoto.

The "radiometric" block adjustment process corresponds to step 26 of FIG. 1. This radiometric block adjustment process provides intensity and color balancing within each single image to match intensity and color balancing between adjacent images. The radiometric block adjustment process can be carried out using software programs known in the art and therefore the radiometric block adjustment process is not described in detail. The radiometric block adjustment solution can be provided using a program commercially available under the tradename "OrthoVista" from Stellacore Corporation, Parker Colo., 80134.

The radiometric differences can be due to the use of imagery obtained at difference times of the day, the type of film used, the presence of shadows within the project area at the time the photographs are being taken, etc.

Figure 53:
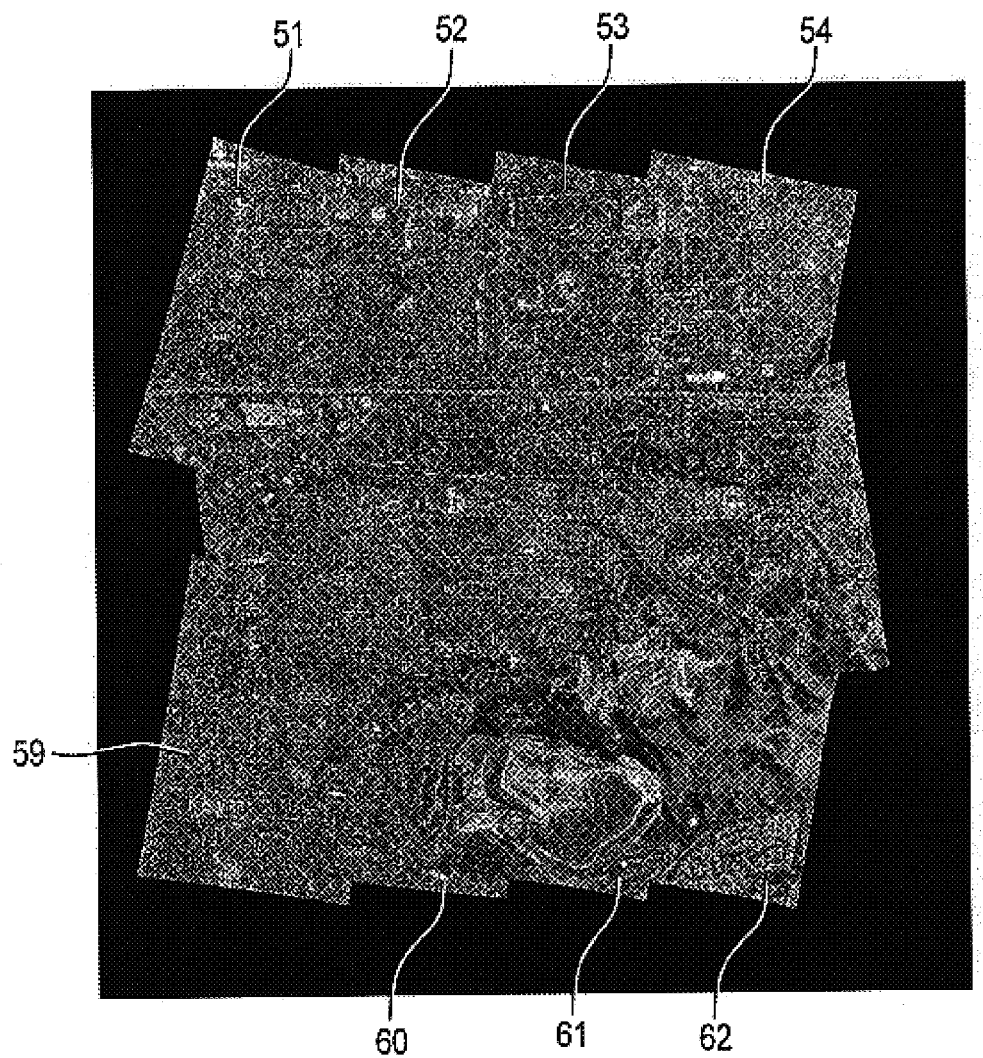
FIG. 53 is a screen showing the total image for the project area after orthorectification.
Figure 54:
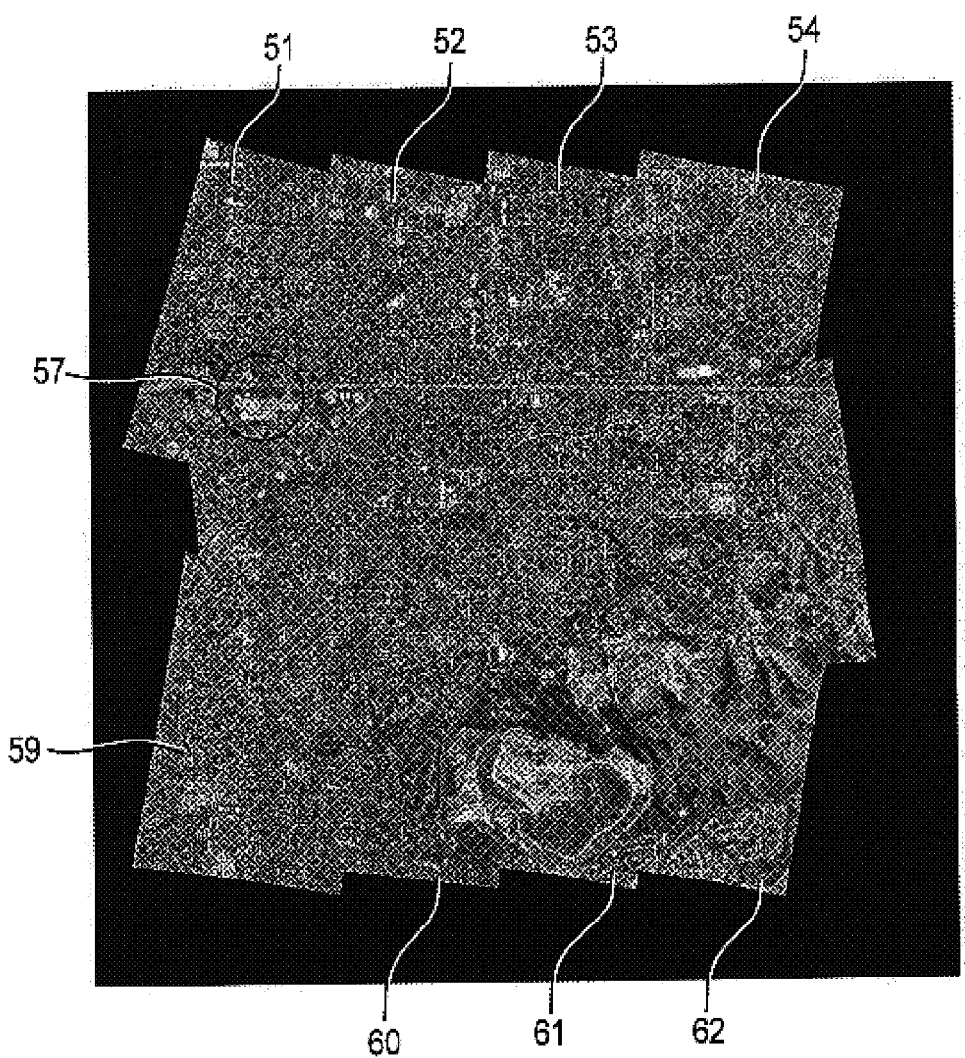
FIG. 54 is a screen showing the total image for the project area after color balancing.

FIGS. 53 and 54 show a larger mosaic before and after color adjustment (FIG. 53 being after rectification). Many color adjustment processes are known in the art.

Figure 55:
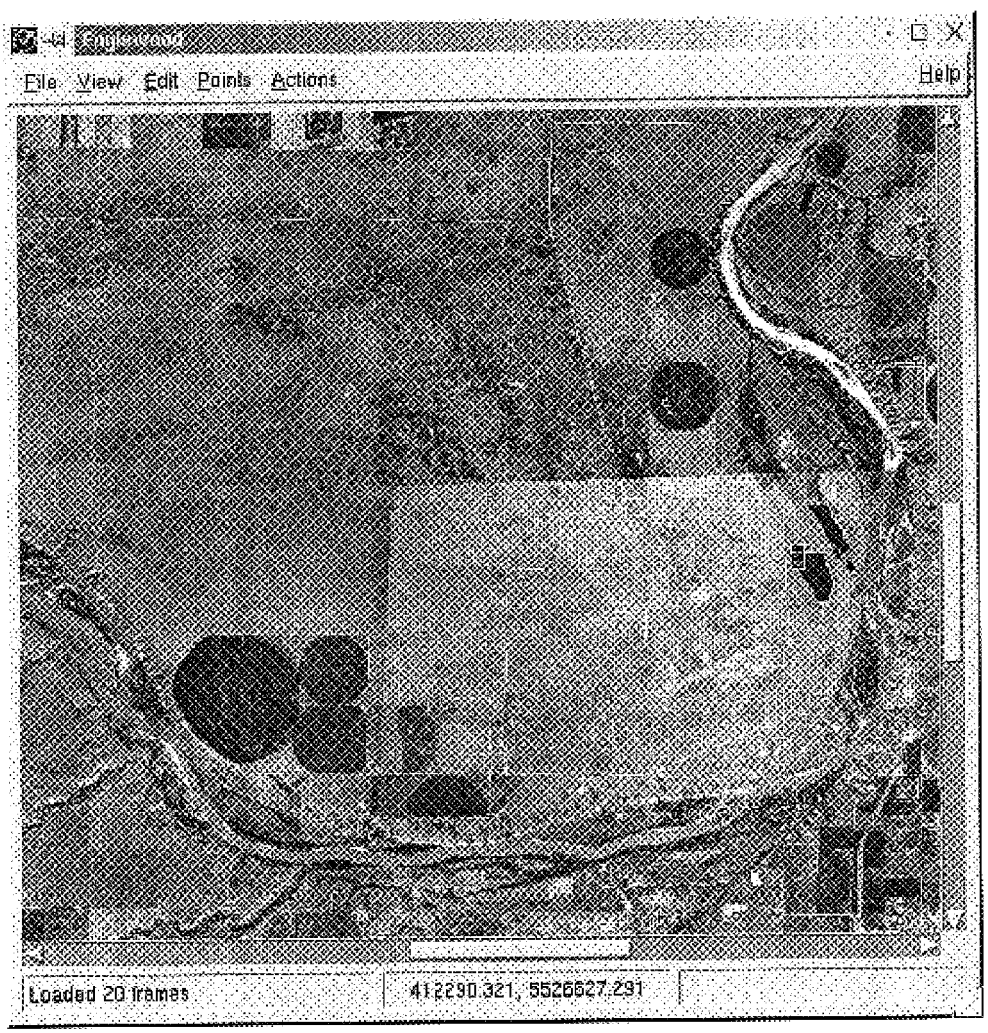
FIG. 55 is a screen shot containing a portion of a mosaic before radiometric corrections are done.
Figure 56:
FIG. 56 is a screen shot containing the same mosaic portion as FIG. 55, but after radiometric corrections were done.
Figure 57:
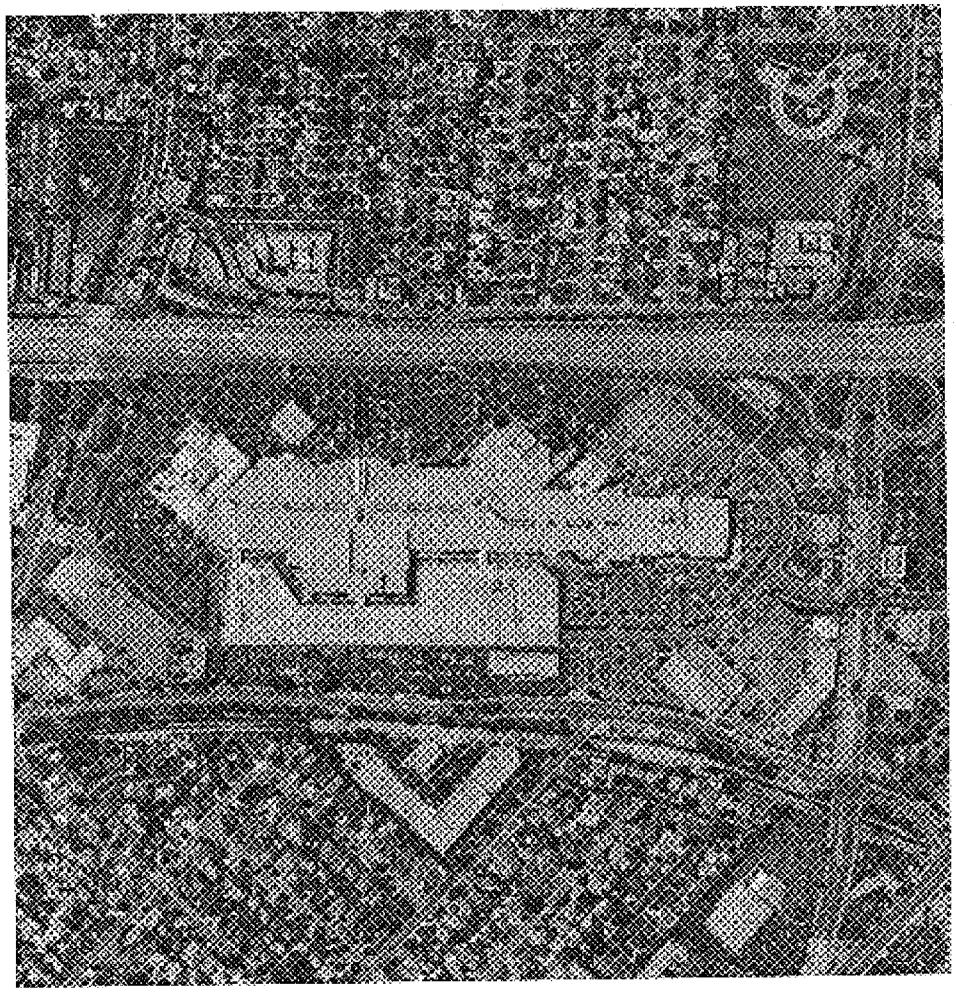
FIG. 57 is a screen showing an enlarged portion of the total image for the project area of FIG. 54, representing the appearance of the final product.

FIGS. 55 and 56 show a portion of a mosaic before and after radiometric correction, respectively. Note the improved color balance of the overall mosaic, and the absence of "seams" between image portions used for the mosaic.

Mosaicking

During this step, individual orthophoto images are joined into a single image. The resulting blanket of joined images is called a "mosaic", and the process is known as "mosaicking". There are a variety of industry standard procedures for accomplishing this. One that is used in this process is the OrthoVista program.

Other Post Processing

Other post processing procedures include a partitioning of mosaics into "tiles" or "sheets" which have geometric and/or data file sizes conforming to customer specifications and expectations. Many processes that support this are known in the industry.

Delivery Media

The digital orthophoto data can be transferred to suitable media. The standard distribution product is a CD-ROM. However, other media, such as 8-mm tape, are available. The digital orthophoto or mosaic can also be formatted into any of a wide variety of industry standard georeferenced data formats.

Summary

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method for improving the quality of tie points and control points measured in producing a digital orthophoto from a set of overlapping images of a project area, said method comprising the steps of:

measuring a plurality of points within a block of images of the project area;

performing a two-dimension, free network adjustment using the points measured within the block of images to simultaneously compute a two-dimension orientation transformation for each image in the block of images;

performing a three-dimension, free-network adjustment using the results of the two-dimension, free-network adjustment;

assessing the quality of the points for the block of images using the results of the three-dimension, free-network adjustment;

refining the measurement of at least one of the points; and performing at least a further three-dimension, free-network adjustment.

2. The method according to claim 1, wherein the step of measuring points includes displaying overlapping images in pairs, measuring only corner points in each image pair, subsequently measuring additional points, and performing said two-dimension, free-network adjustment prior to measuring said additional points.

3. The method according to claim 1, wherein assessing the quality of the points for the block of images includes assessing residuals of the points after performing said three-dimension, free-network adjustment.

4. A method for measuring tie points and control points in producing a digital orthophoto from a block of overlapping images of a project area, said method comprising the steps of:

displaying the overlapping images in pairs, measuring corner points in each image pair to obtain point data;

performing a two-dimension, free network adjustment using the point data obtained by measuring points within the block of images to simultaneously compute a two-dimension orientation transformation for each image in the block; and measuring a plurality of additional tie points within the block of images of the project area, wherein said two-dimension, free-network adjustment is performed prior to measuring said additional points.

5. A method for providing elevation model data for use in producing a digital orthophoto of a project area; said method comprising the steps of:

acquiring elevation model data from at least first and second sources;

prioritizing the elevation model data acquired from the first and second sources;

storing the elevation model data for at least the first and second elevation models in a memory in a predetermined order to produce an elevation multimodel;

accessing the elevation model data having the highest priority to provide elevation data for use in performing a first geometric transformation; and accessing the elevation model data having the next priority to provide elevation data for use in performing a second geometric transformation.

6. The method according to claim 5, wherein the elevation model data for the first and second elevation models are stored in contiguous data storage locations within the memory.

7. The method according to claim 5, wherein the elevation multimodel is used as a source of external control to constrain a photogrammetric adjustment.

8. The method according to claim 5, wherein the elevation multimodel is used as a source of external control in an orthorectification process.

9. The method according to claim 5, wherein the elevation multimodel is used as a source of one-dimension elevation model data in deriving full three-dimensional data from a two dimension map and a one-dimension elevation model.

10. The method according to claim 5, wherein the elevation multimodel is used as a source of external control to constrain a photogrammetric adjustment process.

11. A method for producing a digital orthophoto from a block of overlapping images of a project area; said method comprising the steps of:
   acquiring imagery data for the project area;
   performing a plurality of geometric coordinate transformations on the imagery data to obtain geometric coordinate data, wherein the step of performing a plurality of geometric coordinate transformations includes performing at least one photogrammetric orientation and performing at least one cartographic transformation; and
   performing only one image intensity interpolation operation using the geometric coordinate data, wherein all of said geometric coordinate transformations are performed prior to performing said image intensity interpolation operation.

12. A method for producing a digital orthophoto from a block of overlapping images of a project area; said method comprising the steps of:
   obtaining imagery data expressed in cartographic coordinates;
   transforming the cartographic coordinates to world coordinates to obtain imagery data expressed in world coordinate data;
   using the world coordinate data to obtain elevation value data from an elevation model expressed in world coordinates;
   computing a photogrammetric orientation solution using the elevation value data obtained from the elevation model and the imagery data expressed in world coordinates;
   performing a pixel intensity interpolation operation using the results of the photogrammetric solution and perspective image data; and
   using the results of the pixel intensity interpolation operation and the imagery data expressed in cartographic coordinates to produce an orthophoto expressed in cartographic coordinates.

13. The method according to claim 12, wherein the elevation model includes a first source of elevation model data and a second source of elevation model data; and including the steps of prioritizing the accessing of the first and second sources of elevation model data; and accessing the first and second sources of elevation model data in the order of priority.

14. A method for producing digital orthophoto from a block of overlapping images of a project area, said method comprising the steps of:
   acquiring digital imagery data for the project area by taking a series of aerial photographs in sparse stereo configuration wherein the imagery data comprises a plurality of frames wherein adjacent frames overlap by no more than about twenty percent in each/at least one direction;
   selecting a plurality of points in overlapping portions of adjacent frames to obtain control data;
   computing a photogrammetric solution using the imagery data and the control data; and
   performing a rectification operation using the results of the photogrammetric solution.

15. The method according to claim 14, wherein at least performing the rectification operation includes obtaining elevation data from a sparse stereo elevation model.

16. A method for producing a digital orthophoto for a project area, said method comprising the steps of:
   using an uncalibrated camera to obtain a series of aerial photographs of the project area for providing digital imagery representing a block of overlapping images of the project area;
   introducing at least one perspective camera model parameter into a bundle block adjustment program as an unknown parameter pertaining to the taking camera;
   performing a bundle block adjustment operation using the digital imagery data to calculate said unknown parameter;
   supplying the calibrated parameter data and bundle adjustment result data to an orthorectification process; and
   performing an orthorectification operation using the calibrated parameter data and the bundle adjustment data.

17. The method according to claim 16, wherein the aerial photo configuration includes those with sparse stereo.

18. The method according to claim 16, wherein the perspective camera model parameters include exterior orientation parameters and interior orientation parameters.

19. The method according to claim 16, wherein the exterior orientation parameters include principal point-x, principal point-y and principal distance.

20. A method for creating orthophoto images from imagery without stereo overlap and without availability of an external elevation model, comprising:
   performing a photogrammetric adjustment using tie points and control points for the sparse stereo geometry to provide a three dimensional coordinate value for a plurality of ground points which correspond to all points which have been measured in two or more images, and wherein the ground points form a sparse sampling of the ground elevation model;
   each ground point having a known elevation value expressed in world space and a planimetric location expressed in world space; and
   interpolating an elevation model between the ground points for use in producing a digital orthophoto for a project area.

21. The method according to claim 20, including using a Delaunay triangulation for interpolating the said elevation model between the ground points.

22. The method according to claim 20, including said elevation model between the ground points.

23. A method for producing a digital orthophoto from a block of overlapping images for a project area, said method comprising the steps of:
   generating a map footprint which represents the outer edge of meaningful pixel intensity values expressed in a coordinate system related to internal geometry of the taking camera;
   generating a three-dimension world sample grid using an elevation model, the three-dimension world sample grid including a grid of points representing a point sampling of the elevation model consistent with a regular and homogenous spacing in a map coordinate system; and
   generating a pixel displacement grid wherein every pixel location of the output image has a look-up value that indicates from which source image location to extract radiometric information.

24. The method according to claim 23, wherein the step of generating a map footprint includes the steps of converting the data boundary from pixel coordinates to camera coordinates, back projecting the data boundary into world space, intersecting boundary directions with the elevation model to produce a world footprint, and converting the world footprint to a map footprint.

25. The method according to claim 23, wherein the step of generating a three-dimension world sample grid, includes the steps of determining maximum and minimum map coordinate extents, generating a sample grid in map coordinates, converting the map grid to a world grid, and assigning elevation values at world grid points using the elevation model.

26. The method according to claim 23, wherein the step of generating a pixel displacement grid, includes the steps of forward projecting the world grid into image coordinates, converting the image coordinates to pixel coordinates, computing displacements at each location, and interpolating the displacement grid at each pixel location.

27. A method for producing a digital orthophoto from a block of overlapping images for a project area, said method comprising the steps of:
  generating a map footprint which represents the outer edge of meaningful pixel intensity values expressed in a coordinate system related to internal geometry of the taking camera, wherein generating the map footprint includes converting the data boundary from pixel coordinates to camera coordinates; back projecting the data boundary into world space; intersecting boundary directions with an elevation model to produce a world footprint; and converting the world footprint to a map footprint;
  generating a three-dimension world sample grid, including determining maximum and minimum map coordinate extents; generating a sample grid in map coordinates; converting the map grid to a world grid; and assigning elevation values at world grid points using the elevation model; and
  generating a pixel displacement grid, including forward projecting the world grid into image coordinates; converting the image coordinates to pixel coordinates; computing displacements at each location; and interpolating the displacement grid at each pixel location.

28. A method for producing a digital orthophoto from a block of overlapping images for a project area, said method comprising the steps of:
  acquiring digital imagery data representing the block of overlapping images of the project area;
  obtaining measurement data for tie and control points;
  assuming vertical direction for the imagery;
  applying an assumed vertical direction constraint to a block bundle adjustment program;
  performing a block adjustment using the block bundle adjustment program;
  deriving elevation model data from the imagery data;
  performing an orthorectification operation using the derived elevation model data; and
  transforming the geoimage to a map coordinate system.

29. A method for producing a digital orthophoto from a block of overlapping images for a project area, said method comprising the steps of:
  acquiring digital imagery data representing the block of overlapping images of the project area;
  obtaining measurement data for a plurality of tie and a plurality of control points;
  performing photogrammetric interpolation adjustment using a block bundle adjustment process to obtain an elevation interpolation model including three-dimension ground points;
  fitting the elevation interpolation model between ground points; and
  interpolating elevation at arbitrary ones of the three-dimension ground points to support rectification in world coordinates.

30. The method according to claim 29 including applying an assumed vertical direction constraint to the block bundle adjustment process prior to performing the photogrammetric interpolation adjustment.

* * * * *